US012038717B2

(12) United States Patent
Sakakibara et al.

(10) Patent No.: US 12,038,717 B2
(45) Date of Patent: Jul. 16, 2024

(54) PROCESS UNIT INCLUDING FIRST AND SECOND RESIN MATERIALS AND IMAGE FORMING APPARATUS

(71) Applicant: CANON KABUSHIKI KAISHA, Tokyo (JP)

(72) Inventors: Yuichi Sakakibara, Tokyo (JP); Yosuke Kashiide, Tokyo (JP); Hiroyuki Munetsugu, Kanagawa (JP); Yuko Harada, Kanagawa (JP); Goshi Ozaki, Kanagawa (JP); Masanari Morioka, Kanagawa (JP); Naoki Hayashi, Kanagawa (JP); Hideki Kakuta, Shizuoka (JP); Hiroki Shimizu, Shizuoka (JP); Teruhiko Sasaki, Shizuoka (JP); Tachio Kawai, Tokyo (JP); Takatoshi Hamada, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/053,029

(22) Filed: Nov. 7, 2022

(65) Prior Publication Data

US 2023/0066319 A1 Mar. 2, 2023

Related U.S. Application Data

(63) Continuation of application No. 17/461,640, filed on Aug. 30, 2021, now Pat. No. 11,520,286.

(30) Foreign Application Priority Data

Aug. 31, 2020 (JP) ................................ 2020-146225

(51) Int. Cl.
*G03G 21/18* (2006.01)
*G03G 15/00* (2006.01)
*G03G 21/16* (2006.01)

(52) U.S. Cl.
CPC ......... *G03G 21/1867* (2013.01); *G03G 15/80* (2013.01); *G03G 21/1652* (2013.01); *G03G 21/1814* (2013.01); *G03G 2221/166* (2013.01)

(58) Field of Classification Search
CPC ........... G03G 21/1867; G03G 21/1814; G03G 2221/183; G03G 21/1871; G03G 21/1652; G03G 2221/166; G03G 15/80
See application file for complete search history.

(56) References Cited

U.S. PATENT DOCUMENTS 6,246,853 B1 6/2001 Suzuki et al.
8,768,201 B2 7/2014 Ming Wang
(Continued)

FOREIGN PATENT DOCUMENTS

CN 1384405 A 12/2002
JP 2002328581 A 11/2002
(Continued)

OTHER PUBLICATIONS

Extended European Search Report issued in European Appln. No. 21193735.4 mailed Feb. 1, 2022.
(Continued)

*Primary Examiner* — Arlene Heredia
*Assistant Examiner* — Laura Roth
(74) *Attorney, Agent, or Firm* — ROSSI, KIMMS & McDOWELL LLP

(57) ABSTRACT

A cartridge for an image forming apparatus includes: a process unit to be used to form an image; a first member including a first resin material; a second member including a second resin material having higher flame retardant capa-
(Continued)

bility than the first resin material; and an electrode member including a contact section configured to be supplied with power from an apparatus main body of the image forming apparatus. The electrode member is configured to electrically connect the apparatus main body to the process unit. The second resin material of the second member has a greater density than the first resin material of the first member. The contact section is located in the vicinity of the first and second members and is closer to the second member than to the first member.

38 Claims, 40 Drawing Sheets

(56) References Cited

U.S. PATENT DOCUMENTS

| | | | |
|---|---|---|---|
| 8,879,944 | B2 | 11/2014 | Takarada |
| 9,298,157 | B2 | 3/2016 | Sakuma |
| 2002/0191981 | A1 | 12/2002 | Miyabe et al. |
| 2013/0022368 | A1 | 1/2013 | Takarada et al. |
| 2015/0125179 | A1 | 5/2015 | Sakuma |
| 2019/0307013 | A1 | 10/2019 | Hashizume et al. |
| 2020/0244135 | A1 | 7/2020 | Sakamoto |

FOREIGN PATENT DOCUMENTS

| | | | |
|---|---|---|---|
| JP | 2004347728 | A | 12/2004 |
| JP | 2007199505 | A | 8/2007 |
| JP | 2012063750 | A | 3/2012 |
| JP | 2012247761 | A | 12/2012 |
| JP | 5335485 | B2 | 11/2013 |
| JP | 2014016490 | A | 1/2014 |
| JP | 2015145917 | A | 8/2015 |

OTHER PUBLICATIONS

Notice of Allowance issued in U.S. Appl. No. 17/461,640 mailed Aug. 17, 2022.

Office Action issued in Chinese Appln. No. 202111008557.6 mailed Apr. 27, 2024. English translation provided.

W

PROCESS UNIT INCLUDING FIRST AND SECOND RESIN MATERIALS AND IMAGE FORMING APPARATUS

BACKGROUND OF THE INVENTION

Field of the Invention

The present invention relates to a cartridge and an image forming apparatus that uses the cartridge.

Description of the Related Art

In an electrophotographic image forming apparatus that uses a process cartridge system, when a cartridge is attached to the apparatus main body, an electrode member of the cartridge is in contact with a main body electrode of the apparatus main body, thereby electrically connecting a conduction-target member, such as a process unit, of the cartridge to the apparatus main body. As an example of the electrode member, Japanese Patent Application Publication No. 2012-63750 discloses a configuration in which conductive resin is incorporated in the frame of a cartridge.

SUMMARY OF THE INVENTION

However, in the above-mentioned conventional example, since the conductive portion, which may be conductive resin or metal plate, for example, is attached to the frame, the frame needs to be made of a resin with high flame retardant function (flame-retardant material) in order to ensure electrical safety in the vicinity of the conductive portion. The use of flame-retardant material limits the choice of materials. This poses challenges particularly to the weight reduction of the frame components.

It is an objective of the present invention to provide a technique that achieves both the weight reduction and safety of a frame for supporting a process unit.

To solve the above problems, a process unit for an image forming apparatus includes:

a process member to be used to form an image;

a first member including a first resin material;

a second member including a second resin material having higher flame retardant capability than the first resin material; and an electrode member including a contact section configured to be supplied with power from the apparatus main body, the electrode member being configured to electrically connect with the process member, wherein the first member is at least a part of a frame of the process unit, the second resin material of the second member has a greater density than the first resin material of the first member, and at least a part of the second member is located at a position closer to the contact section than a part of the first member closest to the contact section and between the contact section and the part of the first member.

To solve the above problems, a process unit for an image forming apparatus includes:

a process member to be used to form an image;

a first member including a first resin material;

a second member including a second resin material having higher flame retardant capability than the first resin material; and an electrode member including a contact section configured to be supplied with power from the apparatus main body, the electrode member being configured to electrically connect with the process member, wherein the first member is at least a part of a frame of the process unit, the second resin material of the second member has a greater density than the first resin material of the first member, and the contact section is supported by the second member.

According to the present invention, it is possible to achieve both the weight reduction and safety of a frame that supports a process unit.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

First Embodiment

Figure 2:
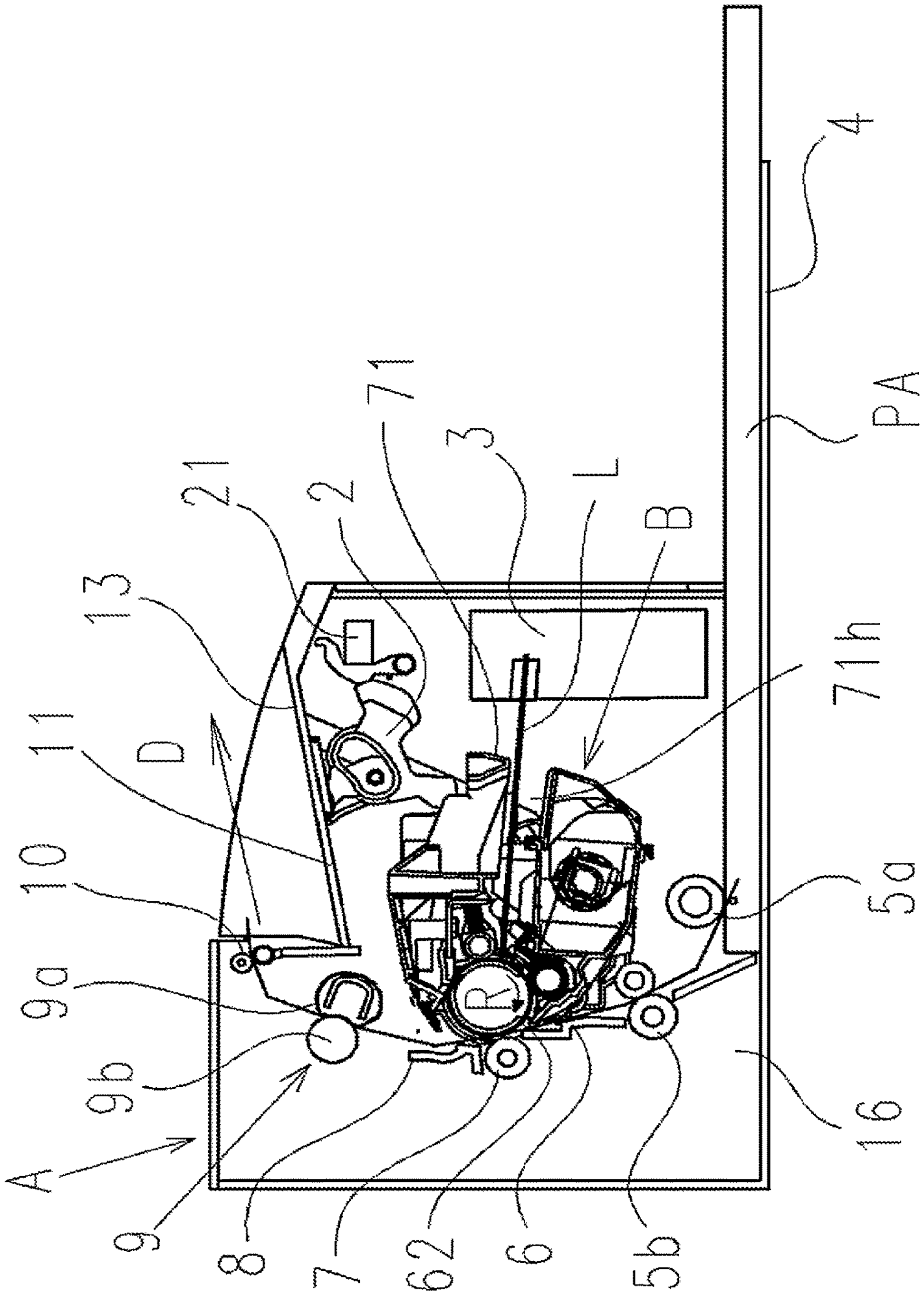
FIG. 2 is a cross-sectional view of an image forming apparatus main body and a cartridge of the first embodiment.
Figure 3:
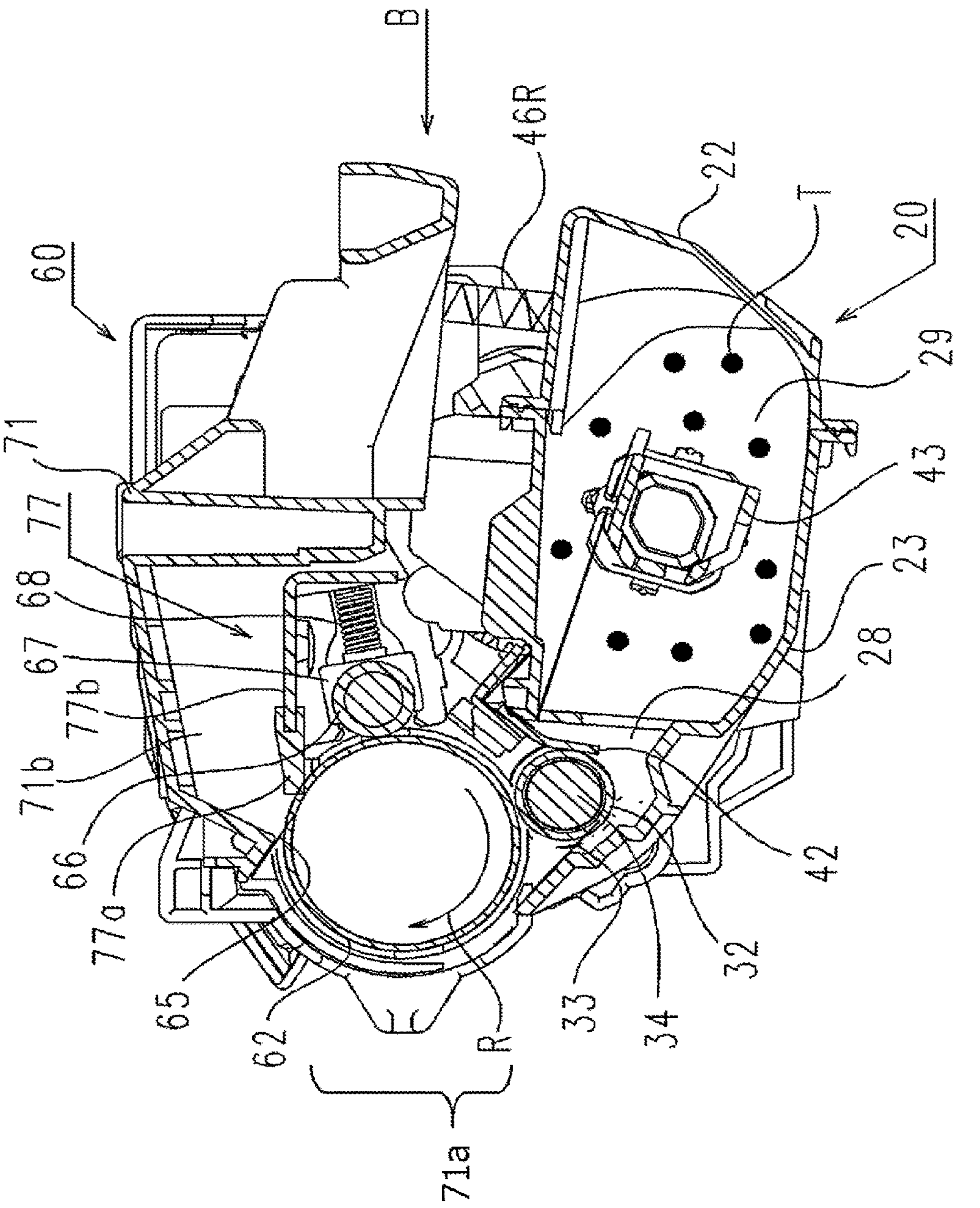
FIG. 3 is a cross-sectional view of a cartridge of the first embodiment.

Referring to drawings, an embodiment of the present invention is now described in detail. A direction along the rotation axis of an electrophotographic photosensitive drum is referred to as a longitudinal direction. In the longitudinal direction, the side on which the electrophotographic photosensitive drum receives a driving force from the image forming apparatus main body is referred to as a drive side, and the opposite side is referred to as a non-drive side. Referring to FIGS. 2 and 3, the overall configuration and an image formation process are now described. FIG. 2 is a cross-sectional view of an apparatus main body (electrophotographic image forming apparatus main body, image forming apparatus main body) A and a process cartridge B of an electrophotographic image forming apparatus of one embodiment according to the present invention. FIG. 3 is a cross-sectional view of the process cartridge B. The process cartridge is formed by integrating a photosensitive member and a process unit which acts on the photosensitive member, into a cartridge. The process cartridge is attached to the electrophotographic image forming apparatus main body in a detachable manner. For example, the process cartridge may be formed by integrating a photosensitive member and at least one of a developing unit, a charging unit, and a cleaning unit as a process unit into a cartridge. The electrophotographic image forming apparatus forms an image on a recording medium using an electrophotographic image forming method. Examples of the electrophotographic image forming apparatus include an electrophotographic copier, an electrophotographic printer (e.g., an LED printer and laser beam printer), a facsimile machine, and a word processor. The apparatus main body A is the portion of the electrophotographic image forming apparatus excluding the process cartridge B (hereinafter, referred to as cartridge B).

Overall Configuration of Electrophotographic Image Forming Apparatus

The electrophotographic image forming apparatus (image forming apparatus) shown in FIG. 2 is a laser beam printer using an electrophotographic technique in which the cartridge B is attached to the apparatus main body A in a detachable manner. When the cartridge B is attached to the apparatus main body A, an exposure apparatus 3 (laser scanner unit) is arranged that forms latent images on an electrophotographic photosensitive drum 62, which serves as an image bearing member of the cartridge B. A sheet tray 4, which is arranged under the cartridge B, stores recording media (hereinafter referred to as sheet material PA) on which images are formed. The electrophotographic photosensitive drum 62 is a photosensitive member (electrophotographic photosensitive member) used to form electrophotographic images. The apparatus main body A further includes a pickup roller 5*a*, a pair of feeding rollers 5*b*, a transfer guide 6, a transfer roller 7, a transport guide 8, a fixing apparatus 9, a pair of discharge rollers 10, and a discharge tray 11, which are arranged along the transport direction D of the sheet material PA. The fixing apparatus 9 includes a heating roller 9*a* and a pressing roller 9*b*.

Image Formation Process

The outline of the image formation process is now described. In response to a print start signal, the electrophotographic photosensitive drum (hereinafter, referred to as photosensitive drum 62 or simply as drum 62) is driven to rotate in the direction of arrow R at a predetermined circumferential speed (process speed). A charging roller (charging member) 66, to which a bias voltage is applied, is in contact with the outer circumferential surface of the drum 62 and uniformly charges the outer circumferential surface of the drum 62 (see FIG. 3). The exposure apparatus 3 outputs a laser beam L according to image information. The laser beam L passes through a laser opening 71*h* (see FIG. 2) provided in a cleaning frame 71 of the cartridge B, and scans the outer circumferential surface of the drum 62 to perform exposure. An electrostatic latent image corresponding to the image information is thus formed on the outer circumferential surface of the drum 62.

As shown in FIG. 3, a developing unit 20, which serves as the developing apparatus, includes a toner chamber 29 storing toner T. A transport member (agitation member) 43 rotates to agitate and transport the toner T to a toner supply chamber 28. The magnetic force of a magnet roller 34 (stationary magnet) holds the toner T on the surface of a developing roller 32. The developing roller 32 is a developer carrying member that carries developer (toner T) on its surface to develop the latent image formed on the drum 62. A development blade 42 friction-charges the toner T and controls the layer thickness of the toner T on the circumferential surface of the developing roller 32, which serves as the developer carrying member.

The toner T is supplied to the drum 62 according to the electrostatic latent image and develops the latent image. As a result, the latent image is formed as a visible toner image. The drum 62 is an image bearing member that bears a latent image or an image to be formed with toner (toner image, developer image) on its surface. As shown in FIG. 2, the sheet material PA stored in a lower part of the apparatus main body A is sent out from the sheet tray 4 by the pickup roller 5*a* and the pair of feeding rollers 5*b* in time with the output of a laser beam L. The sheet material PA is transported along the transfer guide 6 to the transfer position between the drum 62 and the transfer roller 7. At this transfer position, the toner image is sequentially transferred from the drum 62 to the sheet material PA.

The sheet material PA to which the toner image is transferred is transported away from the drum 62 and to the fixing apparatus 9 along the transport guide 8. The sheet material PA then passes through the nip portion of the heating roller 9*a* and the pressing roller 9*b* of the fixing apparatus 9. The fixing process of pressing and heating at the nip portion fixes the toner image on the sheet material PA. The sheet material PA that has undergone the toner image fixing process is transported to the pair of discharge rollers 10 and discharged to the discharge tray 11.

As shown in FIG. 3, the residual toner on the outer circumferential surface of the drum 62 after transferring is removed by a cleaning member 77 and used for an image formation process again. The toner removed from the drum 62 is stored in a waste toner chamber 71*b* of a toner cleaning unit 60. The cleaning unit 60 is a photosensitive drum unit including the photosensitive drum 62. In the foregoing description, the charging roller 66, the developing roller 32, the transfer roller 7, and the cleaning member 77 function as a process unit for acting on the drum 62.

Overall Cartridge Configuration

Figure 4:
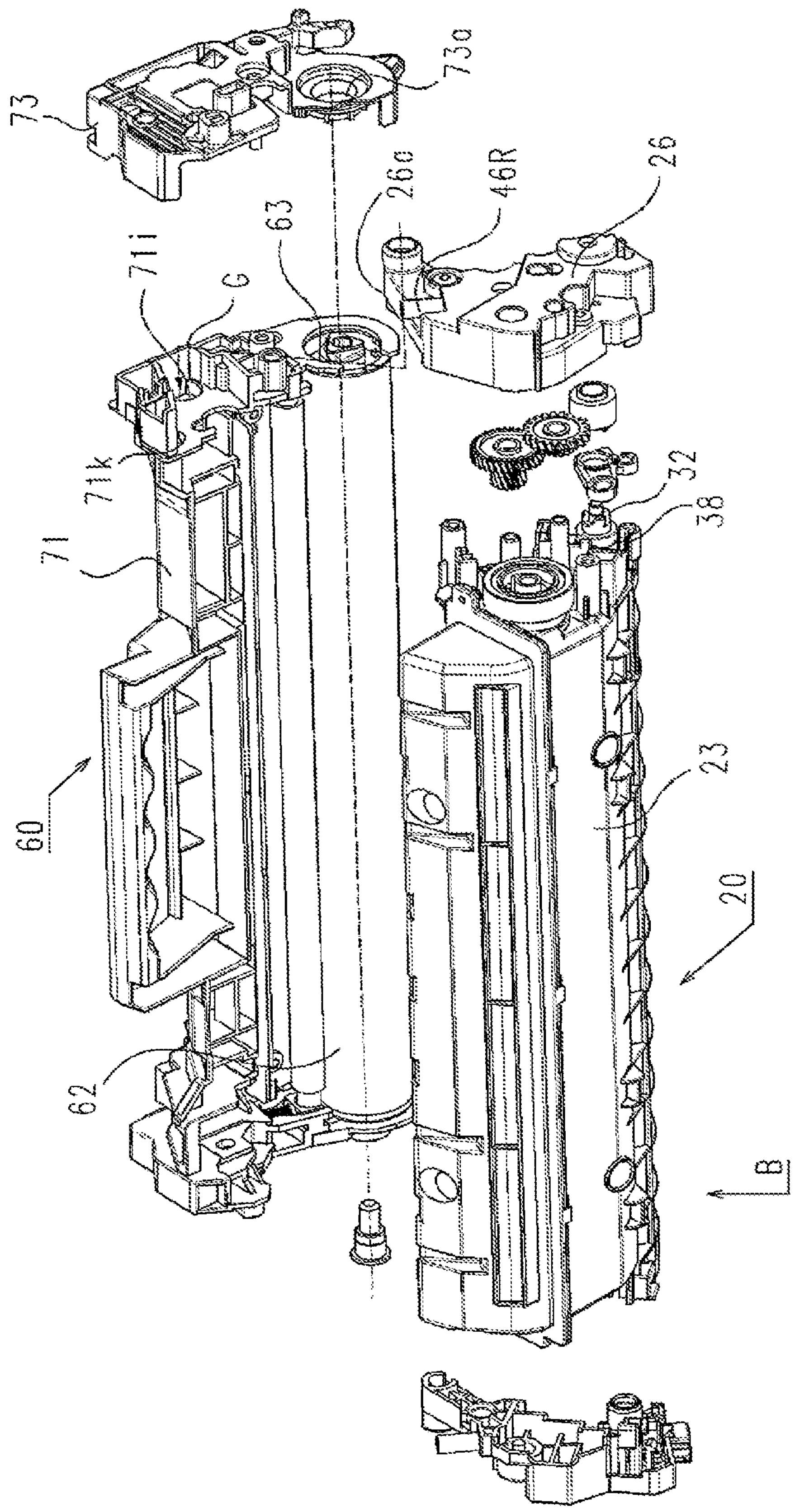
FIG. 4 is a perspective view illustrating the configuration of a cartridge of the first embodiment.
Figure 5:
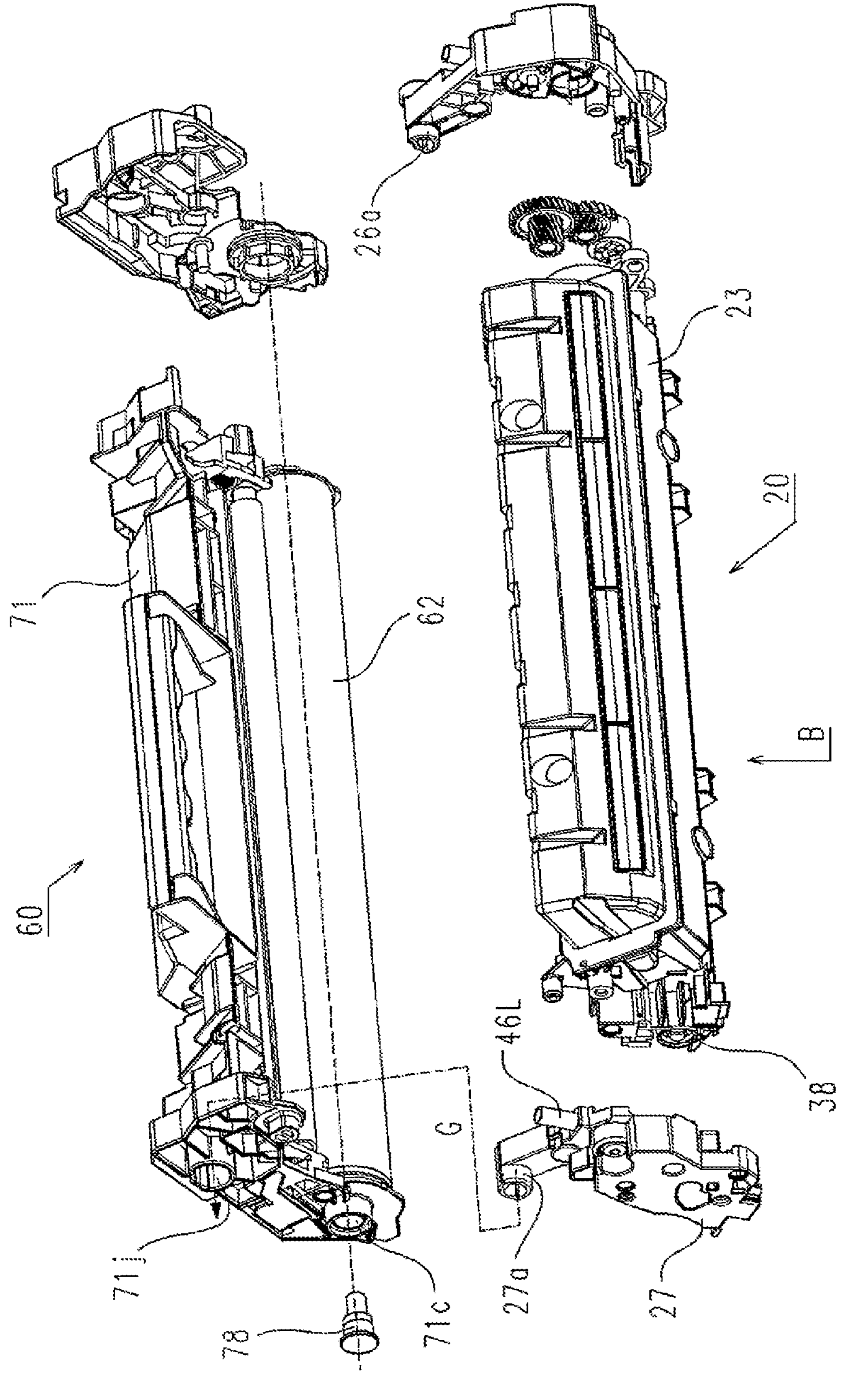
FIG. 5 is a perspective view illustrating the configuration of a cleaning unit of the first embodiment.

Referring to FIGS. 3, 4, and 5, the overall configuration of the cartridge B is now described. FIG. 3 is a cross-sectional view of the cartridge B, and FIGS. 4 and 5 are perspective views illustrating the configuration of the cartridge B. In this embodiment, the description of the screws for connecting parts is omitted. The cartridge B includes the cleaning unit (photosensitive member holding unit, drum holding unit, image bearing member holding unit, first unit) 60 and the developing unit (developer carrying member holding unit, second unit) 20.

As shown in FIG. 3, the cleaning unit 60 includes the drum 62, the charging roller 66, the cleaning member 77, and a cleaning frame 71, which supports these components. On the drive side, the drum 62 includes a drive-side drum flange 63, which is rotationally supported by a hole section 73*a* of a drum bearing 73 (see FIG. 4). In a broad sense, the drum bearing 73 and the cleaning frame 71 can be collectively referred to as a cleaning frame. As shown in FIG. 5, on the non-drive side, a drum shaft 78 is press-fitted into a hole section 71*c* formed in the cleaning frame 71 so that a hole section (not shown) of the non-drive-side drum flange is rotationally supported.

The drum flanges are portions that are rotationally borne and supported by the respective bearing portions. As shown in FIG. 3, the charging roller 66 and the cleaning member 77 of the cleaning unit 60 are in contact with the outer circumferential surface of the drum 62. The cleaning member 77 has a rubber blade 77*a*, which is a blade-shaped elastic member made of rubber as an elastic material, and a support member 77*b* supporting the rubber blade. The rubber blade 77*a* substantially extends in the direction opposite to the rotation direction of the drum 62 and is in contact with the drum 62. That is, the rubber blade 77*a* is in contact with the drum 62 with its distal edge pointing toward the upstream side in the rotation direction R of the drum 62. The waste toner removed from the surface of the drum 62 by the cleaning member 77 is stored in the waste toner chamber 71*b* defined by the cleaning frame 71 and the cleaning member 77.

As shown in FIG. 3, a scooping sheet 65 for preventing waste toner from leaking from the cleaning frame 71 is provided at an edge of the cleaning frame 71 in contact with the drum 62. The charging roller 66 is rotationally attached to the cleaning unit 60 through charging roller bearings 67 located at opposite ends in the longitudinal direction of the cleaning frame 71. The longitudinal direction of the cleaning frame 71 (the longitudinal direction of the cartridge B) is substantially parallel to the direction in which the rotation axis of the drum 62 extends (axial direction). Hereinafter, the longitudinal direction and the axial direction therefore refer to the axial direction of the drum 62 unless otherwise specified. Urging members 68 press the charging roller bearings 67 toward the drum 62, thereby pressing the charging roller 66 against the drum 62. The charging roller 66 is driven and rotated by the rotation of the drum 62.

As shown in FIG. 3, the developing unit 20 includes the developing roller 32, a developer container 23 supporting the developing roller 32, and a development blade 42. The developing roller 32 is rotationally attached to the developer container 23 through bearing members 26 (FIG. 4) and 27 (FIG. 5) provided at opposite ends. The developing roller 32 contains the magnet roller 34. The developing unit 20 includes the development blade 42 for controlling the toner layer on the developing roller 32. As shown in FIGS. 4 and 5, spacing members 38 are attached to opposite ends of the developing roller 32. The spacing members 38 are brought into contact with the drum 62, so that the developing roller 32 is held with a small gap created between the developing roller 32 and the drum 62. As shown in FIG. 3, a spout prevention sheet 33 for preventing the toner from leaking from the developing unit 20 is provided at an edge of the developer container 23 and in contact with the developing roller 32. A transport member 43 is provided in the toner chamber 29 defined by the developer container 23 and a base member 22. The transport member 43 agitates the toner stored in the toner chamber 29 and transports the toner to the toner supply chamber 28.

As shown in FIGS. 4 and 5, the cartridge B is formed by combining the cleaning unit 60 and the developing unit 20. To join the developing unit 20 to the cleaning unit 60, the center of a first developing-side support boss 26*a* of the bearing member 26 is aligned with a first suspension hole 71*i* on the drive side of the cleaning frame 71, and the center of a second developing-side support boss 27*a* of the bearing member 27 is aligned with a second suspension hole 71*j* on the non-drive side. Specifically, the developing unit 20 is moved in the direction of arrow G so that the first and second developing-side support bosses 26*a* and 27*a* are fitted into the first and second suspension holes 71*i* and 71*j*. The developing unit 20 is thus movably connected to the cleaning unit 60. Specifically, the developing unit 20 is rotationally (pivotally) connected to the cleaning unit 60. That is, the developing roller 32 is coupled to the drum 62 so as to be movable toward and away from the drum 62. Then, the drum bearing 73 is coupled to the cleaning unit 60 to form the cartridge B.

In this embodiment, a non-drive-side urging member 46L (FIG. 5) and a drive-side urging member 46R (FIG. 4) are compression springs. The urging force of the springs allows the drive-side urging member 46R and the non-drive-side urging member 46L to urge the developing unit 20 to the cleaning unit 60, ensuring that the developing roller 32 is pressed in the direction of the drum 62. The present embodiment also includes the spacing members 38 at opposite ends of the developing roller 32. That is, the drum 62 is in contact with the developing roller 32 through the spacing members 38 with a predetermined contact pressure, so that the developing roller 32 is held with a predetermined gap created between the developing roller 32 and the drum 62. The relative positions of these components are thus determined.

Cartridge Attachment

Figure 6A:
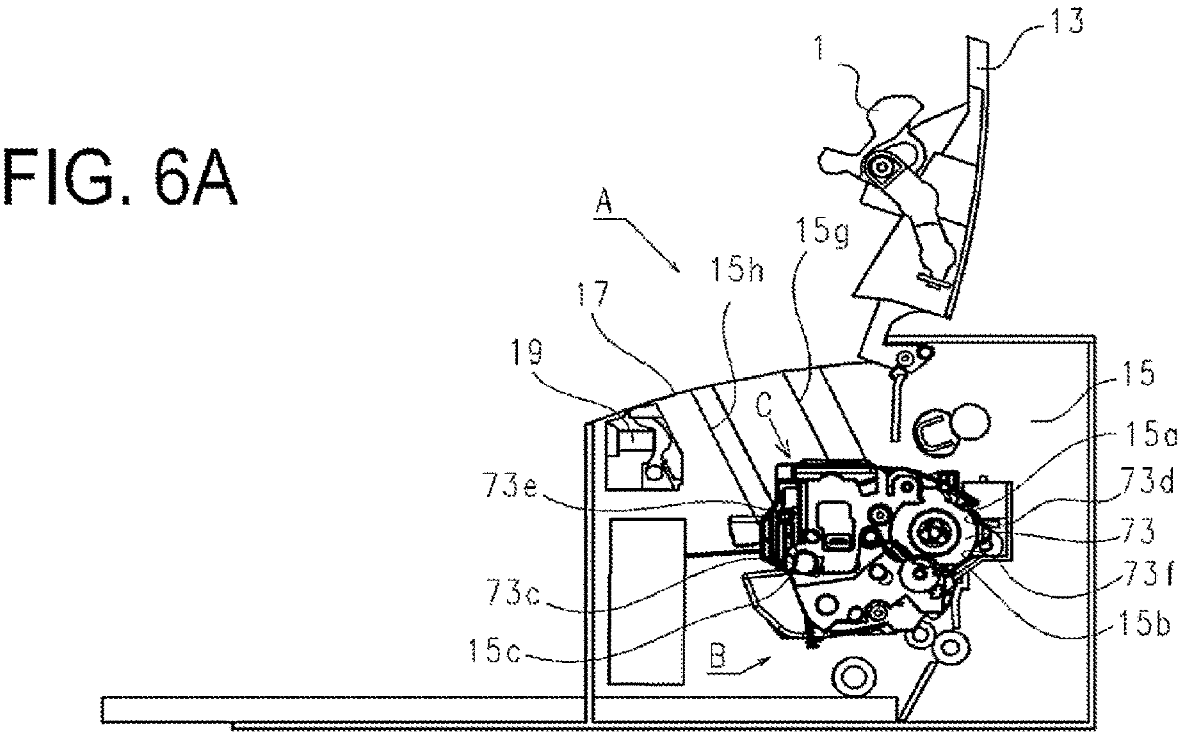
FIGS. 6A and 6B are cross-sectional views for illustrating the attachment of the cartridge of the first embodiment.
Figure 6B:
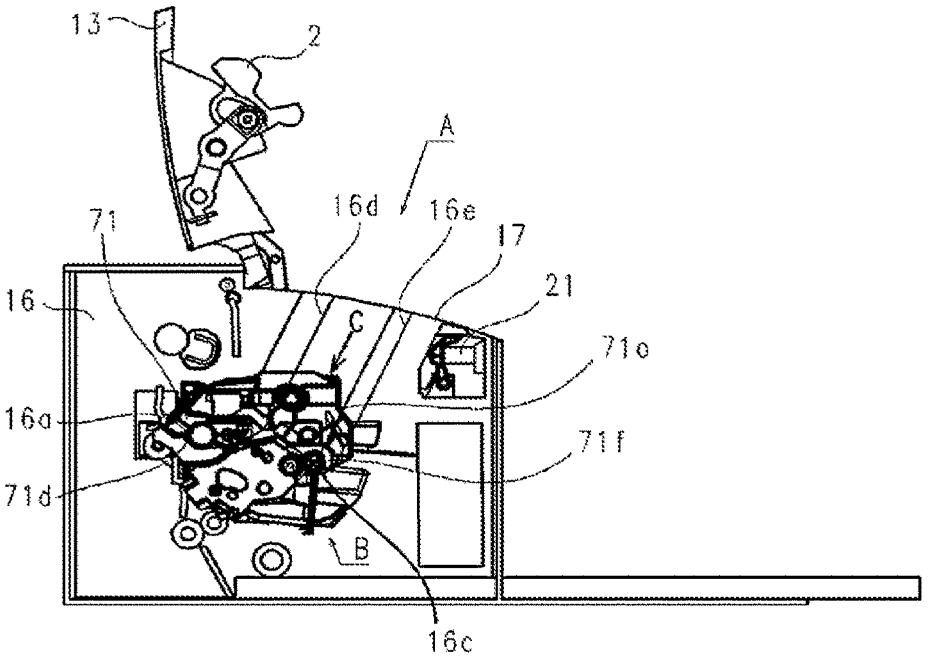
Figure 7A:
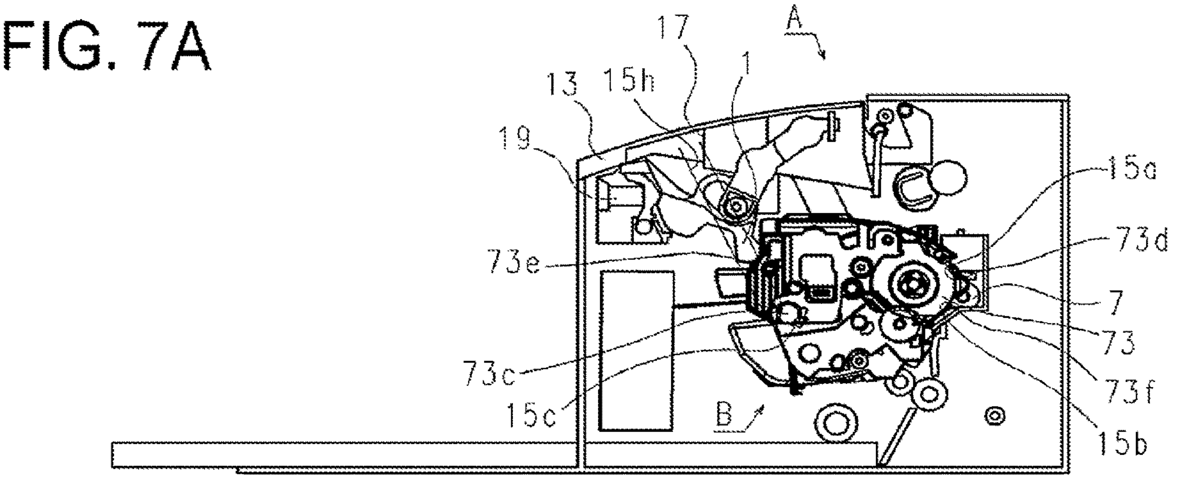
FIGS. 7A and 7B are cross-sectional views for illustrating the positioning of the cartridge of the first embodiment.
Figure 7B:
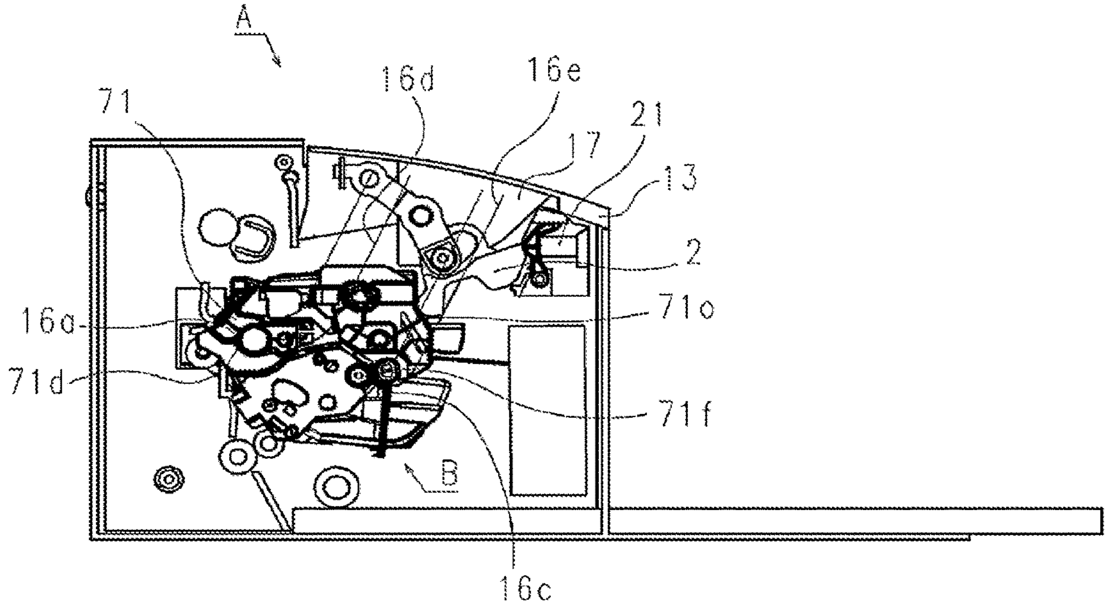

Referring to FIGS. 6A, 6B, 7A, and 7B, the attachment of the cartridge B is now specifically described. FIG. 6A is a cross-sectional view of the drive-side guide portion of the image forming apparatus A for illustrating the attachment of the cartridge B. FIG. 6B is a cross-sectional view of the non-drive-side guide portion of the image forming apparatus A for illustrating the attachment of the cartridge B. FIG. 7A is a cross-sectional view of the drive side of the image forming apparatus A for illustrating the positioning of the cartridge B. FIG. 7B is a cross-sectional view of the non-drive side of the image forming apparatus A for illustrating the positioning of the cartridge B.

The cartridge B is attached as follows. As shown in FIGS. 6A and 6B, a first drive-side plate 15 includes an upper guide rail 15*g* and a guide rail 15*h* as guides, and a non-drive-side plate 16 includes an upper guide rail 16*d* and a guide rail 16*e*. The drum bearing 73 provided on the drive side of the cartridge B has a rotation stop target portion 73*c*. The cartridge B is attached in a direction (arrow C) substantially perpendicular to the axis of the drum 62 (FIG. 3).

The cleaning frame 71 includes, on the non-drive side in the longitudinal direction, a positioning target portion 71*d* as a first positioning portion and a rotation stop target portion 71*f* as a second positioning portion. When the cartridge B is attached through a cartridge insertion slot 17 of the apparatus main body A, the guide rail 15*h* of the apparatus main body A guides the rotation stop target portion 73*c* of the cartridge B on the drive side of the cartridge B. On the non-drive side of the cartridge B, the guide rails 16*d* and 16*e* of the apparatus main body A guide the positioning target portion 71*d* and the rotation stop target portion 71*f* of the cartridge B. The cartridge B is thus attached to the apparatus main body A.

The closing of an opening/closing door 13 is now described. As shown in FIGS. 6A, 6B, 7A, and 7B, the first drive-side plate 15 has an upper positioning portion 15*a*, a lower positioning portion 15*b*, and a rotation stop portion 15*c* as positioning portions, and the non-drive-side plate 16 has a positioning portion 16*a* and an upper rotation stop portion 16*c*. The drum bearing 73 includes an upper positioning target portion (first positioning target portion, first protrusion, first bulging portion) 73*d* and a lower positioning target portion (second positioning target portion, second protrusion, second bulging portion) 73*f*.

Cartridge pressing members 1 and 2 are rotationally attached to opposite axial ends of the opening/closing door 13. Cartridge pressing springs 19 and 21 are attached to the longitudinal ends of the front plate of the image forming apparatus A. The drum bearing 73 has a pressing target portion 73*e* as an urging force receiving portion, and the cleaning frame 71 has a pressing target portion 710 on the non-drive side (see FIG. 3). When the opening/closing door 13 is closed, the cartridge pressing members 1 and 2 urged by the cartridge pressing springs 19 and 21 of the apparatus main body A press the pressing target portions 73*e* and 710 of the cartridge B (see FIGS. 7A and 7B).

As a result, on the drive side, the upper positioning target portion 73*d*, the lower positioning target portion 73*f*, and the rotation stop target portion 73*c* of the cartridge B are fixed to the upper positioning portion 15*a*, the lower positioning portion 15*b*, and the rotation stop portion 15*c*, respectively, of the apparatus main body A. The cartridge B and the drum 62 are thus positioned on the drive side. Likewise, on the non-drive side, the positioning target portion 71*d* and the rotation stop target portion 71*f* of the cartridge B are fixed to the positioning portion 16*a* and the rotation stop portion 16*c*, respectively, of the apparatus main body A. The cartridge B and the drum 62 are thus positioned on the non-drive side.

The above description of an example of the configuration for positioning the cartridge B relative to the apparatus main body A is not intended to limit the means for positioning. A configuration may be used that directly acts on the positioning target portion 73*d* and the rotation stop target portion 73*f* on the drive side of the cartridge B, and the positioning target portion 71*d* and the rotation stop target portion 71*f* on the non-drive side to fix the positioning portions.

Figure 8A:
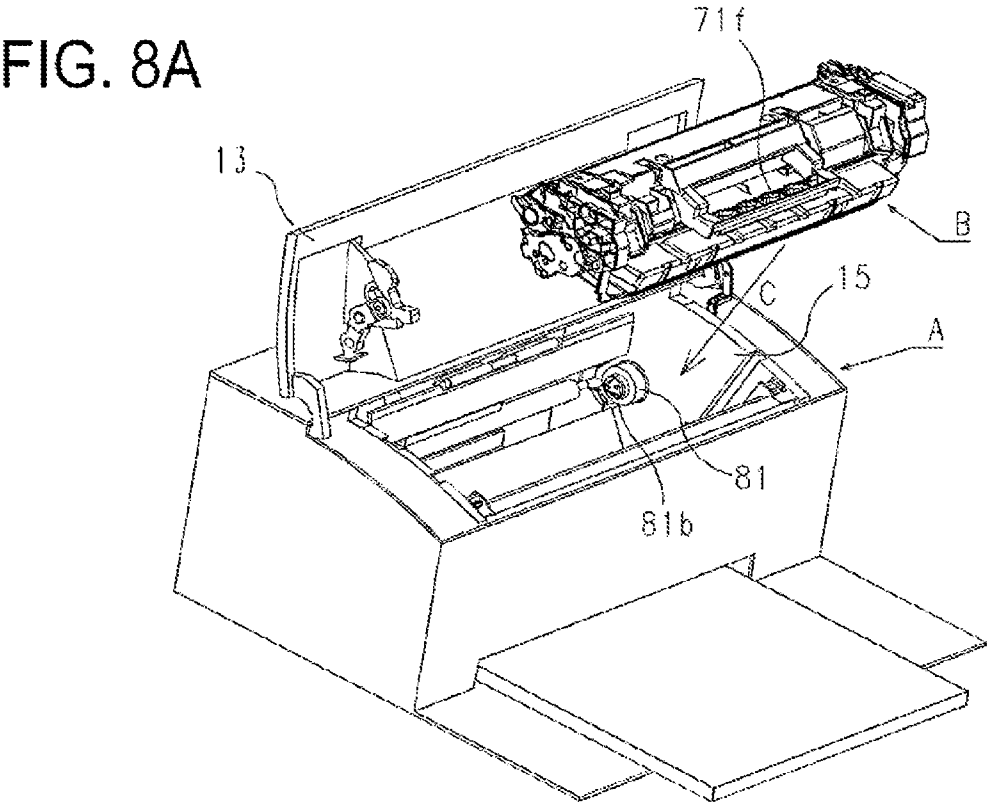
FIGS. 8A to 8D are perspective views for illustrating the attachment and detachment of the cartridge of the first embodiment.
Figure 8B:
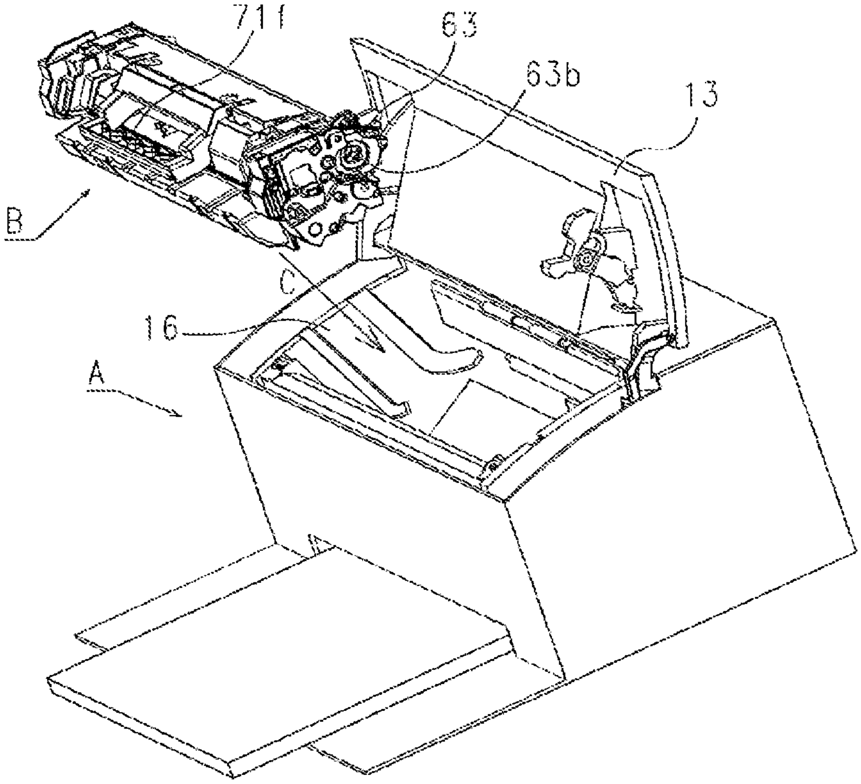
Figure 8C:
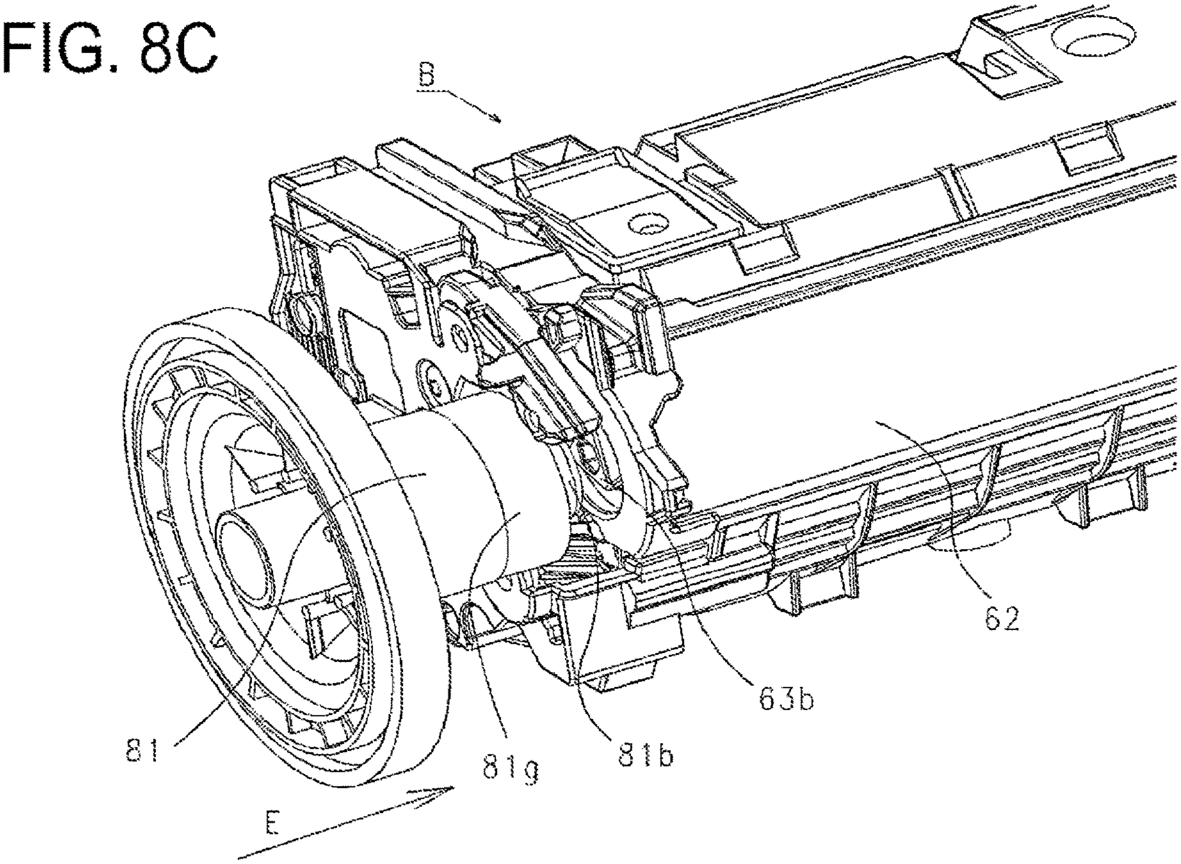
Figure 8D:
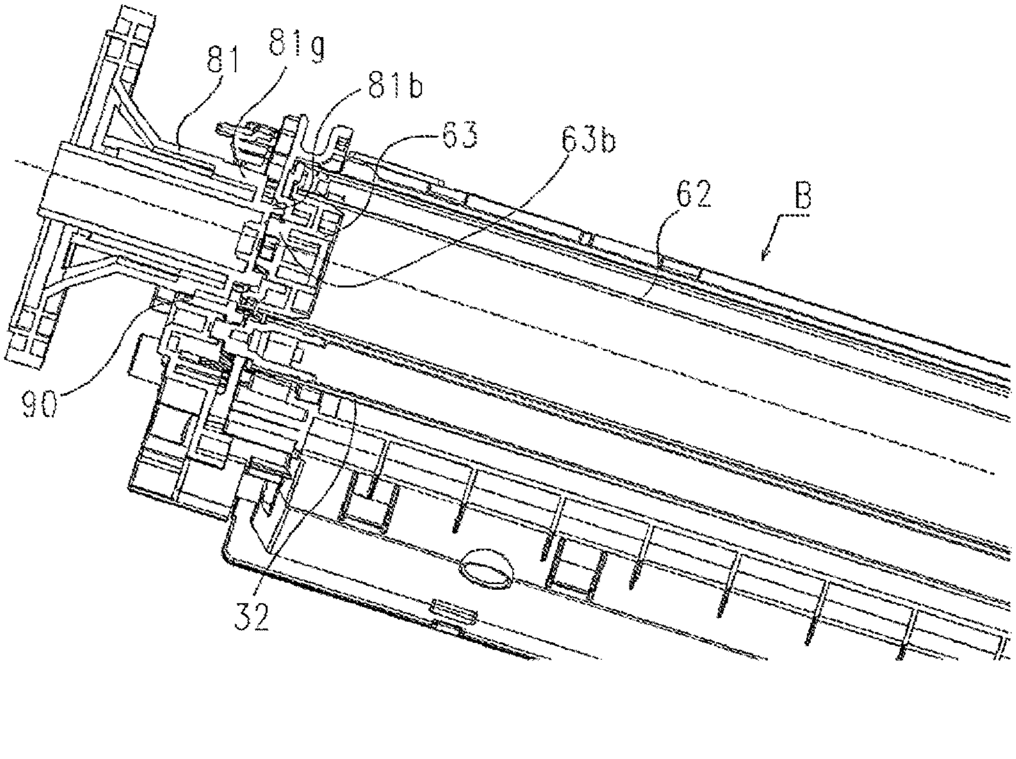

Referring to FIGS. 8A, 8B, 8C, and 8D, the configuration in which the cartridge B receives a driving force from the apparatus main body A is now described. FIG. 8A is a diagram showing the configuration of a drive portion of the apparatus main body A. FIG. 8B is a diagram showing the configuration of a drive portion of the cartridge B. FIG. 8C is a diagram showing a state before the drive portions of the apparatus main body A and the cartridge B are engaged. FIG. 8D is a diagram showing a state in which the power of the apparatus main body A is turned on and the drive portions of the apparatus main body A and the cartridge B are engaged.

As shown in FIG. 8A, the apparatus main body A includes a drive transmission member 81, which receives a driving force from a driving source (not shown) of the apparatus main body A and transmits the driving force to the cartridge B. As shown in FIG. 8B, the cartridge B includes a driven portion 63*b* in the drive-side drum flange 63 to engage with the drive transmission member 81 and receive the driving force. When the opening/closing door 13 is closed and the power of the apparatus main body A is turned on, the drive transmission member 81 moves in the direction of arrow E in FIG. 8C. Then, as shown in FIG. 8D, a drive transmission portion 81*b* of the drive transmission member 81 engages with the driven portion 63*b* of the drive-side drum flange 63, and the drum 62 is rotated through the drive-side drum flange 63. The outer circumference of the drive transmission member 81 has a gear shape 81*g*. Additionally, a developing roller gear 90 is coupled to an end of the developing roller 32 of the cartridge B. When the driven portion 63*b* of the drive-side drum flange 63 is engaged as shown in FIG. 8D, the gear shape 81*g* on the drive transmission member 81 and the developing roller gear 90 are arranged so as to mesh with each other. That is, when the drive transmission member 81 rotates the drum 62 through the drive-side drum flange, the developing roller 32 also rotates simultaneously through the developing roller gear 90.

Development Contact Configuration

Figure 1:
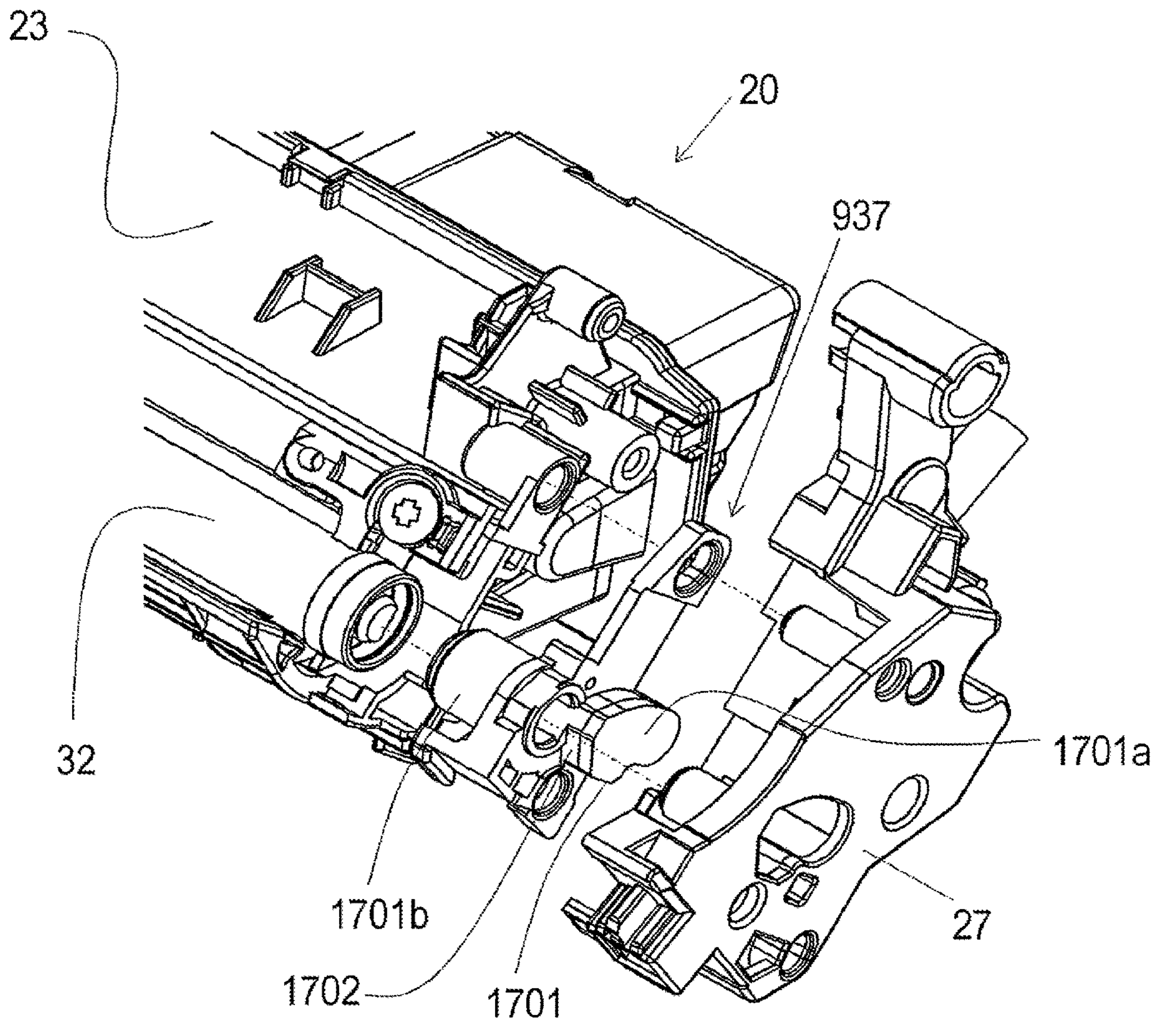
FIG. 1 is an exploded view of a development contact configuration according to a first embodiment.
Figure 9:
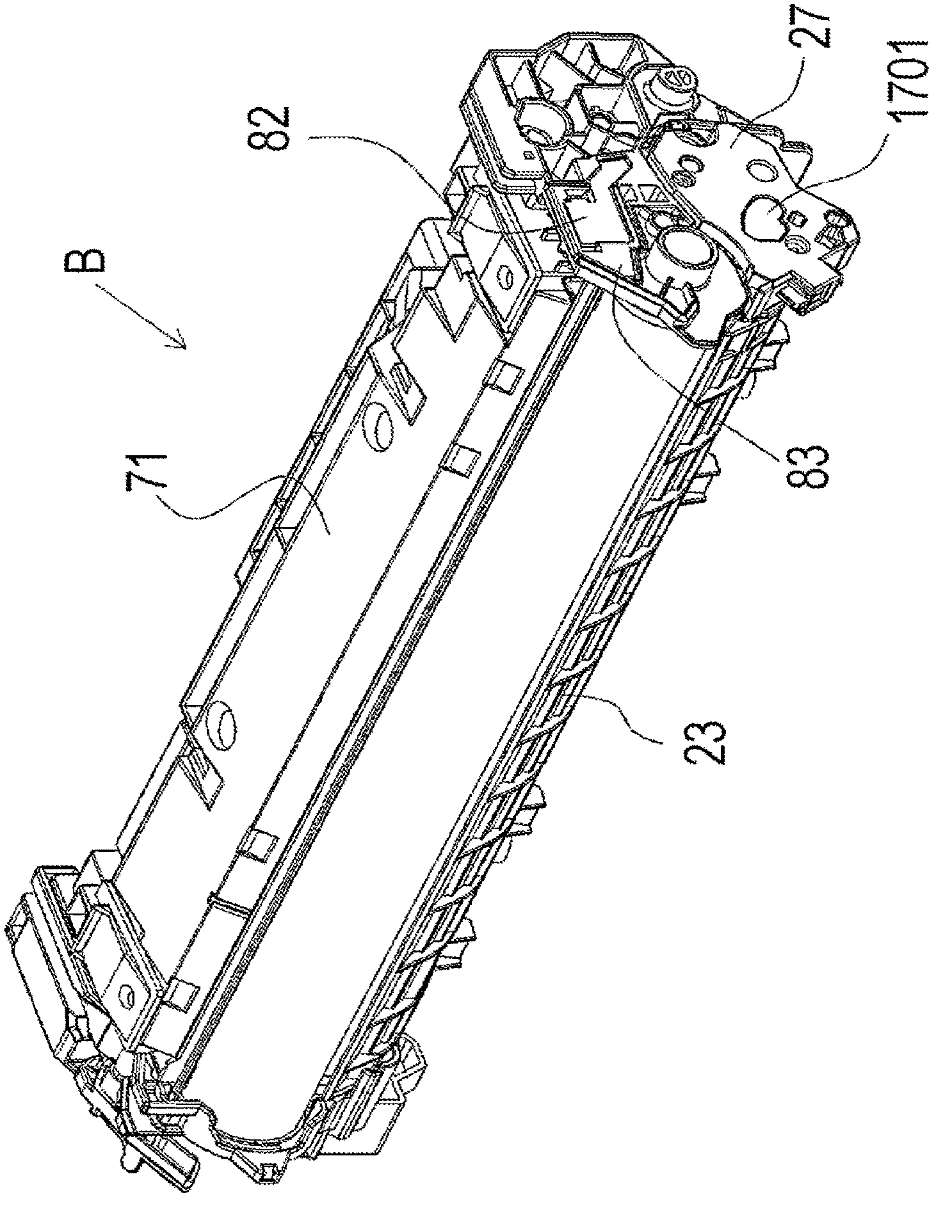
FIG. 9 is a perspective view illustrating the configuration of the cartridge of the first embodiment.
Figure 11A:
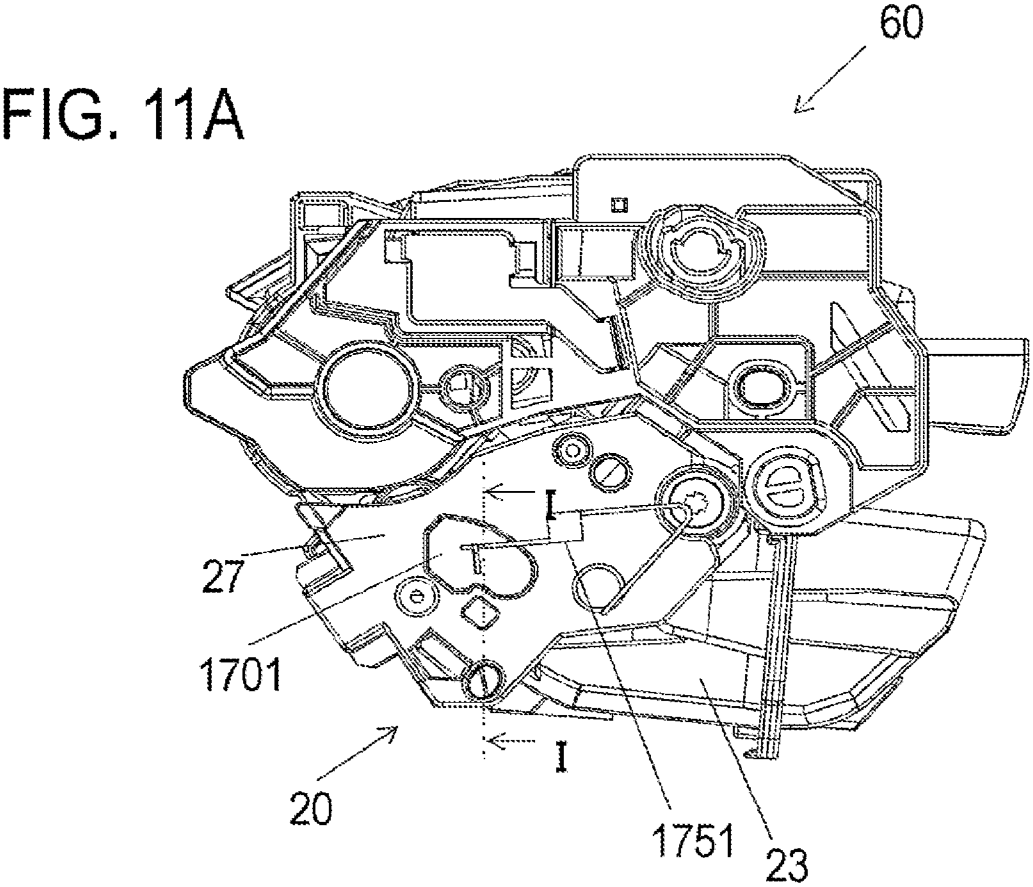
FIGS. 11A and 11B are diagrams illustrating the development contact configuration of the cartridge of the first embodiment.
Figure 11B:
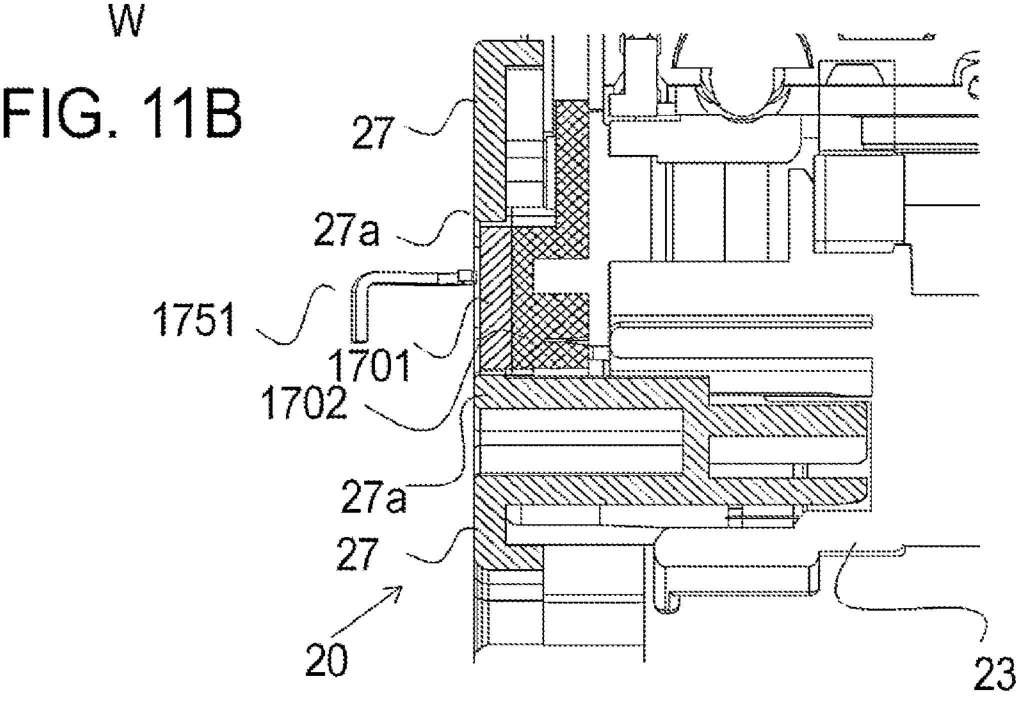

Referring to FIGS. 1, 9, 11A, and 11B, the development contact configuration, which is a feature of the present embodiment, of the cartridge B is now described. FIG. 1 is an exploded perspective view of the developing unit 20 showing the key components of the development contact configuration extracted. FIG. 9 is a perspective view of the cartridge B, FIG. 11A is a side view of the cartridge B for illustrating the development contact configuration, and FIG. 11B is an enlarged cross-sectional view of the area around the development contact taken along line I-I in FIG. 11A.

As shown in FIG. 1, the developing unit 20 includes a developer container 23, which serves as a first frame (a first member), and a developing roller 32, which serves as a process unit. The developer container 23 is made of a material (a first resin material) having a density of about 0.95 to 1.10 g/cm$^3$ and a flame retardancy of HB according to the UL94 standard. It is known that adding an additive to a resin material, which generally has the property of igniting in contact with flame, can render the resin flame retardant. When an additive is added to one type of resin material, a higher flame-retardant effect results in a greater specific gravity of the resin. This causes a problem that the weight of the necessary resin material in the entire product is increased, causing a greater load on the environment. In this embodiment, the developer container 23 is made of a material that is free of such an additive and has a low density. The developing roller 32 has the function of carrying developer by receiving a predetermined bias. The developing roller 32 is rotationally supported as a rotating member by the developer container 23 through the bearing member 26 (see FIG. 4) on the drive side and a conductive bearing member 937 and the bearing member 27 on the non-drive side.

The flame retardant capability is now described. In the present embodiment, the UL94 standard is used to assess the flame retardant capability. To assess the flame retardant capability of a resin, such as a plastic, it is first determined whether the material is self-extinguishing. The burning tests according to the UL94 standard generally include a horizontal burning test for resin materials that are not self-extinguishing, and vertical burning tests for resin materials that are self-extinguishing. Examples of resin materials for the horizontal burning test include HB materials. Examples of resin materials for the vertical burning tests include SVA, SVB, V-0, V-1, and V-2 materials. As the measures for the grades according to the UL94 standard, a material that passes the horizontal burning test for HB materials needs to exhibit a slow-burning property even though it is not self-extinguishing and have a burning rate of 40 mm/min or less when the test sample has a thickness of 3 mm or more. As for the vertical burning tests, a V-0 material needs to have a burning time of 10 seconds or less when a flame is applied to the test sample twice for 10 seconds each, and V-1 and V-2 materials need to have a burning time of 30 seconds or less when a flame is applied to the test sample twice for 10 seconds each. Here, the shorter the burning time, the harder it is to burn. That is, "high flame retardant capability" in this embodiment not only indicates a difference in flame retardant grade but also indicates a shorter burning time in the same burning test.

Other than the UL94 standard, the oxygen index according to the JIS standard may be used. The oxygen index is an index indicating the minimum oxygen concentration in percentage required for an ignited resin material to keep burning. A greater oxygen index indicates higher flame retardant capability. For example, the oxygen index is about 15 to 19 with an HB material, about 24 to 25 with a V-2 material, about 25 to 29 with a V-1 material, and about 29 or more with a V-0 material.

As shown in FIGS. 1, 11A, and 11B, the conductive bearing member 937 includes a spring contact 1751, which is a power supply member of the image forming apparatus and functions to apply a predetermined bias to the developing roller 32, and a conductive portion 1701, which is an electrode member made of a conductive resin. The spring contact 1751 and the conductive portion 1701 form an electrically conductive path between the apparatus main body and the developing roller 32.

As shown in FIG. 1, the conductive bearing member 937 includes the conductive portion 1701 and a non-conductive portion 1702 as a second frame (a second member), which are integrally formed. The non-conductive portion 1702 is made of a material (a second resin material) that has a density of about 1.12 to 1.50 g/cm$^3$ and a flame retardancy of V-1 according to the UL94 standard, that is, has higher flame retardant capability than the developer container 23. As shown in FIGS. 11A and 11B, the conductive portion 1701 includes a contact section 1701*a* exposed outward to be in contact with the spring contact 1751, which is a power supply member of the image forming apparatus, to receive power, and a conductive support section 1701*b*, which serves as a shaft support section that rotationally supports the developing roller 32.

Figure 13A:
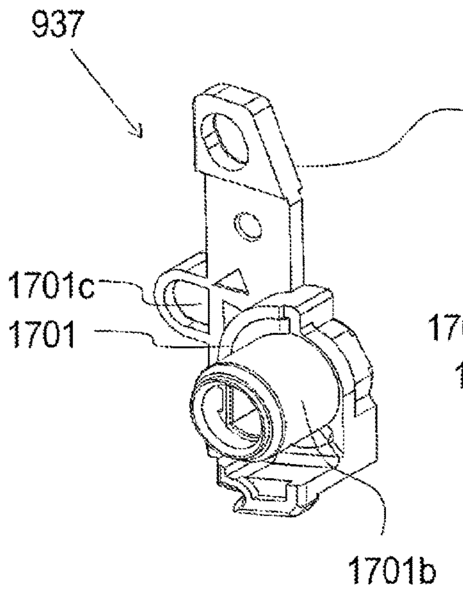
FIGS. 13A to 13D are perspective views illustrating a conductive bearing member of the first embodiment.
Figure 13B:
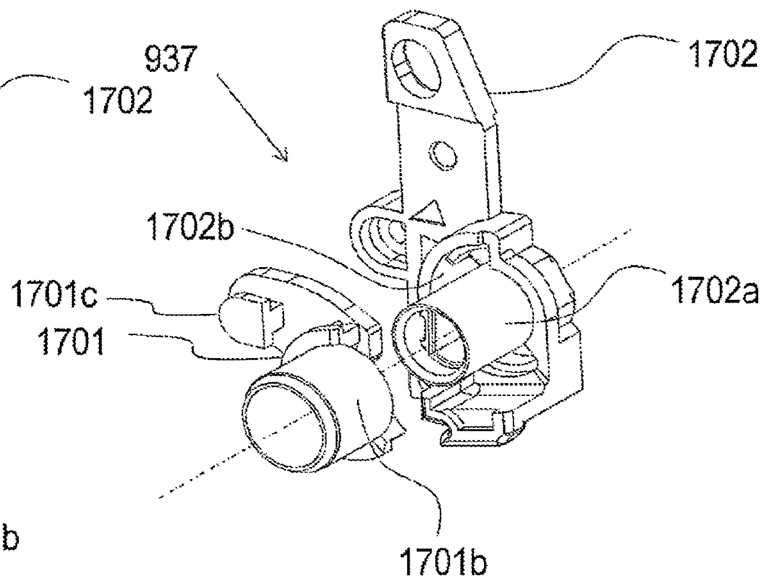
Figure 13C:
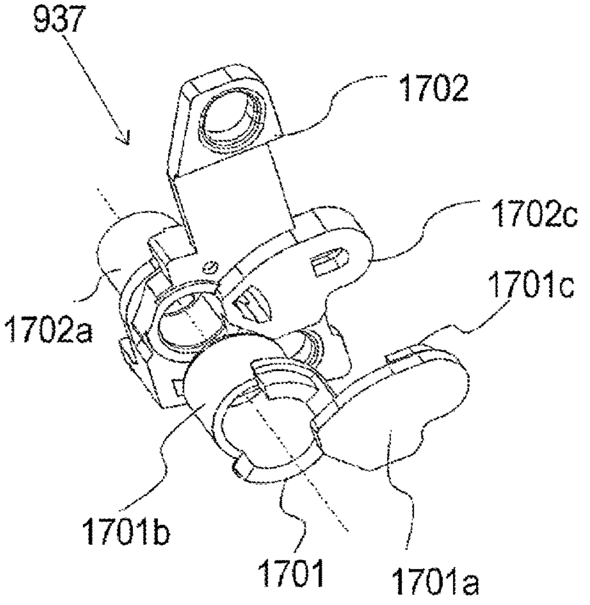

FIGS. 13A to 13B are diagrams for illustrating the details of the conductive bearing member 937. FIGS. 13B and 13C are exploded views in which the conductive portion 1701 and the non-conductive portion 1702 are displaced in the longitudinal direction. Although FIGS. 13B and 13C show the conductive portion 1701 and the non-conductive portion 1702 arranged side by side in the longitudinal direction, these portions are not configured to be integrated by fitting to each other in the longitudinal direction. In this embodiment, the conductive portion 1701 and the non-conductive portion 1702 are formed by two-color molding, and the conductive portion 1701 has a section that is shaped to spread on one side of the non-conductive portion 1702 in the longitudinal direction and a section that is shaped to spread on the other side. For example, the contact section 1701*a* and the conductive support section 1701*b* are sections of the conductive portion 1701 that are formed on opposite sides of the non-conductive portion 1702 in the longitudinal direction. That is, FIGS. 13B and 13C are imaginary views that show the conductive portion 1701 and the non-conductive portion 1702 displaced in the longitudinal direction to clarify their configurations (especially the parts of the configurations that are invisible from the outside when these portions are integrated). FIG. 13A shows a state in which the conductive portion 1701 and the non-conductive portion 1702 are integrated.

As shown in FIG. 13C, the non-conductive portion 1702 has an electrode seating surface 1702*c*, which is opposed to the contact section 1701*a* in the longitudinal direction and extends in a direction perpendicular to the longitudinal direction.

The contact section 1701*a* of the conductive portion 1701 is closer to the non-conductive portion 1702 than to the developer container 23 and in contact with the non-conductive portion 1702. For example, if an incident such as anomalies in the high voltage power source of the apparatus main body A causes an electric discharge between the spring contact 1751, which serves as the power supply portion, and the contact section 1701*a*, this may create an electric ignition source. In this respect, the present configuration has the non-conductive portion 1702 with high flame retardant capability in contact with the contact section 1701*a*. If any ignition occurring in the contact section 1701*a* is about to spread the fire to the non-conductive portion 1702, the non-conductive portion 1702 generates nonflammable gas from the inside of its material and carbonizes the resin surface to stop the spreading of the fire to the inside of the resin, thereby facilitating self-extinguishing. As a result, even when the contact section 1701*a* of the conductive portion 1701 is located near the developer container 23, the spreading of fire to the developer container 23 can be prevented since the contact section 1701*a* is closer to the non-conductive portion 1702 than to the developer container 23. The term "vicinity" used herein refers to a range that is affected by ignition originating from an electric ignition source caused by electric discharge occurring between the power supply portion and the contact section due to anomalies or the like.

That is, in the cartridge B of this embodiment, the developer container 23 is made of an HB material that is a low-density resin material to reduce the overall weight of the product, while a highly flame-retardant V-1 material is used in the vicinity of the connection section, which serves as an electrically conductive path, between the apparatus main body A and the cartridge B. This provides the cartridge B that achieves both the safety and weight reduction of the entire product.

Additionally, the bearing member 27, which serves as a third frame (a third member), holds the conductive bearing member 937 and is fastened to the developer container 23. This bearing member 27 is made of a material that has a density of about 1.12 to 1.50 g/cm$^3$ and a flame retardancy of V-1 according to the UL94 standard. Furthermore, as shown in FIG. 11B, the bearing member 27 is adjacent to the conductive portion 1701 and has a protruding section 27*a* that protrudes beyond the electrode seating surface 1702*c* (see FIG. 13C) of the non-conductive portion 1702 in the longitudinal direction W. That is, the bearing member 27 has the protruding section 27*a* formed so as to shield the electrode seating surface 1702*c* of the non-conductive portion 1702 from the outside. For example, anomalies in the high voltage power source of the apparatus main body A or other factors may cause an electric discharge between the spring contact 1751, which serves as a power supply portion, and the contact section 1701*a* of the conductive portion 1701, resulting in electric ignition. At this time, even if ignition occurs in the area from the contact section 1701*a* of the conductive portion 1701 to the electrode seating surface 1702*c* of the non-conductive portion 1702 in the longitudinal direction W, the protruding section 27*a* contains the nonflammable gas generated from the non-conductive portion 1702 and the bearing member 27. This further facilitates the self-extinguishing of the non-conductive portion 1702, so that the spreading of fire can be stopped at the electrode seating surface 1702*c*. Accordingly, the safety can be further improved.

In terms of the containment of the nonflammable gas and the suppression of fire spreading, the protruding section 27*a* is preferably configured to protrude so as to completely surround the periphery (outer circumference) of the electrode seating surface 1702*c*. However, the protruding section 27*a* may have any of various configurations as long as it provides a certain effect. Since fire tends to spread upward in the vertical direction, the effect of preventing fire spreading can be achieved by arranging the protruding section 27*a* so as to obstruct the space between the electrode seating surface 1702*c* and the developer container 23, which is the first frame, at least above the electrode seating surface 1702*c* in the vertical direction. That is, the protruding section of the present invention can have the effect of suppressing the spreading of fire when ignition occurs, as long as the protruding section at least has a section extending above the contact section in the vertical direction. It should be apparent that the same applies to the configurations of the other protruding sections described below.

FIGS. 13A to 13D are perspective views for illustrating the configuration of the conductive bearing member 937 in detail. FIG. 13A shows the conductive bearing member 937 in which the conductive portion 1701 and the non-conductive portion 1702 are integrally molded. FIGS. 13B and 13C are imaginary views showing the conductive portion 1701 and the non-conductive portion 1702 of the conductive bearing member 937 displaced in the longitudinal direction for illustration purpose.

Figure 13D:
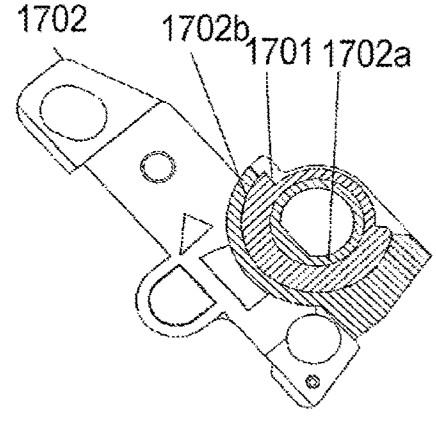

As shown in FIG. 13B, the conductive portion 1701 and the non-conductive portion 1702 of the conductive bearing member 937 are made of different resin materials and formed integrally. The conductive portion 1701 has a conductive support section 1701*b* that supports the inner circumference portion of the developing roller 32, which is a rotating member. Referring to FIG. 13D, which shows a cross section of FIG. 13A, the non-conductive portion 1702 has an inner circumference support section 1702*a* and an outer circumference support section 1702*b* for supporting the conductive portion 1701. The inner circumference support section 1702*a* and the outer circumference support section 1702*b* support the cylindrical conductive support section 1701*b* of the conductive portion 1701 so as to sandwich it from both the inner circumference side and the outer circumference side. This limits the tilting of the conductive support section 1701*b* relative to the non-conductive portion 1702 even when a gap is created between the conductive portion 1701 and the non-conductive portion 1702 due to the difference in heat expansion rate of the materials. The developing roller 32 can therefore rotate stably.

Figure 14:
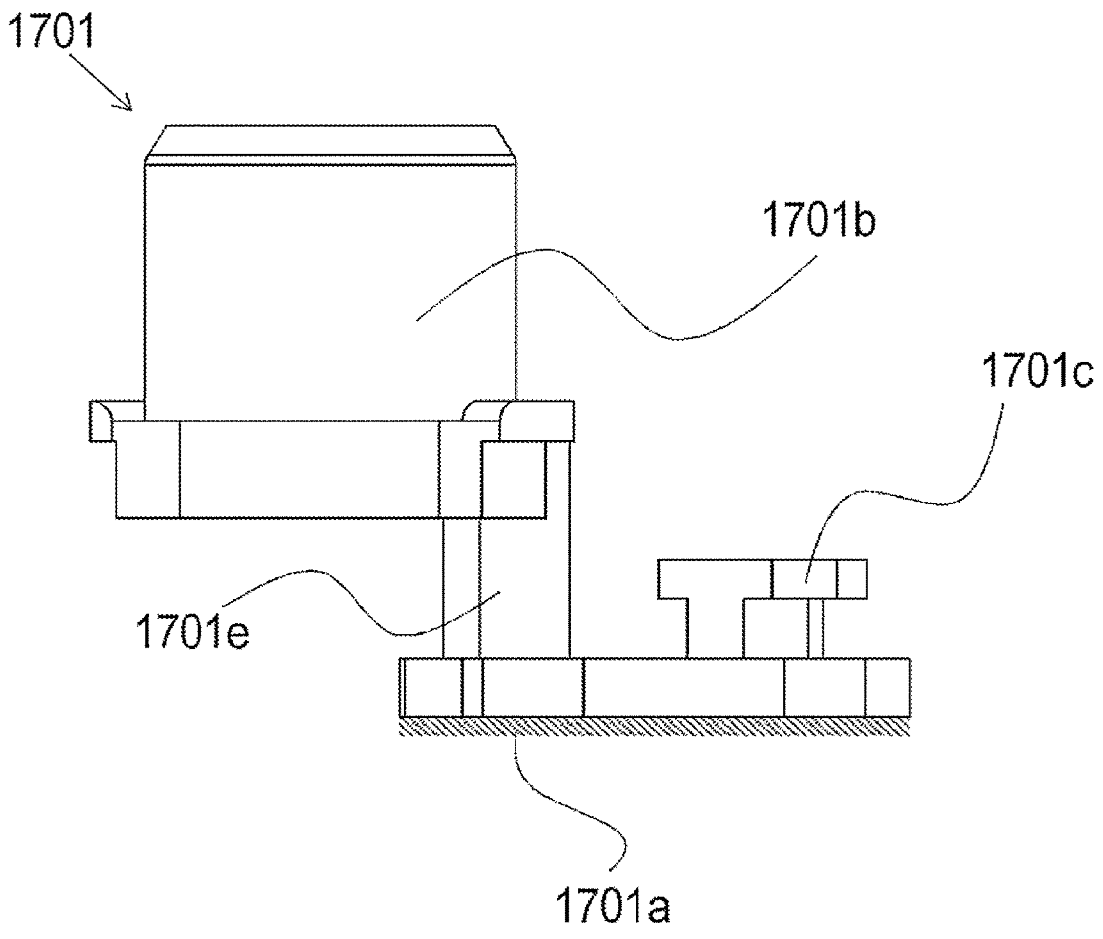
FIG. 14 is a side view illustrating a conductive portion of the first embodiment.

FIG. 14 is an enlarged view for illustrating the configuration of the conductive portion 1701 in detail. The conductive portion 1701 includes a connection section 1701*e* for connecting the contact section 1701*a* and the conductive support section 1701*b*. As described above, the conductive portion 1701 and the non-conductive portion 1702 are formed by two-color molding, and the conductive portion 1701 has a section that is formed by the resin that has spread on one side of the non-conductive portion 1702 in the longitudinal direction and a section that is formed by the resin that has spread on the other side in the molding. The connection section 1701*e* is the section that connects the section that is shaped to spread on one side of the non-conductive portion 1702 in the longitudinal direction, which is the contact section 1701*a*, and the section that is shaped to spread on the other side, which is the conductive support section 1701*b*. In the two-color molding of the conductive portion 1701, resin is injected through a gate section 1701*c*, which serves as the injection port, into the cavity in the order of the contact section 1701*a*, the connection section 1701*e*, and the conductive support section 1701*b*. In this configuration, as viewed in a direction perpendicular to a plane including the contact section 1701*a*, the conductive portion 1701 is shaped such that the gate section 1701*c* and the connection section 1701*e* overlap (overlap and are included in) the contact section 1701*a*. Furthermore, as viewed in the same direction, the contact section 1701*a* and the conductive support section 1701*b* partially overlap each other. That is, the resin injection path from the gate section 1701*c* to the conductive support section 1701*b* is shorter than that in a configuration in which the injection path bypasses and extends outside the non-conductive portion 1702, for example. This reduces the amount of resin material used to form the conductive portion 1701. Consequently, in case of any ignition of the contact section 1701*a*, the spreading of fire along the conductive resin can be reduced, increasing the safety of the contact configuration.

In this embodiment, polystyrene (PS) is used for the developer container 23 as the first frame. A mixed resin of polycarbonate and acrylonitrile butadiene styrene (PC-ABS) is used for the non-conductive portion 1702 as the second frame and the bearing member 27 as the third frame. A conductive polyacetal (POM) is used for the conductive portion 1701 as the resin electrode member. However, these materials are not limited to those of the present embodiment.

Charging Contact Configuration

Figure 10:
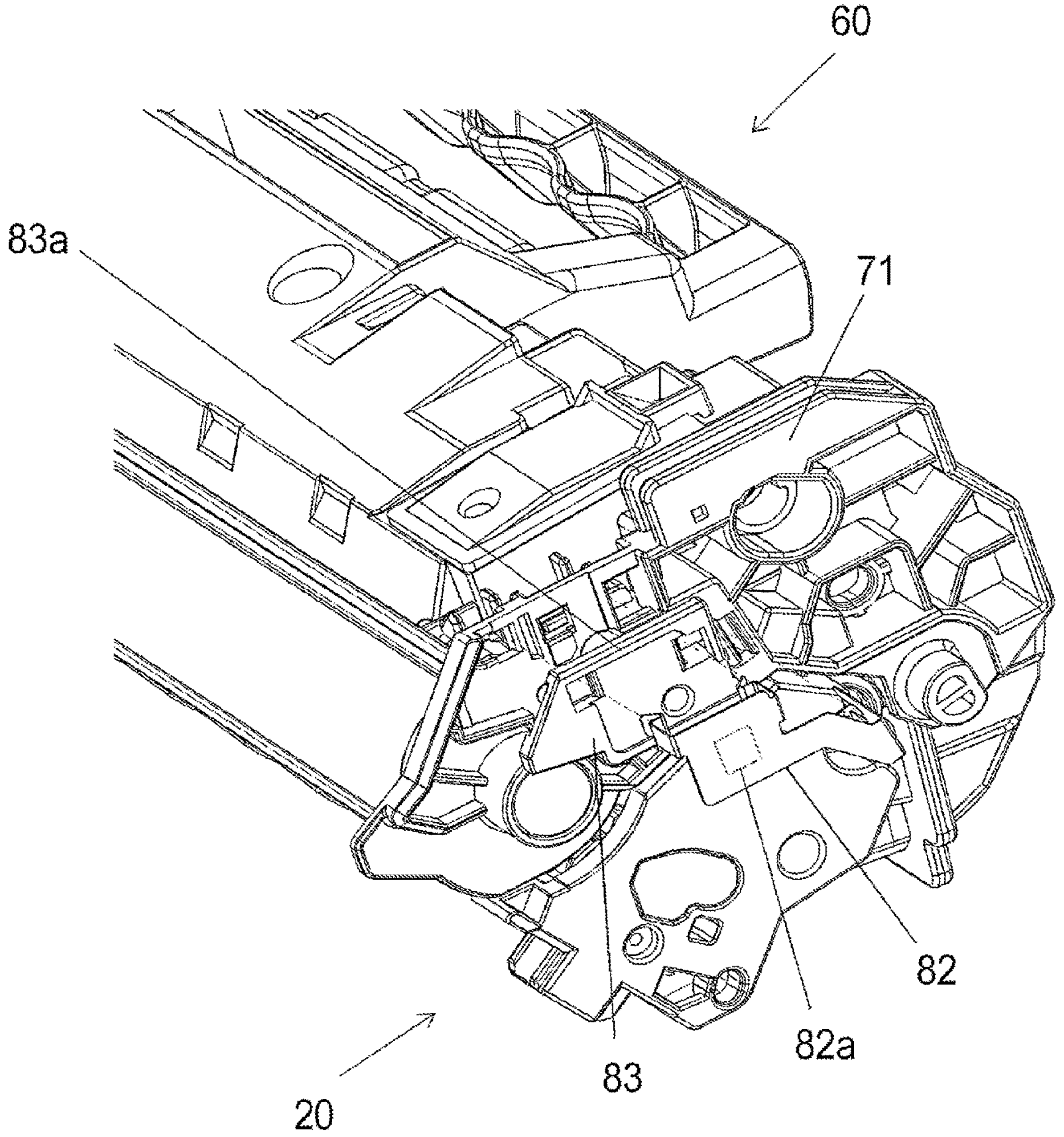
FIG. 10 is a diagram illustrating the charging contact configuration of the cartridge of the first embodiment.
Figure 12A:
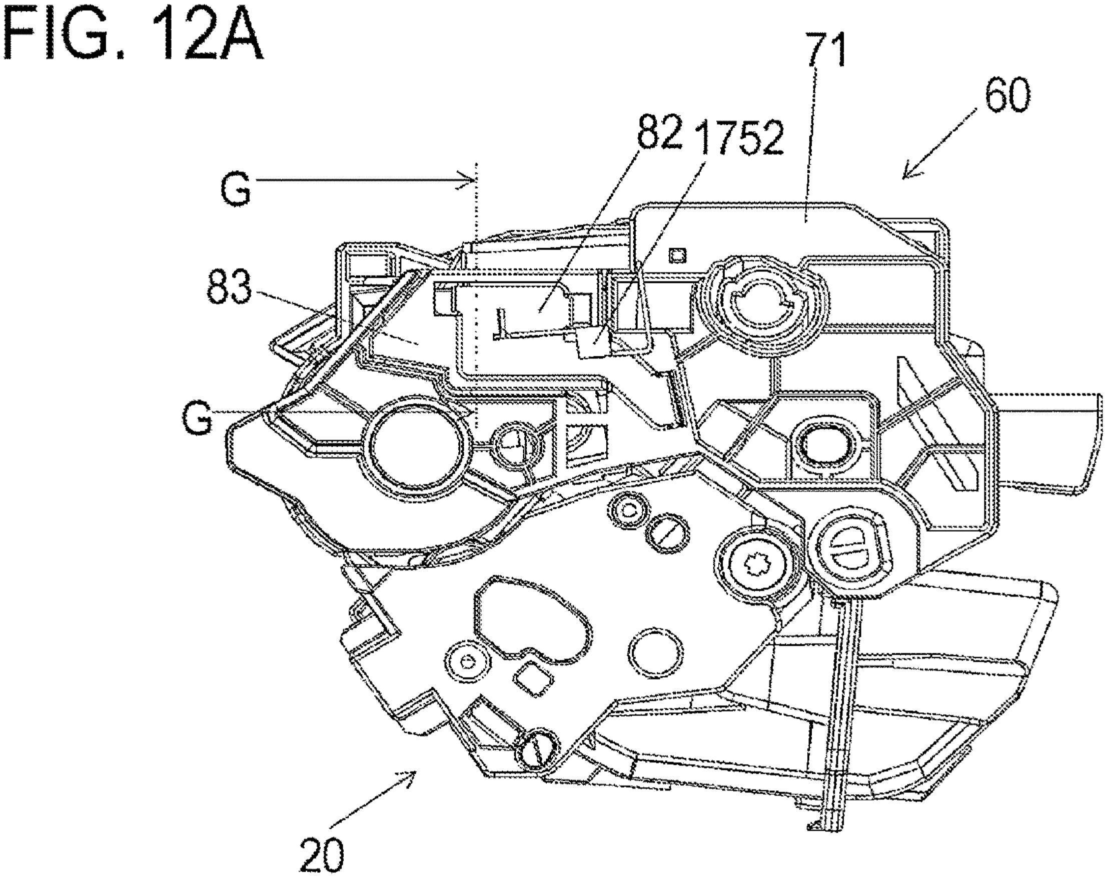
FIGS. 12A and 12B are diagrams illustrating the charging contact configuration of the cartridge of the first embodiment.
Figure 12B:
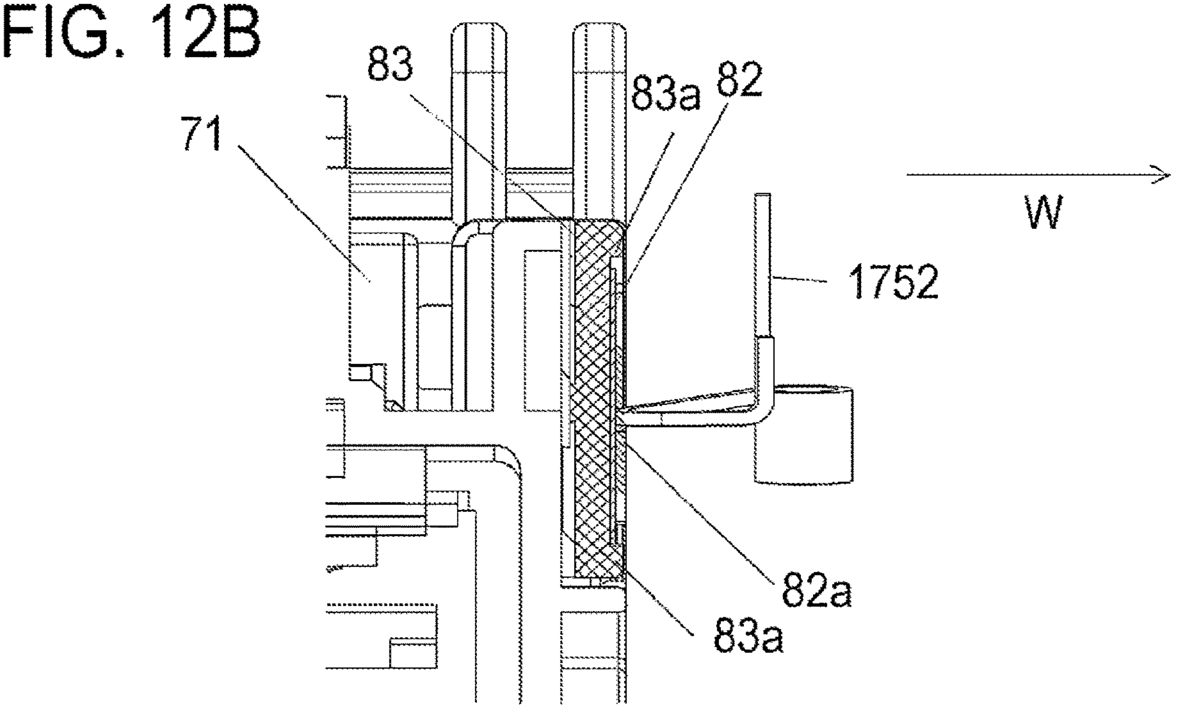

Referring to FIGS. 10, 12A, and 12B, the charging contact configuration, which is a feature of the present embodiment, is now described in detail. FIG. 10 is an exploded perspective view showing the key components of the charging contact configuration extracted. FIG. 12A is a side view for illustrating the charging contact configuration. FIG. 12B is an enlarged cross-sectional view of the charging contact taken along line G-G in FIG. 12A.

As shown in FIG. 10, the cleaning unit 60 has a cleaning frame 71, which serves as a first frame. As shown in FIG. 3, the charging roller 66, which serves as a process unit, is provided inside the cleaning frame 71. As shown in FIG. 10, an electrode plate 82, which electrically connects the charging roller 66 to the apparatus main body, is attached to the side surface of the cleaning frame 71 on the non-drive side. The cleaning frame 71 is made of a material having a density of about 0.95 to 1.10 g/cm$^3$ and a flame retardancy of HB according to the UL94 standard. The cleaning frame 71 supports the charging roller 66 as a rotational rotating member through the charging roller bearing 67. The charging roller 66 rotates while receiving a predetermined bias to uniformly charge the surface of the photosensitive drum 62. To apply the predetermined bias to the charging roller 66, the cleaning unit 60 includes an electrode plate 82, which is an electrode member made of metal, as an electrically conductive path from the image forming apparatus A to the charging roller 66. The electrode plate 82 has a contact surface 82*a* exposed outward to receive power from a spring contact 1752, which is a power supply member provided in the image forming apparatus.

The cleaning unit 60 also includes a contact cover 83, which serves as a second frame and is made of a material that has a density of about 1.12 to 1.50 g/cm$^3$ and a flame retardancy of V-1 according to the UL94 standard, that is, has higher flame retardant capability than the cleaning frame 71. As shown in FIG. 12B, a part of the contact cover 83, which is a contact protection member, has a protruding section 83*a* protruding in the longitudinal direction W beyond the contact surface 82*a*. For example, when a bias is applied in a state in which combustible foreign matter, such as dust, is caught between the spring contact 1752 and the contact surface 82*a* of the electrode plate 82, the foreign matter may ignite due to tracking. In such a case, the protruding section 83*a*, which is made of a highly flame-retardant material, functions as a fire-spreading prevention wall, preventing the fire from spreading to the inside of the cartridge B including the cleaning frame 71.

That is, in the cartridge B of the present embodiment, the cleaning frame 71 is made of an HB material that is a low-density resin material to reduce the overall weight of the product. On the other hand, the protruding section 83*a*, which is made of a highly flame-retardant V-1 material, is arranged between the cleaning frame 71 and the connection section, which is an electrically conductive path, between the apparatus main body A and the cartridge B. This provides the cartridge B that achieves both the safety and weight reduction of the entire product.

In this embodiment, the cleaning frame 71 as the first frame uses PS, the contact cover 83 as the second frame uses PC-ABS, and the electrode plate 82 as the metal electrode member uses stainless steel. However, these materials are not limited to those of the present embodiment.

In the present embodiment, the process cartridge B is formed by integrating the developing unit 20 and the cleaning unit 60. However, the configuration of the cartridge according to the present invention is not limited to the configuration of the present embodiment. For example, in an apparatus configuration in which the developing unit 20 and the cleaning unit 60 can be independently attached to and detached from the apparatus main body, each unit may correspond to the cartridge according to the present invention. The same applies to the embodiments described below.

Another embodiment of the above-mentioned charging contact configuration is now described.

Figure 34A:
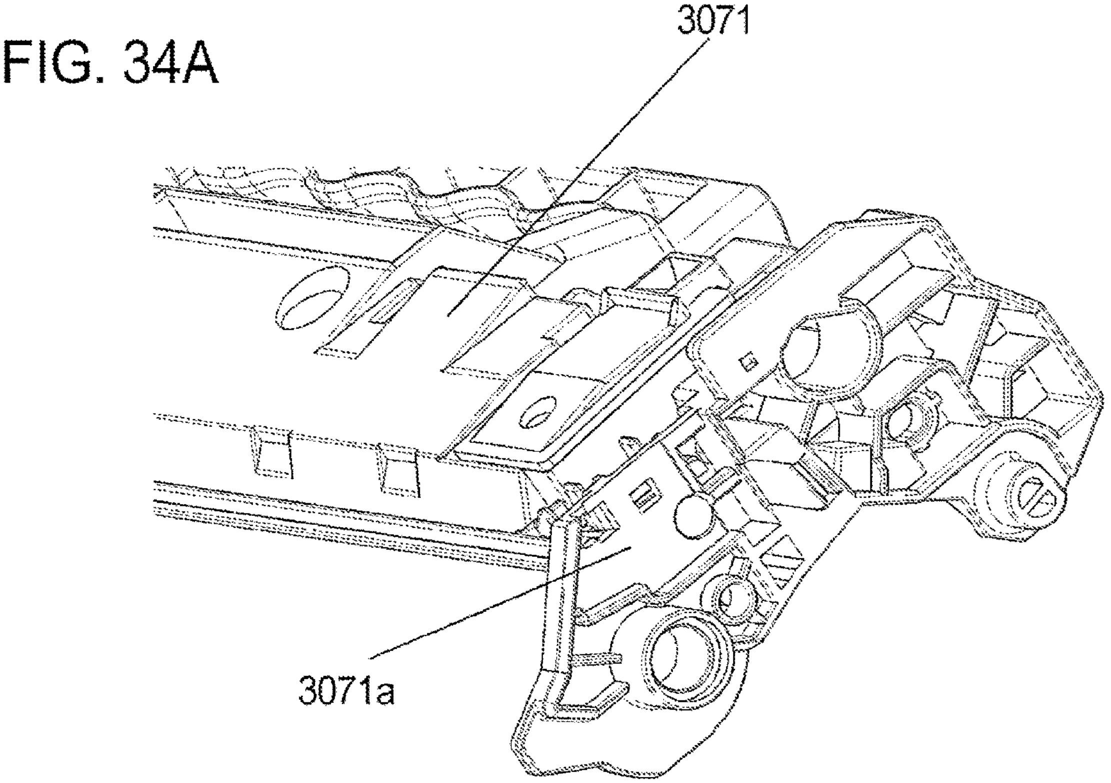
FIG. 34A is a perspective view showing a cleaning frame body portion independently extracted as a key component of the charging contact configuration of a variation of the embodiment 1.
Figure 34B:
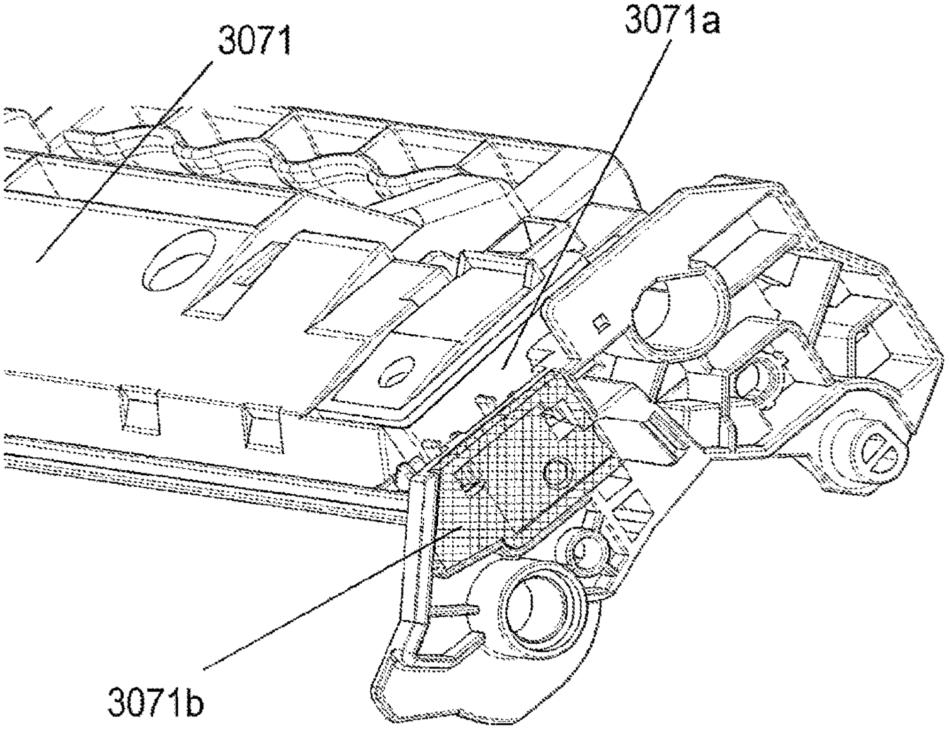
FIG. 34B is a perspective view showing key components of the charging contact configuration extracted in a state in which a contact cover portion is formed in the cleaning frame body portion by two-color molding of the variation of the embodiment 1.
Figure 35:
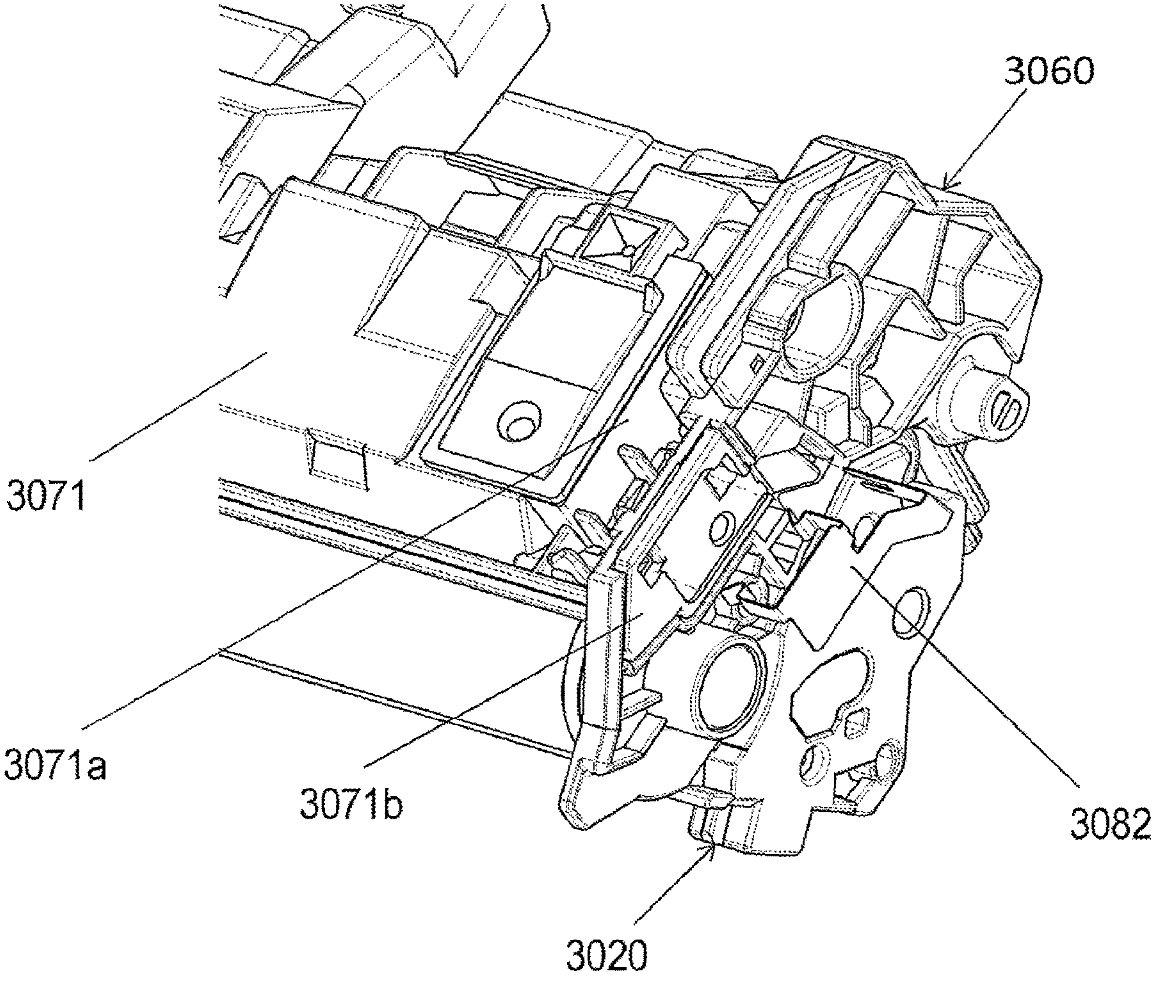
FIG. 35 is an exploded perspective view showing the key components of the charging contact configuration extracted of the variation of the embodiment 1.
Figure 36A:
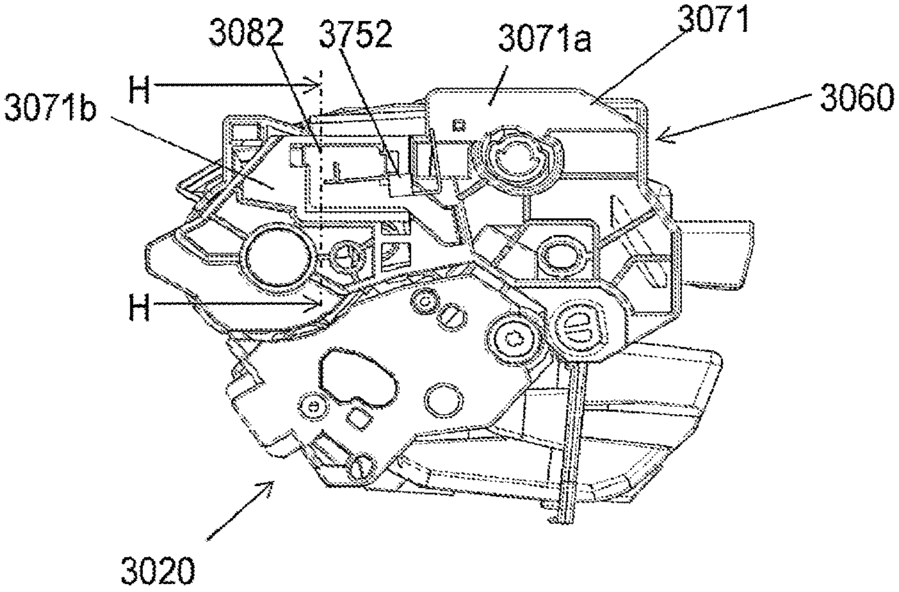
FIG. 36A is a side view for illustrating the charging contact configuration of the variation of the embodiment 1.
Figure 36B:
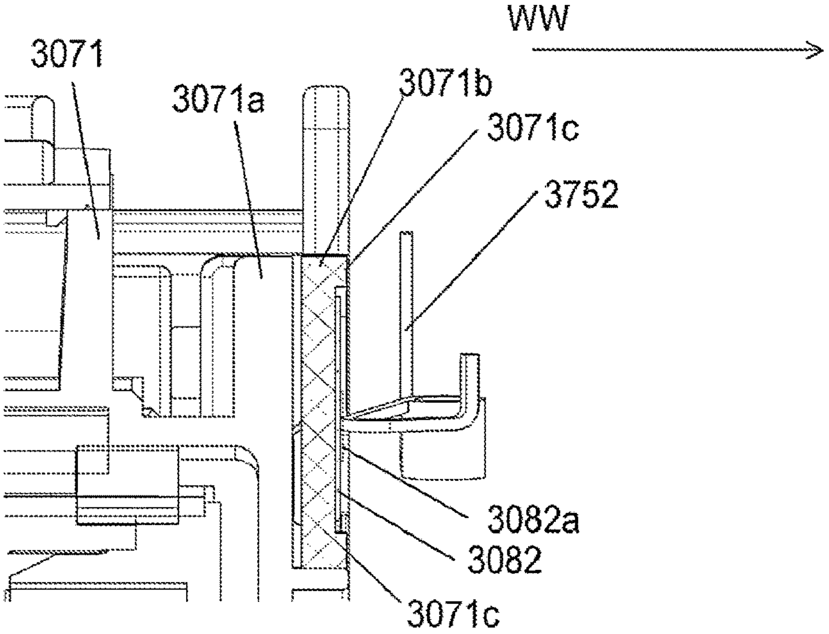
FIG. 36B is an enlarged cross-sectional view of the charging contact taken along line H-H in FIG. 36A.

Referring to FIGS. 34A, 34B, 35, 36A, and 36B, another embodiment of the charging contact configuration is now described in detail. FIG. 34A is a perspective view showing a cleaning frame body portion independently extracted as a key component of the charging contact configuration. FIG. 34B is a perspective view showing key components of the charging contact configuration extracted in a state in which a contact cover portion is formed in the cleaning frame body portion by two-color molding. FIG. 35 is an exploded perspective view showing the key components of the charging contact configuration extracted. FIG. 36A is a side view for illustrating the charging contact configuration. FIG. 36B is an enlarged cross-sectional view of the charging contact taken along line H-H in FIG. 36A. The present embodiment is a modification in which the contact cover 83 as the second frame described above with reference to FIG. 10 is integrally formed with the cleaning frame 3071. The other configurations are the same and thus not described.

As shown in FIG. 35, a cleaning unit 3060 includes a cleaning frame 3071, which serves as a first frame.

As shown in FIGS. 34A and 34B, the cleaning frame 3071 includes a cleaning frame body portion 3071*a* and a cleaning frame contact cover portion 3071*b*. The cleaning frame contact cover portion 3071*b* is integrally formed with the cleaning frame body portion 3071*a* by two-color molding. The cleaning frame body portion 3071*a* is made of a material having a density of about 0.95 to 1.10 g/cm$^3$ and a flame retardancy of HB according to the UL94 standard. The cleaning frame contact cover portion 3071*b* is made of a material that has a density of about 1.12 to 1.50 g/cm$^3$ and a flame retardancy of V-1 according to the UL94 standard, that is, has higher flame retardant capability than the cleaning frame 3071.

As shown in FIG. 36B, a part of the cleaning frame contact cover portion 3071*b*, which is a contact protection member, has a protruding section 3071*c* protruding in the longitudinal direction WW beyond a contact surface 3082*a*.

For example, when a bias is applied in a state in which combustible foreign matter, such as dust, is caught between a spring contact 3752 and the contact surface 3082*a* of an electrode plate 3082, the foreign matter may ignite due to tracking. In such a case, the protruding section 3071*c*, which is made of a highly flame-retardant material, functions as a fire-spreading prevention wall, preventing the fire from spreading to the inside of the cartridge including the cleaning frame 3071.

That is, in the cartridge of the present embodiment, the cleaning frame 3071 is also made of an HB material that is a low-density resin material, thereby reducing the overall weight of the product as described above. On the other hand, the protruding section 3071*c*, which is made of a highly flame-retardant V-1 material, is arranged between the cleaning frame 3071 and the connection section, which is an electrically conductive path, between the apparatus main body and the cartridge. This provides the cartridge that achieves both the safety and weight reduction of the entire product.

In this embodiment, the cleaning frame body portion 3071*a* of the cleaning frame 3071 as the first frame uses PS, the cleaning frame contact cover portion 3071*b*, which has a similar function as the second frame described above, uses PC-ABS, and the electrode plate 3082 as the metal electrode member uses stainless steel. However, these materials are not limited to those of the present embodiment.

Second Embodiment

Overall Configuration of Image Forming Apparatus 2600

Figure 16:
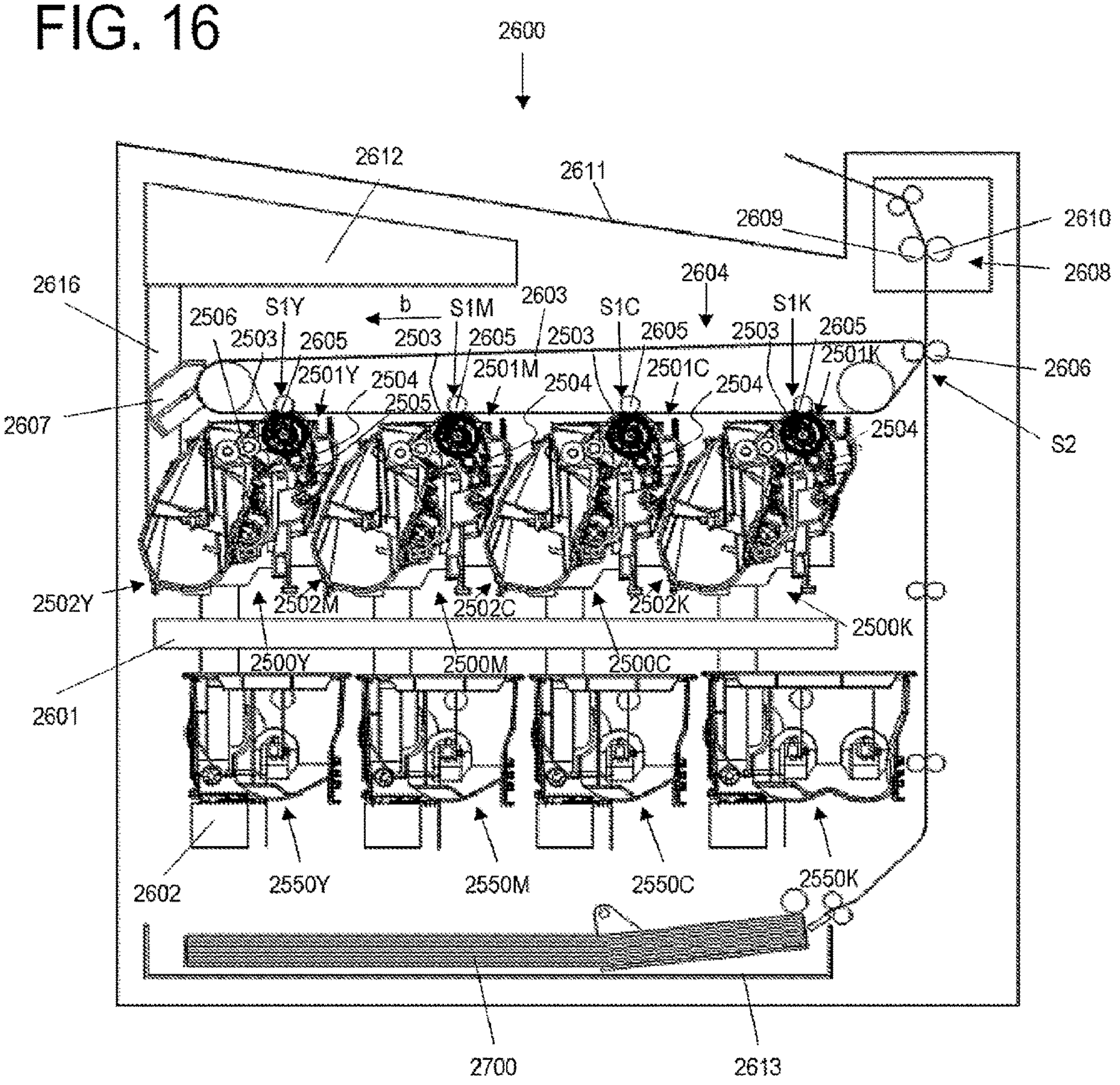
FIG. 16 is a schematic view of an image forming apparatus of the second embodiment.

Referring to FIG. 16, the overall configuration of an electrophotographic image forming apparatus 2600 (hereinafter, image forming apparatus 2600) of a second embodiment of the present invention is now described. FIG. 16 is a schematic view of the image forming apparatus 2600 according to the present embodiment. In this embodiment, process cartridges 2500 and toner cartridges 2550 are attachable to and detachable from the apparatus main body of the image forming apparatus 2600. In this embodiment, first to fourth image forming portions substantially have the same configuration and operation except that they form images of different colors. As such, these portions will be described collectively without using the suffixes Y to K where it is not necessary to distinguish them.

The first to fourth process cartridges 2500 are arranged side by side in the horizontal direction. Each process cartridge 2500 includes a cleaning unit 2501 and a developing unit 2502. The cleaning unit 2501 includes a photosensitive drum 2503 as an image bearing member, a charging roller 2504 as a charging unit for uniformly charging the surface of the photosensitive drum 2503, and a cleaning blade 2505 as a cleaning unit. The developing unit 2502 accommodates a developing roller 2506 and developer T (hereinafter, toner), and includes a developing unit for developing electrostatic latent images on the photosensitive drum 2503. The cleaning unit 2501 and the developing unit 2502 are supported so as to be pivotal relative to each other. A first process cartridge 1Y contains yellow (Y) toner in the developing unit 2502. Similarly, a second process cartridge 2500M contains magenta (M) toner, a third process cartridge 2500C contains cyan (C) toner, and a fourth process cartridge 2500K contains black (K) toner.

The process cartridges 2500 can be attached to and detached from the image forming apparatus 2600 through an attachment unit such as an attachment guide (not shown) and a positioning member (not shown) provided in the image forming apparatus 2600. A scanner unit 2601, which serves as an exposure unit for forming an electrostatic latent image, is arranged under the process cartridge 2500. Furthermore, the image forming apparatus includes a waste toner transport unit 2616 arranged rearward of the process cartridges 2500 (downstream side in the attachment/detachment direction of the process cartridges 2500).

The first to fourth toner cartridges 2550 are arranged side by side in the horizontal direction under the process cartridges 2500 in an order corresponding to the colors of the toner contained in the process cartridges 2500. That is, the first toner cartridge 2550Y contains yellow (Y) toner. Similarly, the second toner cartridge 2550M contains magenta (M) toner, the third toner cartridge 2550C contains cyan (C) toner, and the fourth toner cartridge 2550K contains black (K) toner. Each toner cartridge 2550 supplies toner to the process cartridge 2500 containing toner of the same color.

The replenishing operation of the toner cartridges 2550 is performed when the toner level detection unit (not shown) installed in the apparatus main body of the image forming apparatus 2600 detects a shortage of toner remaining in the process cartridges 2500. The toner cartridges 2550 can be attached to and detached from the image for apparatus 2600 through an attachment unit such as an attachment guide (not shown) and a positioning member (not shown) provided in the image forming apparatus 2600. The process cartridges 2500 will be described in detail below.

First to fourth toner transport devices 2602 are arranged under the toner cartridges 2550 corresponding to the respective toner cartridges 2550. Each toner transport device 2602 transports the toner received from the toner cartridge 2550 upward to supply the toner to the corresponding developing unit 2502. An intermediate transfer unit 2604, which serves as an intermediate transfer member, is provided above the process cartridges 2500. The intermediate transfer unit 2604 is arranged substantially horizontally with its primary transfer portion S1 on the lower side. An intermediate transfer belt 2603, which is a rotational endless belt, faces the photosensitive drums 2503 and is stretched over a plurality of tension rollers. On the inner surface of the intermediate transfer belt 2603, primary transfer rollers 2605 as primary transfer members are located at respective positions where they form primary transfer portions S1 with the respective photosensitive drums 2503 through the intermediate transfer belt 2603. A secondary transfer roller 2606 as a secondary transfer member is in contact with the intermediate transfer belt 2603 and forms a secondary transfer portion S2 with the roller on the opposite side through the intermediate transfer belt 2603. Furthermore, an intermediate transfer belt cleaning unit 2607 is arranged on the opposite side from the secondary transfer portion S2 in the left-right direction (direction in which the secondary transfer portion S2 and the intermediate transfer belt are stretched).

A fixing unit 2608 is located further above the intermediate transfer unit 2604. The fixing unit 2608 includes a heating unit 2609 and a pressing roller 2610, which presses against the heating unit 2609. A discharge tray 2611 is arranged on the upper surface of the apparatus main body, and a waste toner collection container 2612 is arranged between the discharge tray 2611 and the intermediate transfer unit. In addition, a paper feed tray 2613 is located at the bottom of the apparatus main body to store recording materials 2700.

Image Formation Process

Figure 17:
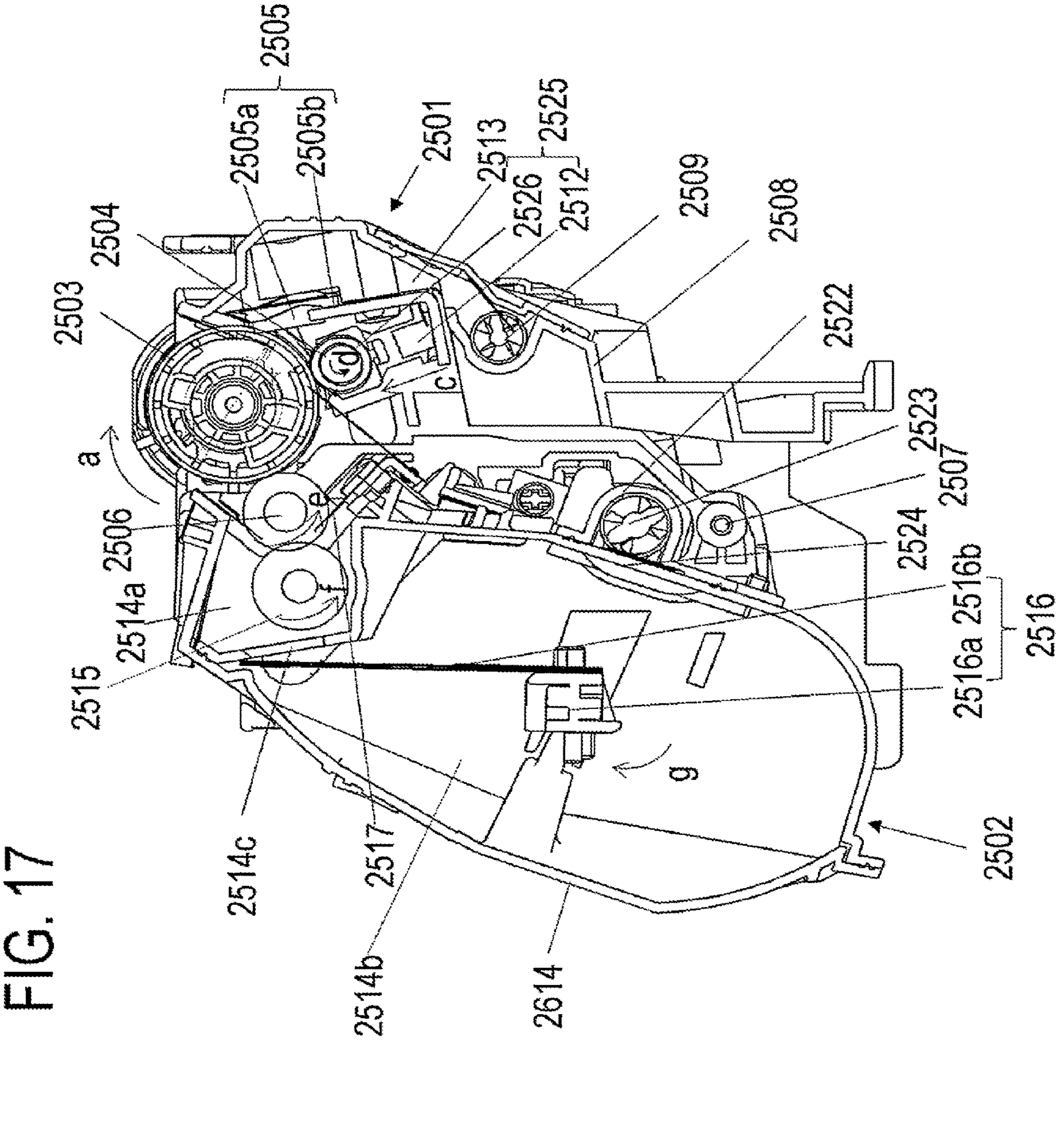
FIG. 17 is a cross-sectional view of a cartridge of the second embodiment.

Referring to FIGS. 16 and 17, an image forming operation of the image forming apparatus 2600 is now described. FIG. 17 is a schematic cross-sectional view of a process cartridge according to the present embodiment.

During image formation, a photosensitive drum 2503 is driven to rotate at a predetermined speed in the direction of arrow a in FIG. 17. The intermediate transfer belt 2603 is driven to rotate in the direction of arrow b in FIG. 16 (in the forward direction of the rotation of the photosensitive drum 2503).

First, the charging roller 2504 uniformly charges the surface of the photosensitive drum 2503. Then, a laser beam is emitted from the scanner unit 2601 to the surface of the photosensitive drum 2503 for scanning exposure, thereby forming an electrostatic latent image on the photosensitive drum 2503 according to image information. The electrostatic latent image formed on the photosensitive drum 2503 is developed as a toner image (developer image) by the developing unit 2502. At this time, the developing unit 2502 is pressurized by the development pressure unit (not shown) provided in the main body of the image forming apparatus 2600. The toner image formed on the photosensitive drum 2503 is transferred, as primary transfer, onto the intermediate transfer belt 2603 by the primary transfer roller 2605.

For example, to form a full-color image, the above process is sequentially performed in the image forming portions S1Y to S1K, which are the first to fourth primary transfer units, so that toner images of different colors are sequentially superimposed on the intermediate transfer belt 2603.

Meanwhile, the recording material 2700 stored in the paper feed tray 2613 is fed at predetermined control timing and transported to the secondary transfer portion S2 in synchronization with the movement of the intermediate transfer belt 2603. Then, the four-color toner images on the intermediate transfer belt 2603 are collectively transferred, as secondary transfer, onto the recording material 2700 by the secondary transfer roller 2606, which is in contact with the intermediate transfer belt 2603 through the recording material 2700.

Then, the recording material 2700 to which the toner image is transferred is transported to the fixing unit 2608. The fixing unit 2608 applies heat and pressure to the recording material 2700 thereby fixing the toner image on the recording material 2700. After the fixation, the recording material 2700 is transported to the discharge tray 2611 to complete the image forming operation. Also, the cleaning blades 2505 remove the primary-transfer residual toner (waste toner) remaining on the photosensitive drums 2503 after the primary transfer step. The intermediate transfer belt cleaning unit 2607 removes the secondary-transfer residual toner (waste toner) remaining on the intermediate transfer belt 2603 after the secondary transfer step. The waste toner removed by the cleaning blades 2505 and the intermediate transfer belt cleaning unit 2607 is transported by a waste toner transport unit 2616 provided in the apparatus main body and stored in the waste toner collection container 2612. The image forming apparatus 2600 can also form a monochromatic or multicolor image by using only one or some (but not all) desired image forming portions.

Process Cartridge

Figure 18A:
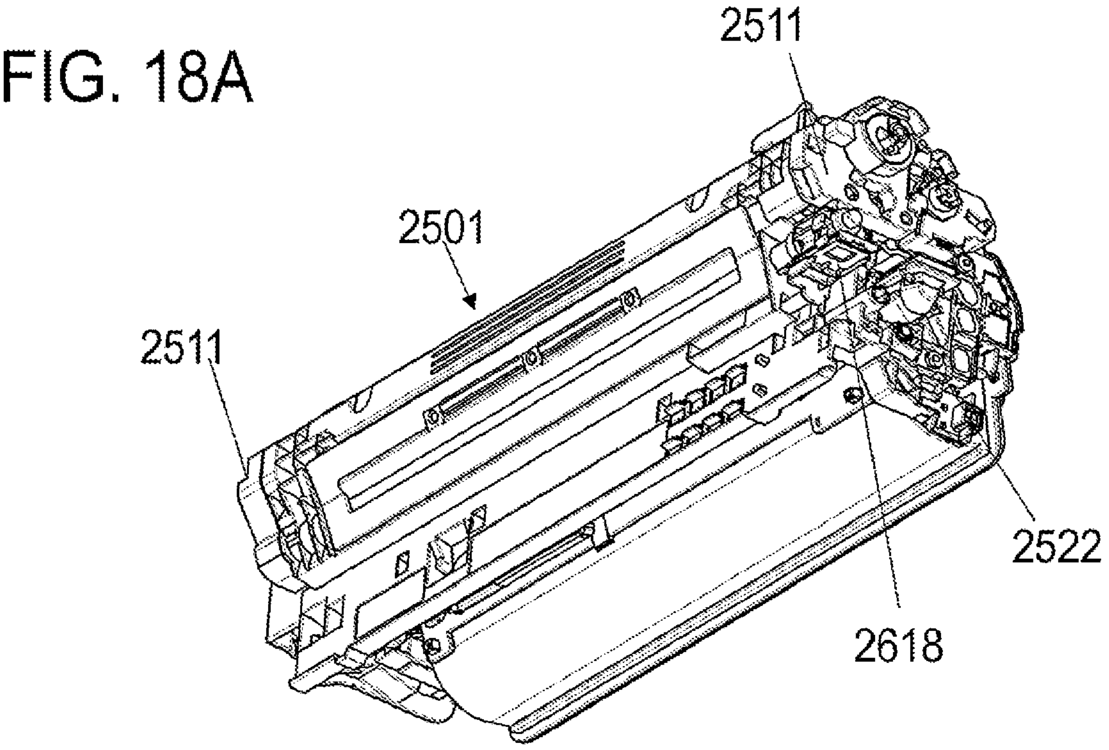
FIGS. 18A and 18B are perspective views of a cartridge of the second embodiment.
Figure 18B:
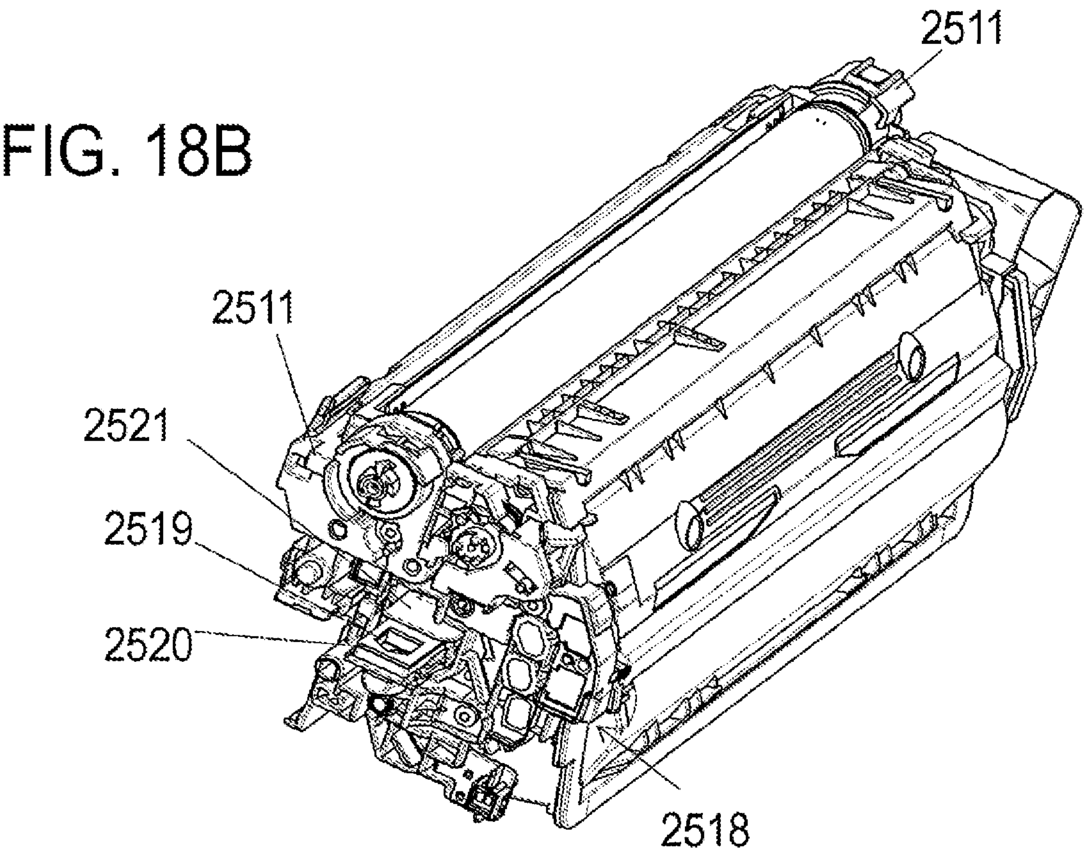

Referring to FIGS. 17 and 18, the overall configuration of the process cartridges 2500 to be attached to the image forming apparatus 2600 according to the present embodiment is now described. FIG. 17 is a schematic cross-sectional view of a process cartridge 2500 according to the present embodiment. FIG. 18A is a perspective view of the process cartridge 2500 as viewed from the bottom surface side. FIG. 18B is a perspective view of the process cartridge 2500 as viewed from the top surface side.

The process cartridge 2500 includes a cleaning unit 2501 and a developing unit 2502. The cleaning unit 2501 and the developing unit 2502 are connected so as to be pivotal about a rotation support pin 2507.

The cleaning unit 2501 includes a cleaning frame 2508, which supports various members in the cleaning unit 2501. In addition to the photosensitive drum 2503, the charging roller 2504, and the cleaning blade 2505, the cleaning unit 2501 includes a waste toner screw 2509 extending parallel to the rotation axis of the photosensitive drum 2503. The cleaning frame 2508 includes cleaning bearings 2511, which rotationally support the photosensitive drum 2503 at opposite longitudinal ends of the cleaning unit 2501. The cleaning bearings 2511 include cleaning gear trains for transmitting drive from the photosensitive drum 2503 to the waste toner screw 2509.

The charging roller 2504 is urged toward the photosensitive drum 2503 in the direction of arrow c by charging roller pressure springs 2512 arranged at both ends. The charging roller 2504 is provided so as to be driven by the photosensitive drum 2503. When the photosensitive drum 2503 is driven to rotate in the direction of arrow a during image formation, the charging roller 2504 is rotated in the direction of arrow d (forward direction of the rotation of the photosensitive drum 2503).

The cleaning blade 2505 includes an elastic member 2505*a* for removing transfer residual toner (waste toner) remaining on the surface of the photosensitive drum 2503 after primary transfer, and a support member 2505*b* for supporting the elastic member 2505*a*. The waste toner removed from the surface of the photosensitive drum 2503 by the cleaning blade 2505 is stored in a waste toner storage chamber 2513 defined by the cleaning blade 2505 and the cleaning frame 2508. The waste toner screw 2509 in the waste toner storage chamber 2513 transports the waste toner stored in the waste toner storage chamber 2513 rearward of the image forming apparatus 2600 (downstream side in the attachment/detachment direction of the process cartridge 2500). The transported waste toner is discharged through a waste toner discharge portion 2618 and delivered to the waste toner transport unit 2616 of the image forming apparatus 2600.

The developing unit 2502 has a development frame 2614, which supports various members of the developing unit 2502. The development frame 2614 is partitioned into a developing chamber 2514*a*, which accommodates a developing roller 2506 and a supply roller 2515, and a toner storage chamber 2514*b*, which stores toner and accommodates an agitation member 2516.

The developing chamber 2514*a* accommodates the developing roller 2506, the supply roller 2515, and a development blade 2517. The developing roller 2506 carries toner as a developer carrying member, rotates in the direction of arrow e during image formation, and transports the toner to the photosensitive drum 2503 by coming into contact with the photosensitive drum 2503. The developing roller 2506 is rotationally supported by the development frame 2514 through development bearing units 2518 at its opposite ends in the longitudinal direction (rotation axis direction). The supply roller 2515, which serves as a developer supply member, is rotationally supported by the development frame 2514 through the development bearing units 2518 so as to be rotatable in contact with the developing roller 2506. The supply roller 2515 rotates in the direction of arrow f during image formation. Furthermore, the development blade 2517, which serves as a layer thickness controlling member that controls the thickness of the toner layer formed on the developing roller 2506, is arranged in contact with the surface of the developing roller 2506.

The toner storage chamber 2514*b* accommodates the agitation member 2516, which agitates the stored toner T and transports the toner to the supply roller 2515 through a developing chamber communication port 2514*c*. The agitation member 2516 includes a rotation shaft 2516*a*, which is parallel to the rotation axis of the developing roller 2506, and an agitation sheet 2516*b*, which is flexible and serves as a transport member. One edge of the agitation sheet 2516*b* is fixed to the rotation shaft 2516*a*, and the other edge of the agitation sheet 2516*b* is a free edge. The agitation sheet 2516*b* rotates in the direction of arrow g when the rotation shaft 2516*a* rotates, so that the toner is agitated by the agitation sheet 2516*b*.

The developing unit 2502 has the developing chamber communication port 2514*c*, which provides communication between the developing chamber 2514*a* and the toner storage chamber 2514*b*. In the present embodiment, when the developing unit 2502 is at normal orientation (orientation during use), the developing chamber 2514*a* is located above the toner storage chamber 2514*b*. The toner in the toner storage chamber 2514*b* that is lifted by the agitation member 2516 is supplied to the developing chamber 2514*a* through the developing chamber communication port 2514*c*.

The developing unit 2502 also has a receiving port 2519 at one end on the downstream side in the attachment/detachment direction. A receiving port seal member 2520 and a toner receiving port shutter 2521, which is movable in the front-rear direction, are arranged above the toner receiving port 2519. When the process cartridge 2500 is not attached to the image forming apparatus 2600, the toner receiving port shutter 2521 closes the toner receiving port 2519. The toner receiving port shutter 2521 is configured to be urged and opened by the image forming apparatus 2600 in time with the attachment/detachment operation of the process cartridge 2500. A receiving transport passage 2522 is provided in communication with the toner receiving port 2519, and a receiving transport screw 2523 is arranged in the receiving transport passage 2522. A storage chamber communication port 2524 for supplying toner to the toner storage chamber 2514*b* is provided near the longitudinal center of the development bearing unit 2518, and provides communication between the receiving transport passage 2522 and the toner storage chamber 2514*b*. The receiving transport screw 2523 extends parallel to the rotation axes of the developing roller 2506 and the supply roller 2515 and transports the toner received from the toner receiving port 2519 to the toner storage chamber 2514*b* through the storage chamber communication port 2524.

Development Contact Configuration

Figure 15:
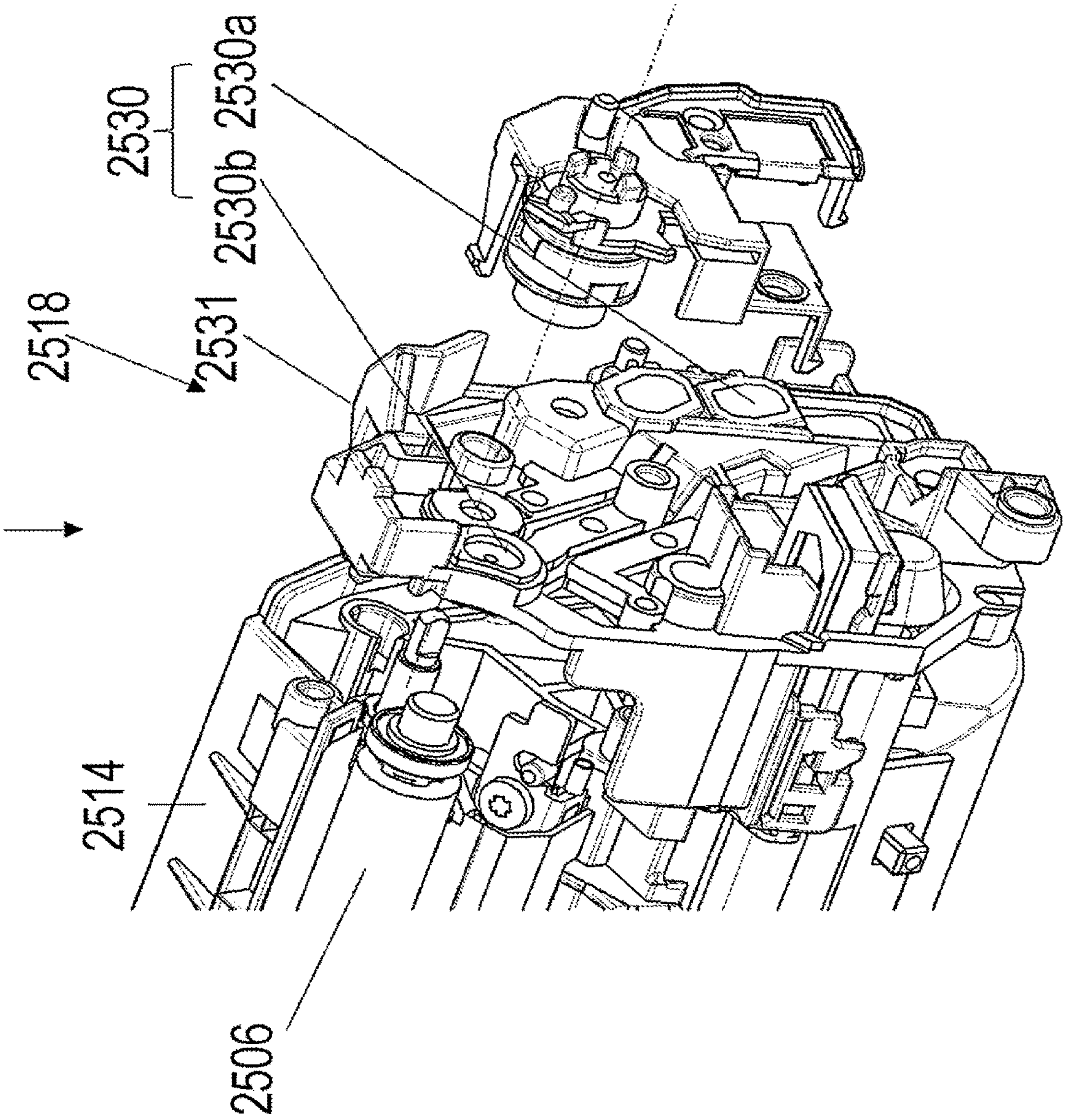
FIG. 15 is an exploded perspective view of a developing unit of a second embodiment.
Figure 19:
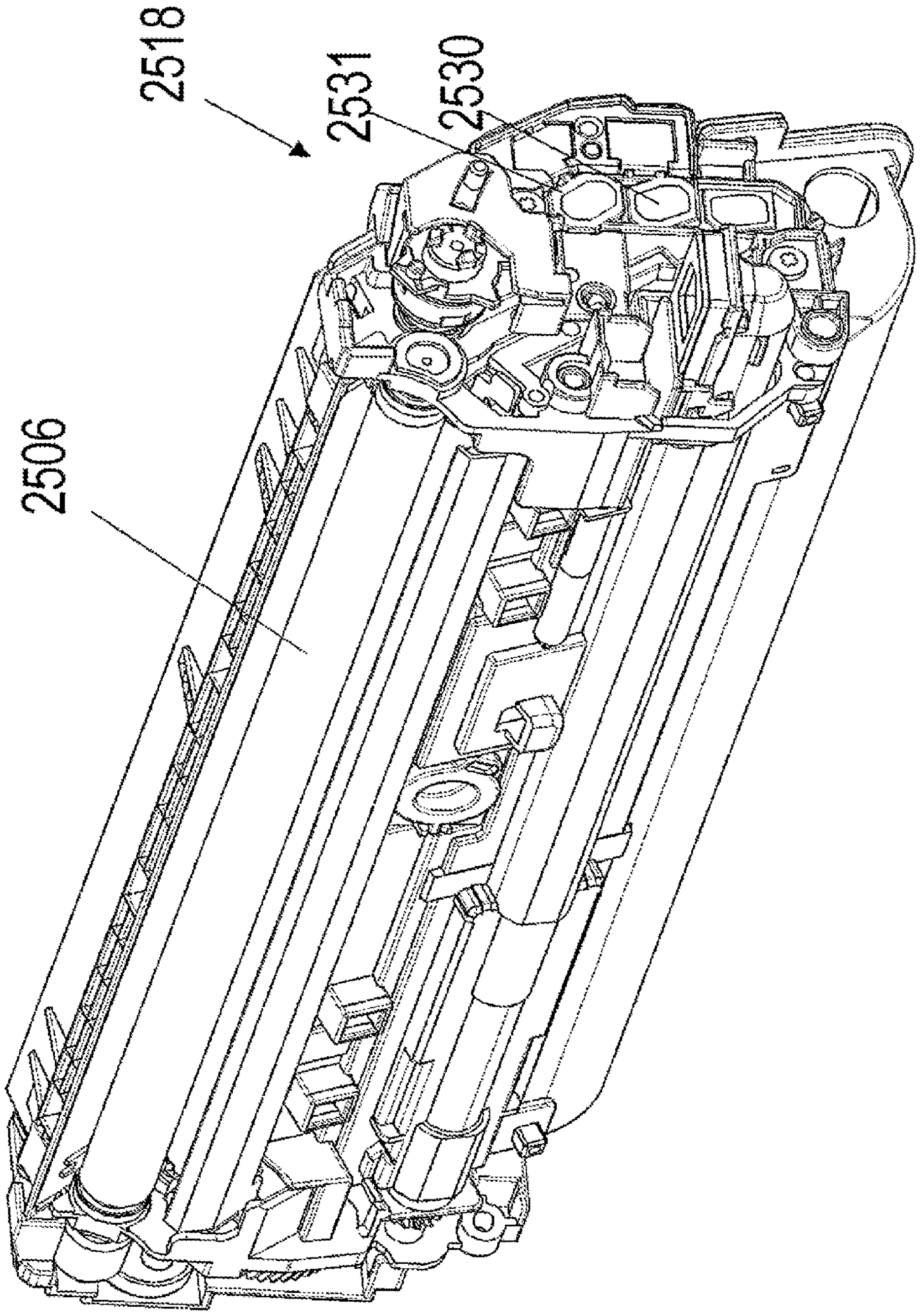
FIG. 19 is a perspective view of a developing unit of the second embodiment.
Figure 20A:
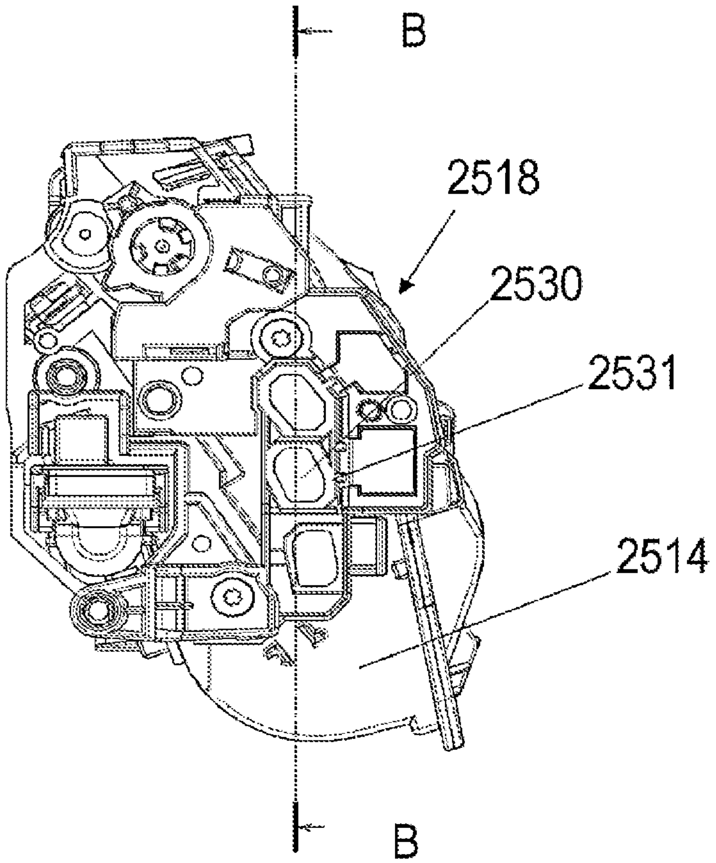
FIG. 20A is a side view of the developing unit of the second embodiment.
Figure 20B:
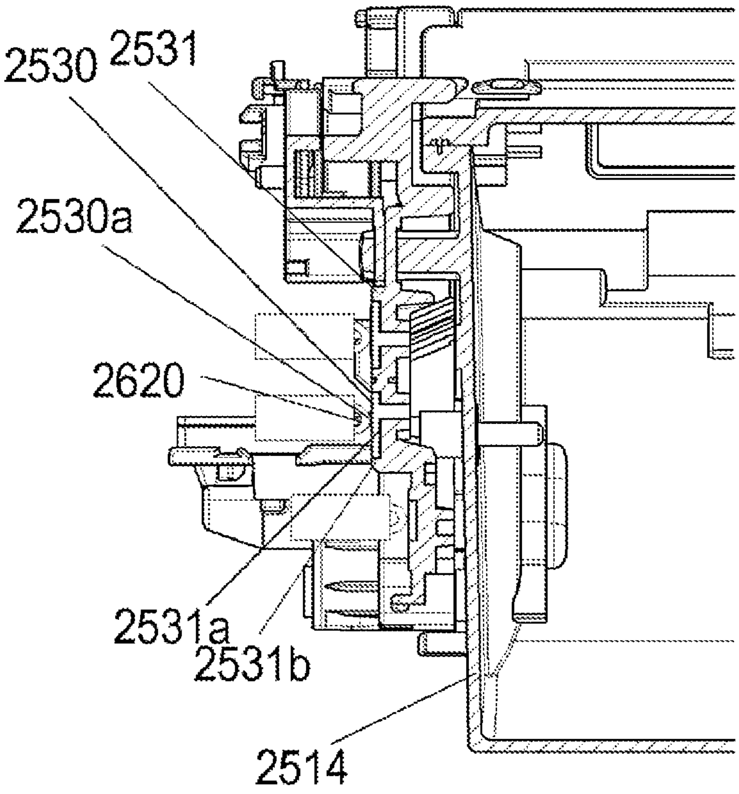
FIG. 20B is an enlarged cross-sectional view of the developing unit of the second embodiment.

Referring to FIGS. 15, 19, 20A, and 20B, the development contact configuration, which is a feature of the present embodiment, is now described in detail. FIG. 15 is an exploded perspective view of the developing unit 2502 showing the key components of the development contact configuration extracted. FIG. 19 is a perspective view of the developing unit 2502, FIG. 20A is a side view for illustrating the development contact configuration, and FIG. 20B is an enlarged cross-sectional view of the development contact taken along line B-B in FIG. 20A.

As shown in FIG. 15, the developing unit 2502 includes a development frame 2514 as a first frame and a developing roller 2506 as a process unit. The development frame 2514 is made of a material having a density of about 0.95 to 1.10 $g/cm^3$ and a flame retardancy of HB according to the UL94 standard. It is known that adding an additive to a resin material, which generally has the property of igniting in contact with fire, can render the resin flame retardant. When an additive is added to one type of resin material, a higher flame-retardant effect results in a greater specific gravity of the resin. This may increase the weight of the necessary resin material in the entire product, causing a greater load on the environment. In the present embodiment, the development frame 2514 is made of a material that is free of such an additive and has a low density. The developing roller 2506 has the function of carrying developer by receiving a predetermined bias. The developing roller 2506, which serves as a rotating member, is rotationally supported by the development frame 2514 through the development bearing units 2518.

As shown in FIGS. 15, 20A, and 20B, the development bearing unit 2518 includes a conductive portion 2530, which is an electrode member made of a conductive resin, to apply the predetermined bias to the developing roller 2506. The conductive portion 2530 forms an electrically conductive path from a development spring contact 2620, which is a power supply member of the image forming apparatus, to the developing roller 2506.

As shown in FIG. 15, the development bearing unit 2518 is formed by integrally forming the conductive portion 2530 and a non-conductive portion 2531, which serves as the second frame, by two-color molding or the like. The non-conductive portion 2531 is made of a material that has a density of about 1.12 to 1.50 $g/cm^3$ and a flame retardancy of V-0 according to the UL94 standard, that is, has higher flame retardant capability than the development frame 2514. As shown in FIG. 15, the conductive portion 2530 includes a contact section 2530*a* exposed outward to be in contact with the development spring contact 2620 (FIG. 20B), which is a power supply member of the image forming apparatus, to receive power, and a conductive support section 2530*b*, which rotationally supports the developing roller 2506.

As shown in FIG. 20B, in this configuration, the non-conductive portion 2531 as the second frame forms a seating surface for forming the conductive portion 2530. When the seating surface formed by the non-conductive portion 2531 is 2531*a*, the non-conductive portion 2531 has a protruding section 2531*b* that is adjacent to the conductive portion 2530 and protrudes beyond the seating surface 2531*a* in a direction perpendicular to the seating surface 2531*a*. The conductive portion 2530 is formed by two-color molding so as to be surrounded by the non-conductive portion 2531 except for the surface that is to be in contact with the development spring contact 2620.

For example, anomalies in the high voltage power source may cause an electric discharge at the contact surface 2530*a* between the development spring contact 2620, which is a power supply portion, of the image forming apparatus main body and the conductive portion 2530. This may create an electric ignition source. In this respect, the present configuration has the non-conductive portion 2531, which has a high flame retardancy and surrounds the conductive portion 2530. With this configuration, if any ignition at the contact surface 2530*a* is about to spread the fire to the non-conductive portion 2531, the nonflammable gas generated from the inside of the material of the non-conductive portion 2531 acts to extinguish the flame, thereby preventing the spreading of fire to the development frame 2514.

That is, in the present embodiment, the development frame 2514 is also made of an HB material that is a low-density resin material to reduce the overall weight of the product, while a highly flame-retardant V-0 material is used in the vicinity of the connection section, which serves as an electrically conductive path, between the apparatus main body and the process cartridge. This provides the process cartridge that achieves both the safety and weight reduction of the entire product.

Charging Contact Configuration

Figure 21:
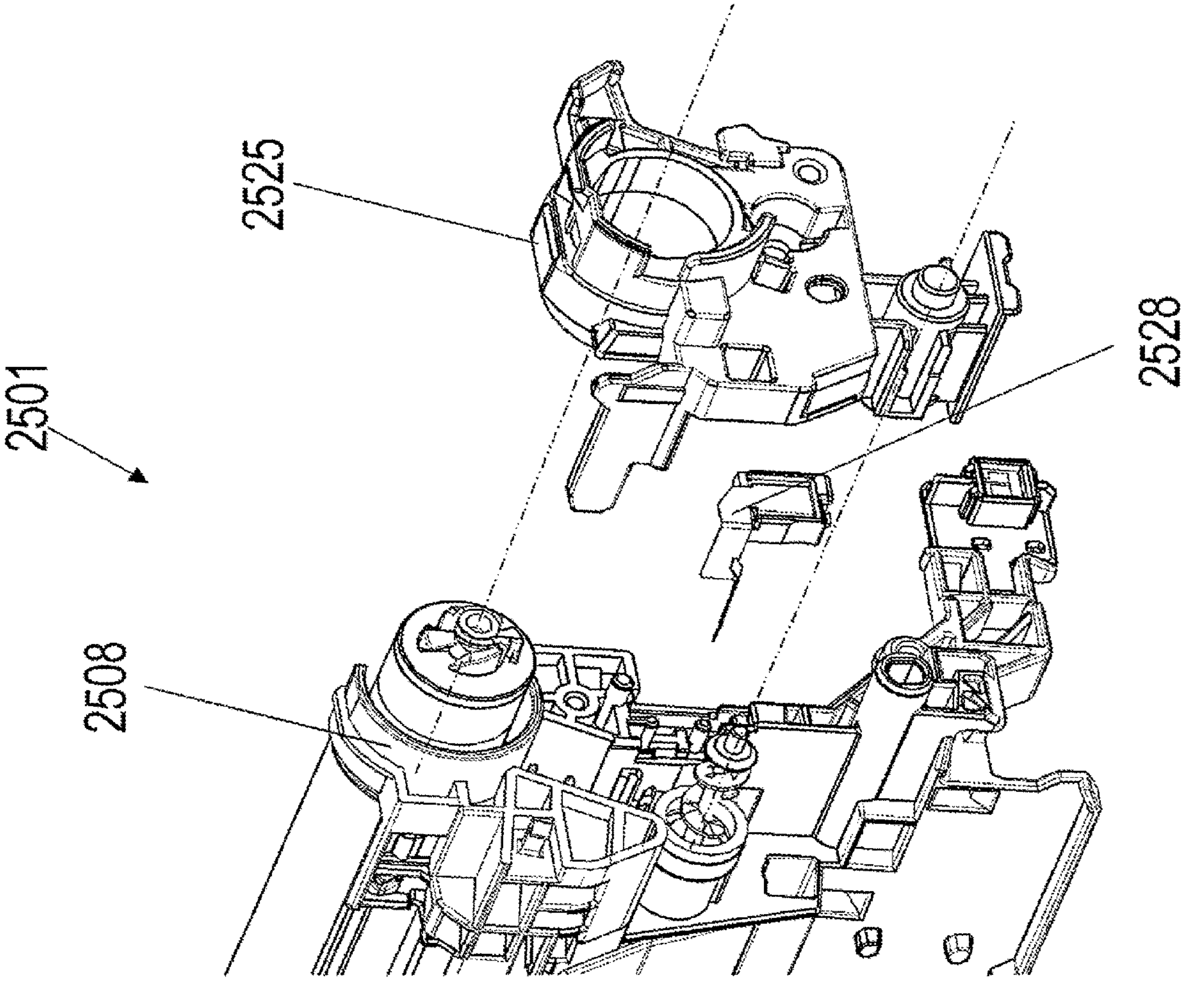
FIG. 21 is an exploded perspective view of a cleaning unit of the second embodiment.
Figure 22A:
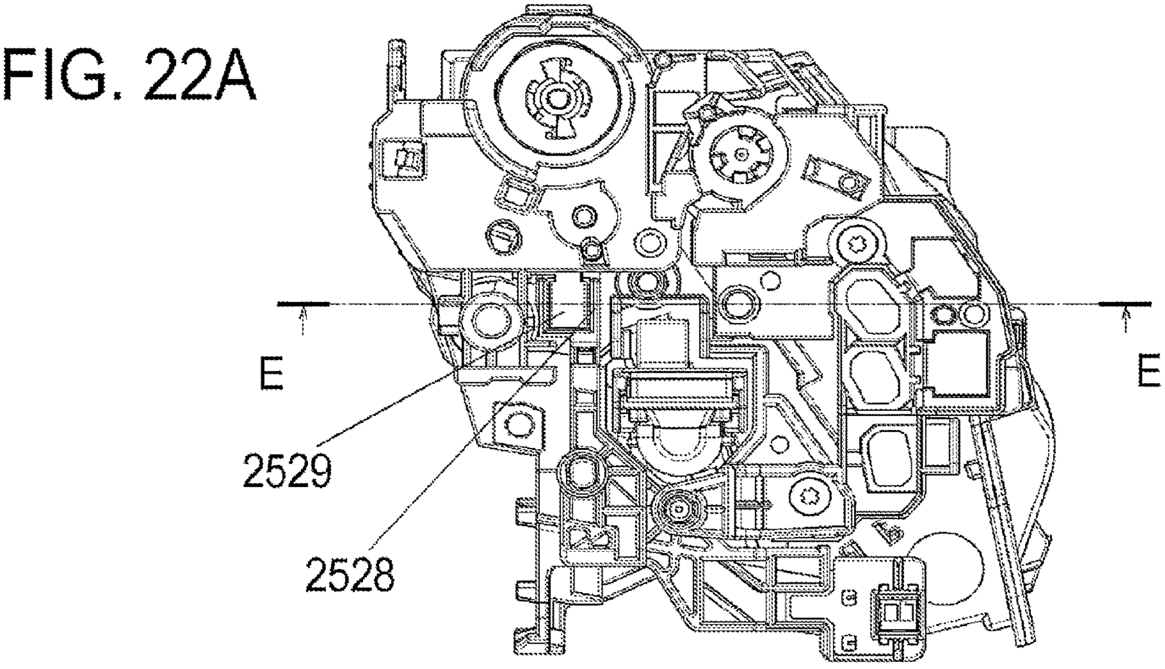
FIG. 22A is a side view of the cleaning unit of the second embodiment.
Figure 22B:
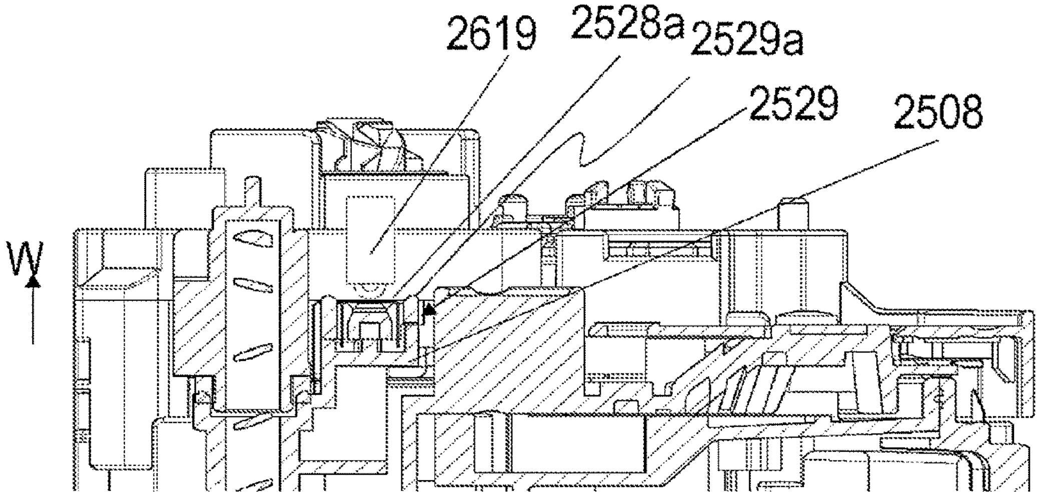
FIG. 22B is an enlarged cross-sectional view of the cleaning unit of the second embodiment.

Referring to FIGS. 17, 21, 22A, and 22B, the charging contact configuration, which is a feature of the present embodiment, is now described in detail. FIG. 21 is an exploded perspective view showing the key components of the charging contact configuration extracted. FIG. 22A is a side view for illustrating the charging contact configuration. FIG. 22B is an enlarged cross-sectional view of the charging contact taken along line E-E in FIG. 22A.

As shown in FIG. 17, the cleaning unit 2501 includes the cleaning frame 2508 as the first frame and the charging roller 2504 as a process unit (charging member). The cleaning frame 2508 is made of a material having a density of about 0.95 to 1.10 g/cm$^3$ and a flame retardancy of HB according to the UL94 standard. The cleaning frame 2508 supports the charging roller 2504 as a rotational rotating member through the charging roller bearing 2525. The charging roller bearing 2525 includes a charging roller bearing member 2526 made of a conductive resin and a charging roller spring member 2512 formed by a metal compression spring. The charging roller 2504 rotates while receiving a predetermined bias to uniformly charge the surface of the photosensitive drum 2503. To apply the predetermined bias to the charging roller 2504, the cleaning unit 2501 includes an electrode plate 2528 shown in FIG. 21, which is an electrode member made of metal, as an electrically conductive path from the image forming apparatus 2600 to the charging roller 2504. As shown in FIG. 22B, the electrode plate 2528 has a contact surface 2528*a* exposed outward to receive power from a spring contact 2619, which is a power supply member provided in the image forming apparatus.

The cleaning unit 2501 also includes a contact cover 2529 as a second frame. The contact cover 2529 is made of a material that has a density of about 1.12 to 1.50 g/cm$^3$ and a flame retardancy of V-0 according to the UL94 standard, that is, has higher flame retardant capability than the cleaning frame 2508. As shown in FIG. 22B, a part of the contact cover 2529 has a protruding section 2529*a* protruding in the longitudinal direction W beyond the contact surface 2528*a*. For example, when combustible foreign matter, such as dust, is held between the spring contact 2619 and the contact surface 2528*a* of the electrode plate 2528, the foreign matter may cause ignition due to tracking. In such a case, the protruding section 2529*a*, which is made of a highly flame-retardant material, functions as a fire-spreading prevention wall. This prevents the fire from spreading to the inside of the process cartridge 2500 including the cleaning frame 2508.

That is, the cleaning frame 2508 is made of an HB material that is a low-density resin material to reduce the overall weight of the product, while the protruding section 2529*a* made of a highly flame-retardant V-0 material is located at the electric conductive path between the apparatus main body 2600 and the cleaning frame 2508. This provides the cartridge that achieves both the safety and weight reduction of the entire product.

Third Embodiment

A third embodiment according to the present invention is now described referring to drawings. The third embodiment is an example of an image forming apparatus to which four process cartridges can be attached and detached. The number of process cartridges attached to the image forming apparatus is not limited to this, and may be set as appropriate. Also, in the following embodiment, a laser beam printer is described as an example of an image forming apparatus.

Outline of Image Forming Apparatus Configuration

Figure 23:
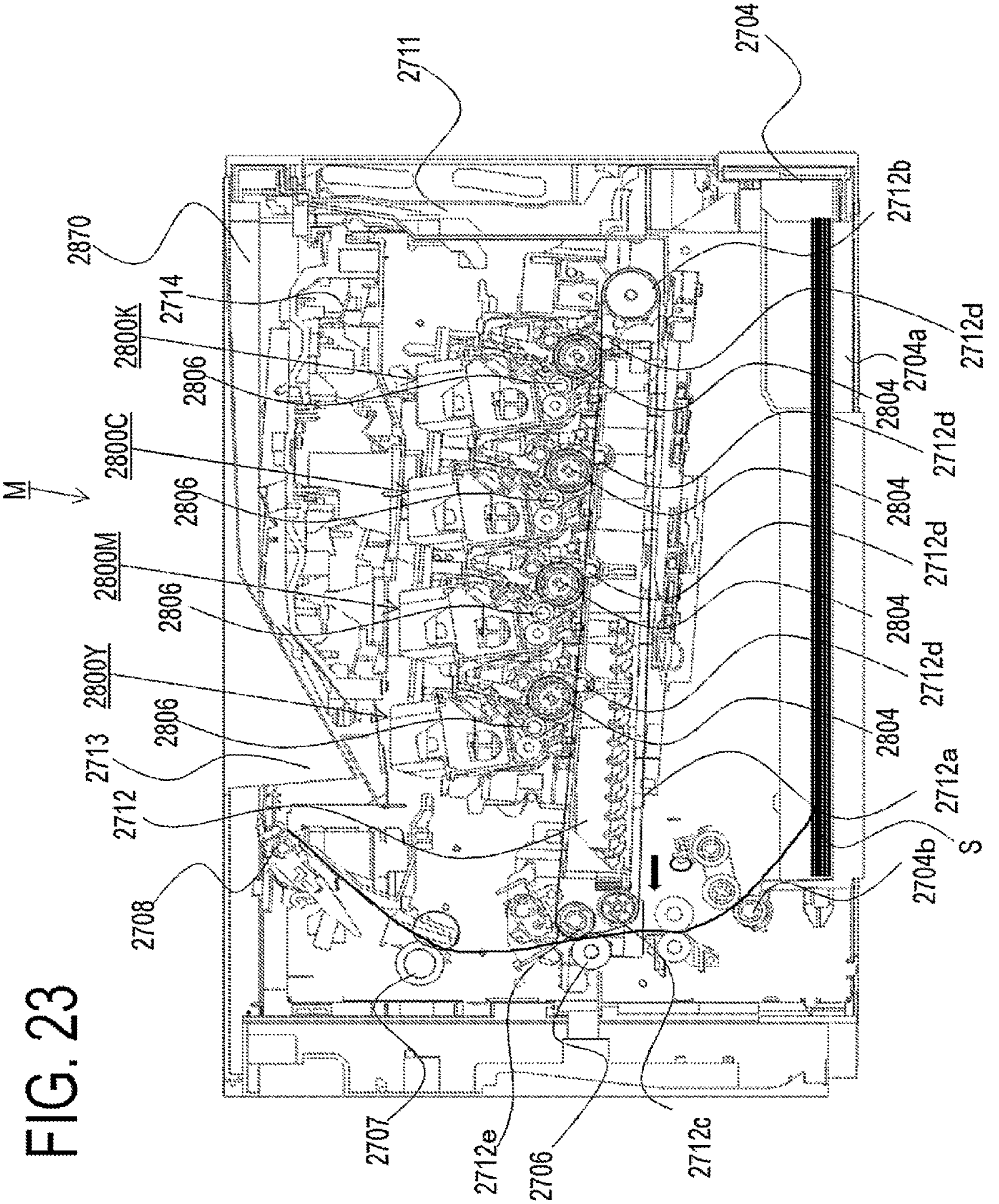
FIG. 23 is a schematic cross-sectional view of an image forming apparatus of a third embodiment.
Figure 24:
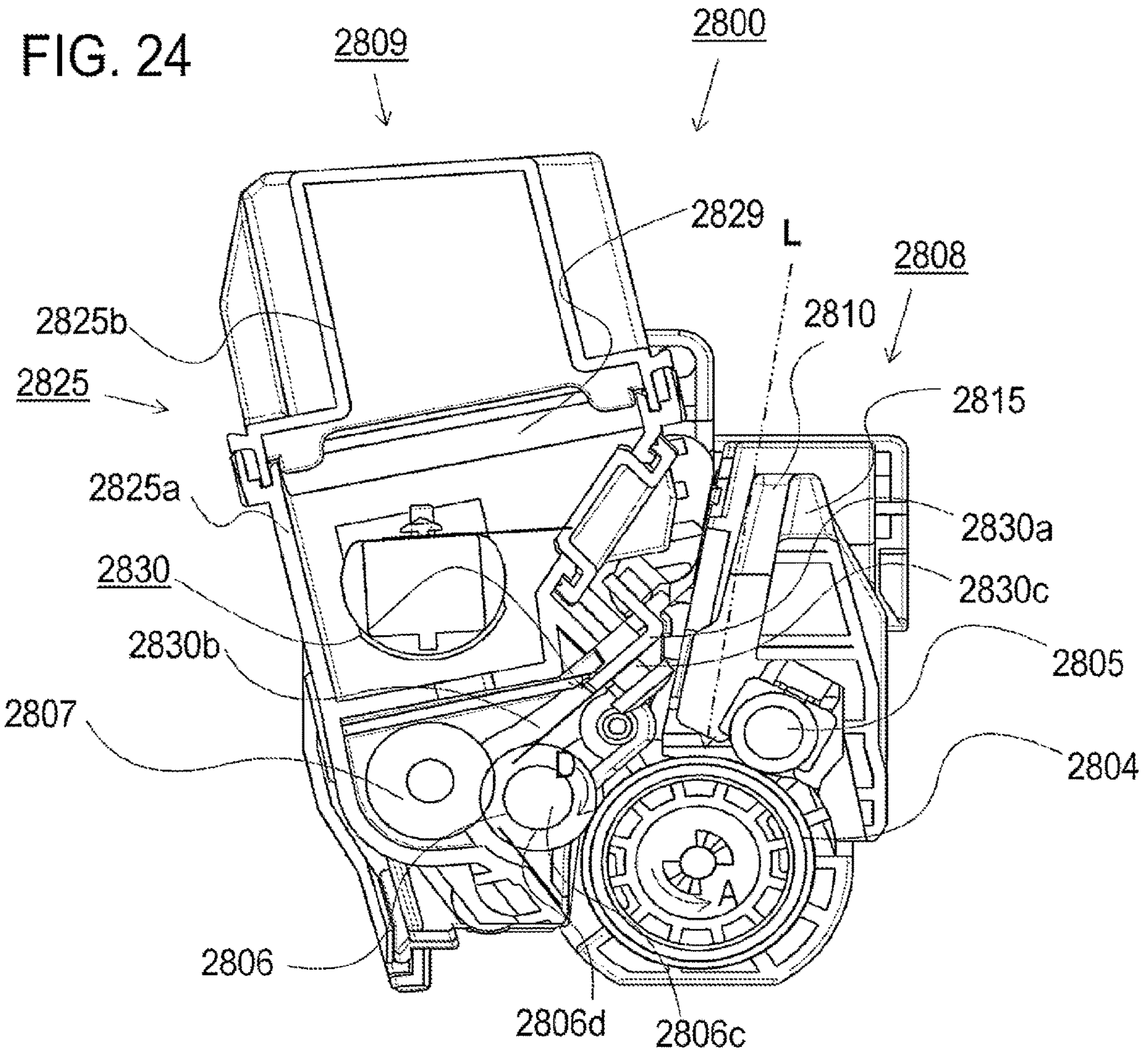
FIG. 24 is a cross-sectional view of a cartridge of the third embodiment.

FIG. 23 is a schematic cross-sectional view of an image forming apparatus M. FIG. 24 is a cross-sectional view of a process cartridge 2800. The image forming apparatus M is a full-color laser printer of four colors using an electrophotographic process, and forms color images on recording media (recording material) S. The image forming apparatus M uses the process cartridge system. The process cartridges 2800 are attached in a detachable manner to the image forming apparatus main body 2870 to form color images on the recording medium S.

The side of the image forming apparatus M including a front door 2711 is referred to as a front surface, and the side opposite to the front surface is referred to as a back (rear) surface. The right side of the image forming apparatus M as viewed from the front is referred to as a drive side, and the left side is referred to as a non-drive side. The upper side of the image forming apparatus M as viewed from the front is referred to as an upper surface, and the lower side is referred to as a lower surface. FIG. 23 is a cross-sectional view of the image forming apparatus M as viewed from the non-drive side. The front side in a direction perpendicular to the drawing plane is the non-drive side of the image forming apparatus M, the right side in the drawing is the front of the image forming apparatus M, and the rear side in a direction perpendicular to the drawing plane is the drive side of the image forming apparatus M.

Also, the drive side of the process cartridge 2800 is the side on which a drum coupling member (photosensitive coupling member), which will be described below, is arranged as viewed in the axial direction of the photosensitive drum. Furthermore, the drive side of the process cartridge 2800 is the side on which a development coupling member, which will be described below, is arranged as viewed in the axial direction of the developing roller (developing member).

First to fourth process cartridges 2800 (2800Y, 2800M, 2800C, and 2800K) are arranged in the image forming apparatus main body 2870 in a substantially horizontal direction. The first to fourth process cartridges 2800 (2800Y, 2800M, 2800C, and 2800K) have the same electrophotographic process mechanism but differ in the color of developer (hereinafter referred to as toner). The first to fourth process cartridges 2800 (2800Y, 2800M, 2800C, and 2800K) receive rotational driving force transmitted from a drive output portion (details will be described below) of the image forming apparatus main body 2870. Additionally, to each of the first to fourth process cartridges 2800 (2800Y, 2800M, 2800C, and 2800K), the image forming apparatus main body 2870 supplies a bias voltage (charging bias, developing bias, etc.) (not shown).

As shown in FIG. 24, each of the first to fourth process cartridges 2800 of the present embodiment includes a photosensitive drum 2804 and a drum unit 2808, which has a charging unit as a process unit acting on the photosensitive drum 2804. In some examples, the drum unit 2808 may include a cleaning unit as well as a charging unit as a process unit. Additionally, each of the first to fourth process cartridges 2800 (2800Y, 2800M, 2800C, and 2800K) includes a developing unit 2809, which has a developing unit for developing an electrostatic latent image on the photosensitive drum 2804.

The drum unit 2808 and the developing unit 2809 are coupled to each other. A detailed description of the process cartridge 2800 will be given below. The first process cartridge 2800Y contains yellow (Y) toner in the development frame 2825 and forms a yellow toner image on the surface of the photosensitive drum 2804. The second process cartridge 2800M contains magenta (M) toner in the development frame 2825 and forms a magenta toner image on the surface of the photosensitive drum 2804. The third process cartridge 2800C contains cyan (C) toner in the development frame 2825 and forms a cyan toner image on the surface of the photosensitive drum 2804. The fourth process cartridge 2800K contains black (K) toner in the development frame 2825 and forms a black toner image on the surface of the photosensitive drum 2804.

A laser scanner unit 2714, which serves as an exposure unit, is provided above the first to fourth process cartridges 2800 (2800Y, 2800M, 2800C, and 2800K). The laser scanner unit 2714 outputs a laser beam L according to image information. The laser beam L passes through an exposure window 2810 of the process cartridge 2800 and performs scanning exposure on the surface of the photosensitive drum 2804. An intermediate transfer unit 2712 as a transfer member is provided under the first to fourth process cartridges 2800 (2800Y, 2800M, 2800C, and 2800K). The intermediate transfer unit 2712 includes a drive roller 2712*e*, a turn roller 2712*c*, and a tension roller 2712*b*, and a flexible transfer belt 2712*a*, which runs around these rollers. The lower surface of the photosensitive drum 2804 of each of the first to fourth process cartridges 2800 (2800Y, 2800M, 2800C, and 2800K) is in contact with the upper surface of the transfer belt 2712*a*. The contact section serves as a primary transfer portion. Primary transfer rollers 2712*d* are aligned with the photosensitive drums 2804 on the inner side of the transfer belt 2712*a*.

A secondary transfer roller 2706 is in contact with the drive roller 2712*e* through the transfer belt 2712*a*. The contact section between the transfer belt 2712*a* and the secondary transfer roller 2706 serves as the secondary transfer portion. A feeding unit 2704 is provided under the intermediate transfer unit 2712. The feeding unit 2704 includes a paper feed tray 2704*a*, which houses recording media S, and a paper feed roller 2704*b*.

A fixing apparatus 2707 and a paper ejection device 2708 are provided in the upper left section of the image forming apparatus main body 2870 as viewed in FIG. 23. The upper surface of the image forming apparatus main body 2870 functions as a paper ejection tray 2713. A fixing means of the fixing apparatus 2707 fixes the toner image on the recording medium S, which is then ejected onto the paper ejection tray 2713.

Image Formation Operation

The operation for forming a full-color image is as follows. The photosensitive drum 2804 of each of the first to fourth process cartridges 2800 (2800Y, 2800M, 2800C, and 2800K) is driven to rotate at a predetermined speed (in the direction of arrow A in FIG. 24).

The transfer belt 2712*a* is also driven to rotate in the forward direction of rotation of the photosensitive drums 2804 (direction of arrow C in FIG. 23) at a speed corresponding to the speed of the photosensitive drums 2804. The laser scanner unit 2714 is also driven. In synchronization with the driving of the laser scanner unit 2714, each charging roller 2805 uniformly charges the surface of the photosensitive drum 2804 to a predetermined polarity and potential in each process cartridge. The laser scanner unit 2714 scans and exposes the surface of each photosensitive drum 2804 with a laser beam L according to the image signal of each color. As a result, an electrostatic latent image corresponding to the image signal of the corresponding color is formed on the surface of each photosensitive drum 2804. The formed electrostatic latent image is developed by the developing roller 2806, which is driven to rotate at a predetermined speed.

Through the electrophotographic image forming process operation as described above, a yellow toner image corresponding to the yellow component of the full-color image is formed on the photosensitive drum 2804 of the first process cartridge 2800Y. Then, this toner image is transferred onto the transfer belt 2712*a* as primary transfer. Similarly, a magenta toner image corresponding to the magenta component of the full-color image is formed on the photosensitive drum 2804 of the second process cartridge 2800M. Then, this toner image is superimposed on the yellow toner image, which has been transferred on the transfer belt 2712*a*, as primary transfer. Similarly, a cyan toner image corresponding to the cyan component of the full-color image is formed on the photosensitive drum 2804 of the third process cartridge 2800C. Then, this toner image is superimposed on the yellow-colored and magenta-colored toner images, which have been transferred on the transfer belt 2712*a*, as primary transfer. Similarly, a black toner image corresponding to the black component of the full-color image is formed on the photosensitive drum 2804 of the fourth process cartridge 2800K. Then, this toner image is superimposed on the yellow, magenta, and cyan toner images, which have been transferred on the transfer belt 2712*a*, as primary transfer.

In this manner, full-color unfixed toner images of four colors of yellow, magenta, cyan, and black are formed on the transfer belt 2712*a*. Meanwhile, the recording media S are separately fed one by one at predetermined control timing. A recording medium S is introduced into the secondary transfer portion, which is the contact section between the secondary transfer roller 2706 and the transfer belt 2712*a*, at predetermined control timing Thus, as the recording medium S is being transported through the secondary transfer portion, the toner images of the four colors superimposed on the transfer belt 2712*a* are collectively transferred to the surface of the recording medium S in sequence. Further details of the configuration of the image forming apparatus main body will be described below.

Outline of Process Cartridge Attachment/Detachment Configuration

Figure 25:
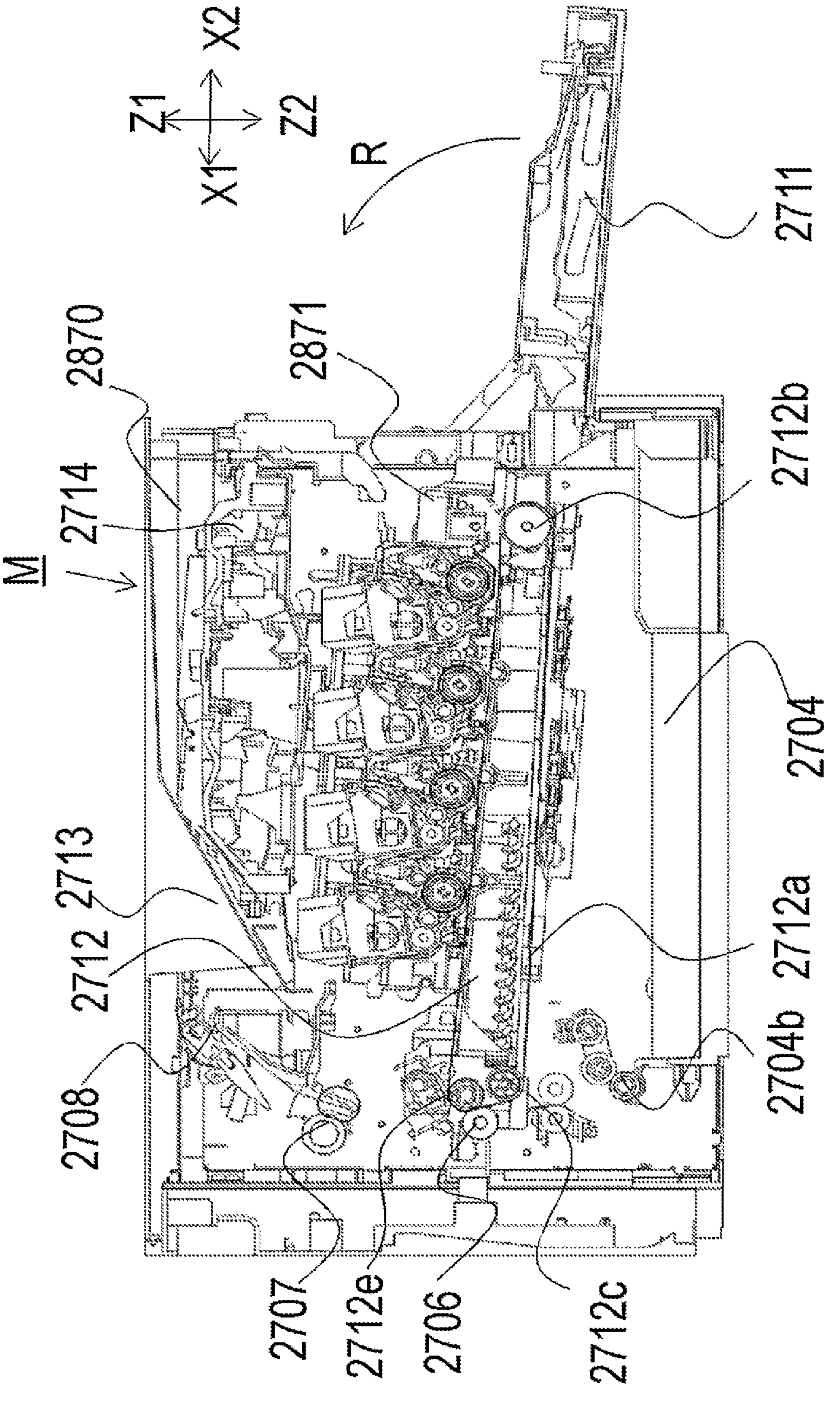
FIG. 25 is a cross-sectional view of the image forming apparatus of the third embodiment.
Figure 26:
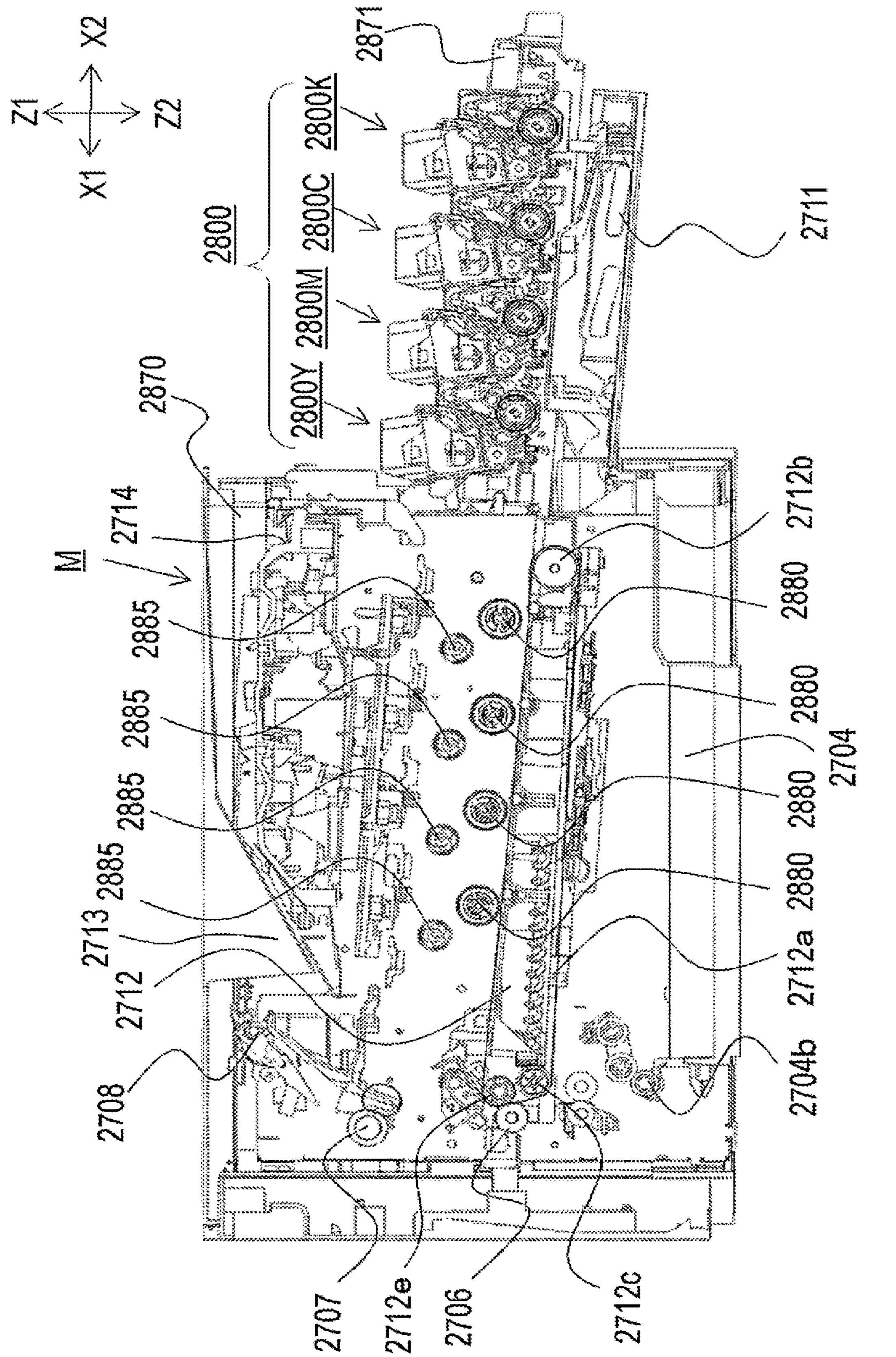
FIG. 26 is a cross-sectional view of the image forming apparatus of the third embodiment.
Figure 27:
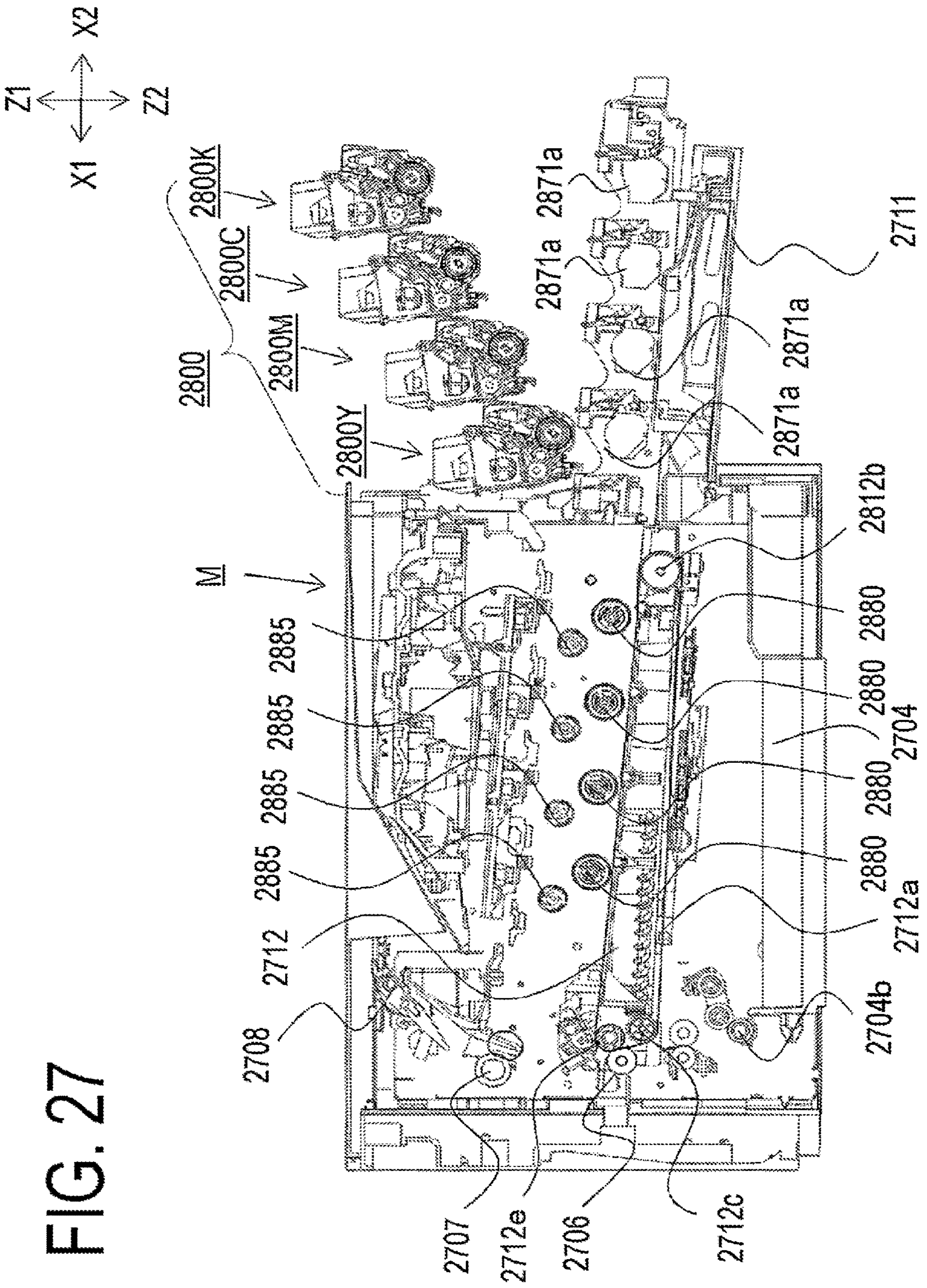
FIG. 27 is a cross-sectional view of the image forming apparatus of the third embodiment.

Referring to FIGS. 25 to 27, a cartridge tray (hereinafter referred to as a tray) 2871 supporting the process cartridges 2800 is now described in detail. FIG. 25 is a cross-sectional view of the image forming apparatus M in a state in which the front door 2711 is open and the tray 2871 is located inside the image forming apparatus main body 2870. FIG. 26 is a cross-sectional view of the image forming apparatus M in a state in which the front door 2711 is open, the tray 2871 is located outside the image forming apparatus main body 2870, and the process cartridges 2800 are housed inside the tray. FIG. 27 is a cross-sectional view of the image forming apparatus M in a state in which the front door 2711 is open, the tray 2871 is located outside the image forming apparatus main body 2870, and the process cartridges 2800 are removed from the tray 2871.

As shown in FIGS. 25 and 26, the tray 2871 is movable relative to the image forming apparatus main body 2870 in the direction of arrow X1 (pushing direction) and the direction of arrow X2 direction (pulling direction), which are substantially horizontal. That is, the tray 2871 is provided such that it can be pulled out of and pushed into the image forming apparatus main body 2870. When the image forming apparatus main body 2870 is installed on a horizontal plane, the tray 2871 is movable substantially in horizontal directions. A state in which the tray 2871 is located outside the image forming apparatus main body 2870 (the state shown in FIG. 26) is referred to as an outside position. A state in which the front door 2711 is open, the tray 2871 is located inside the image forming apparatus main body 2870, and the photosensitive drums 2804 are separated from the transfer belt 2712*a* (state in FIG. 25) is referred to as an inside position.

As shown in FIG. 27, the tray 2871 includes attachment portions 2871*a* to which the process cartridges 2800 are removably attached in the outside position. As the tray 2871 moves, the process cartridges 2800 placed in the attachment portions 2871*a* move into the image forming apparatus main body 2870. In this movement, a gap is maintained between the transfer belt 2712*a* and each photosensitive drum 2804. In this embodiment, closing the front door 2711 causes a link mechanism (not shown) to lift the intermediate transfer unit 2712 in the direction of arrow Z1 to the position for image formation (the position at which the intermediate transfer belt 2712*a* is in contact with the photosensitive drums 2804). Opening the front door 2711 lowers the intermediate transfer unit 2712 in the direction of arrow Z2, so that the intermediate transfer belt 2712*a* is separated from the photosensitive drums 2804. Thus, the tray 2871 can move the process cartridges 2800 into the image forming apparatus main body 2870 without the photosensitive drums 2804 coming into contact with the transfer belt 2712*a*. As described above, the tray 2871 allows the plurality of process cartridges 2800 to be moved together to a position in the image forming apparatus main body 2870 at which image formation is possible, and also allows them to be pulled out of the image forming apparatus main body 2870 together.

Overall Configuration of Process Cartridge

Figure 28:
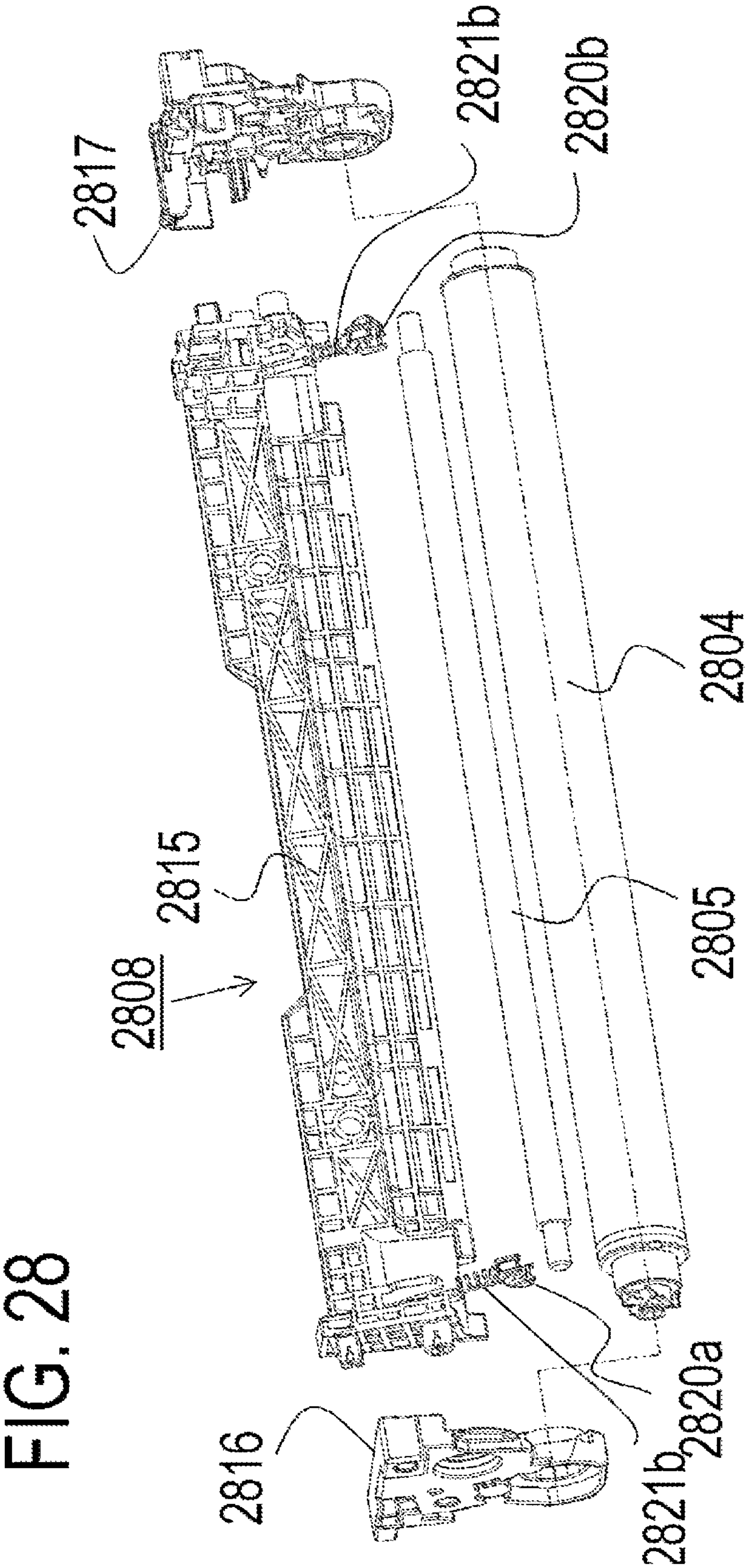
FIG. 28 is an exploded perspective view of a drum unit of the third embodiment.
Figure 29:
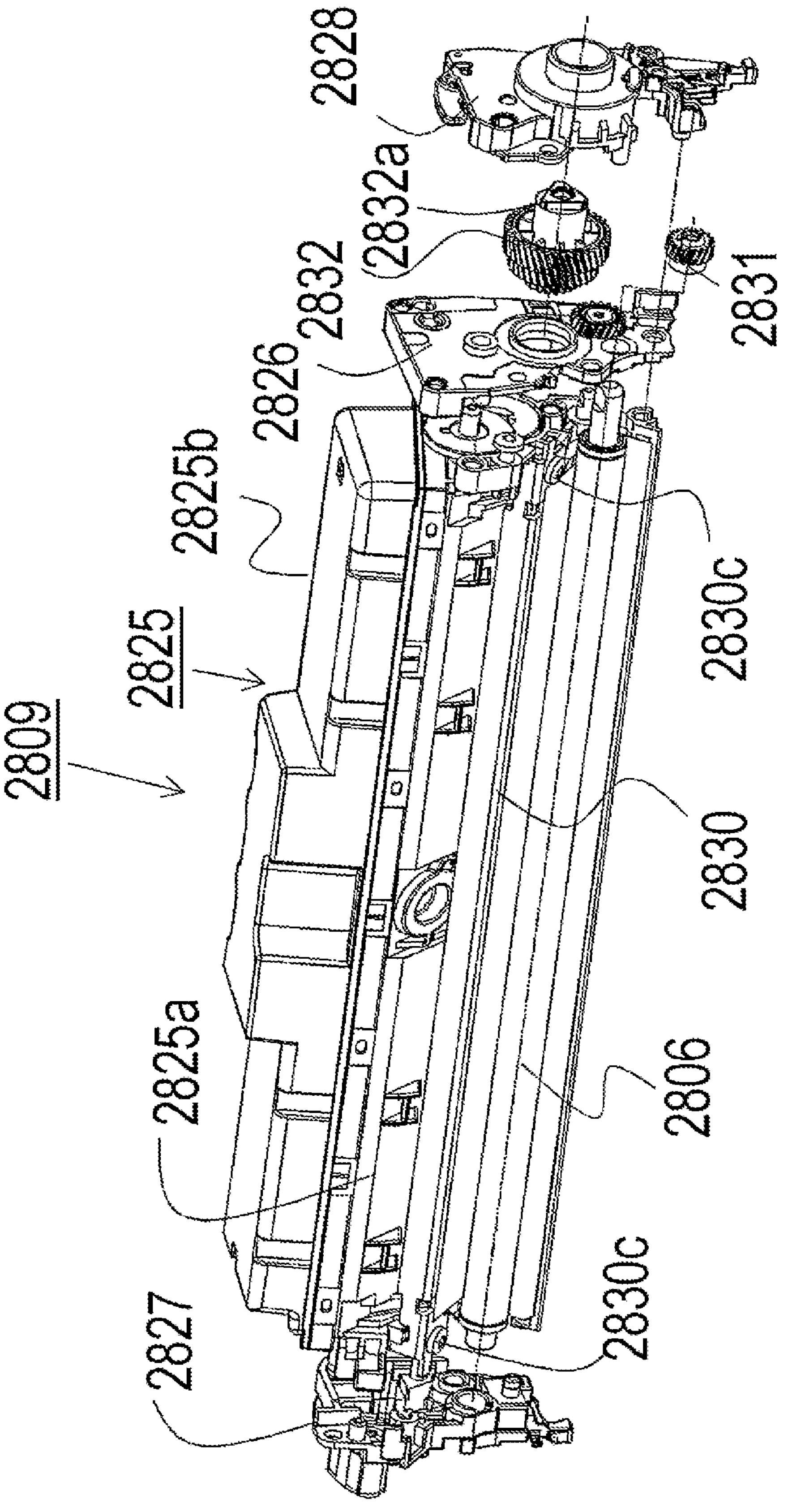
FIG. 29 is an exploded perspective view of a developing unit of the third embodiment.
Figure 30:
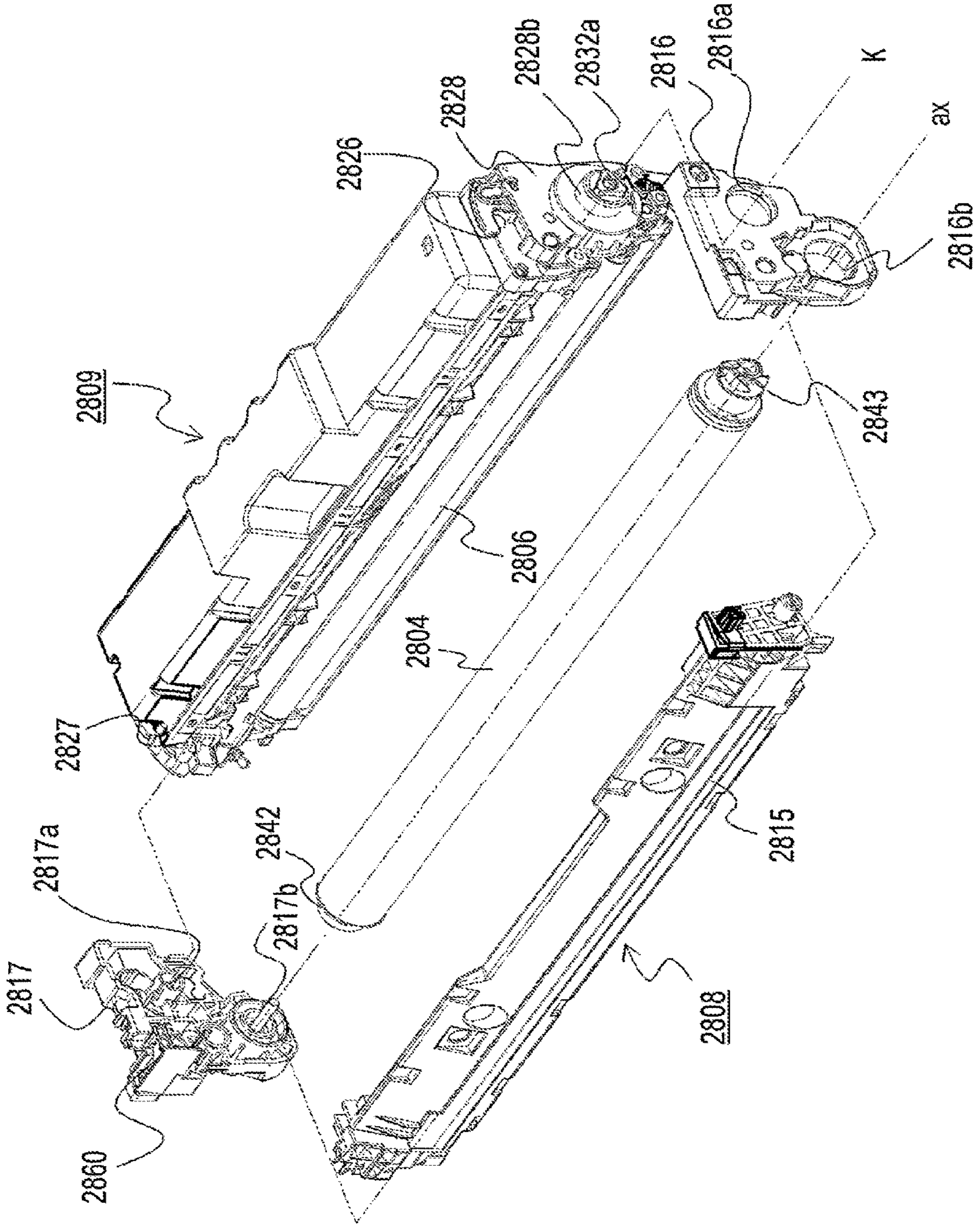
FIG. 30 is an exploded perspective view of a cartridge of the third embodiment.
Figure 31:
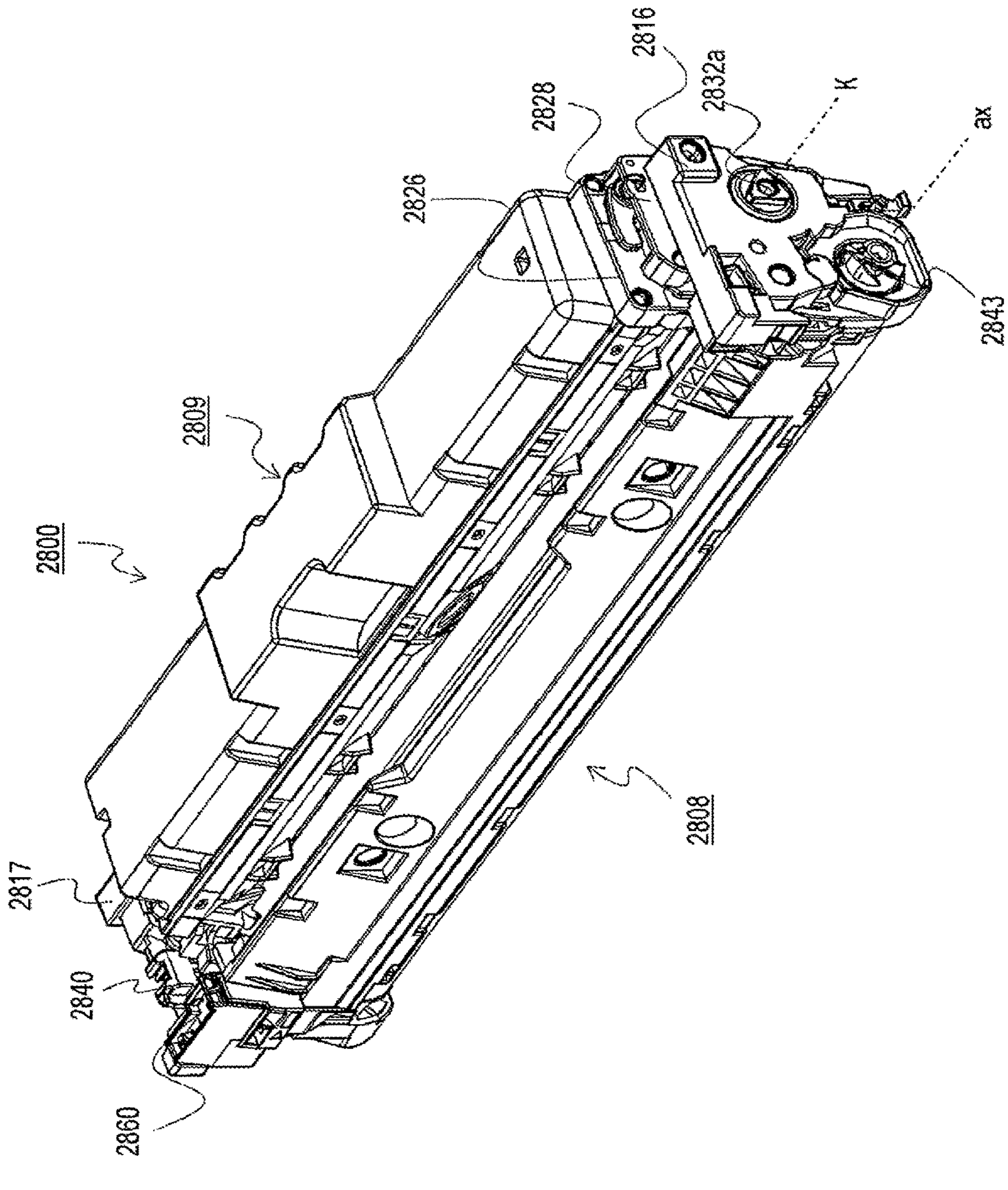
FIG. 31 is an assembly perspective view of a cartridge of the third embodiment.

Referring to FIGS. 24, 28, 29, 30, and 31, the configuration of a process cartridge 2800 is now described. FIG. 28 is an exploded perspective view of a drum unit 2808. FIG. 29 is an exploded perspective view of a developing unit 2809. FIG. 30 is an exploded perspective view of a process cartridge 2800 as viewed from the drive side, which is one end side in the axial direction of the photosensitive drum 2804. FIG. 31 is an assembly perspective view of a process cartridge 2800 as viewed from the drive side.

In the present embodiment, the first to fourth process cartridges 2800 (2800Y, 2800M, 2800C, and 2800K) have the same electrophotographic process mechanism but contain toner of different colors and amounts.

Each process cartridge 2800 includes a photosensitive drum 2804 (2804Y, 2804M, 2804C, 2804K) and a process unit acting on the photosensitive drum 2804. The process unit includes a charging roller 2805 as a charging unit for charging the photosensitive drum 2804, a developing roller 2806 as a developing unit for developing a latent image formed on the photosensitive drum 2804, and the like. The process cartridge 2800 is divided into a drum unit 2808 (2808Y, 2808M, 2808C, 2808K) and a developing unit 2809 (2809Y, 2809M, 2809C, 2809K). In the following description, longitudinal directions (Y1 and Y2 directions) of the drum unit 2808 and the developing unit 2809 are directions substantially parallel to the rotation axis ax of the photosensitive drum 2804.

Drum Unit Configuration

As shown in FIGS. 28 and 30, the drum unit 2808 includes a photosensitive drum 2804, a charging roller 2805, and a drum frame 2815, which is a first frame. The charging roller 2805 is rotationally supported by a drive-side charging roller bearing 2820*a* and a non-drive-side charging roller bearing 2820*b*, and is urged toward the photosensitive drum 2804 by pressing springs 2821*a* and 2821*b*. The photosensitive drum 2804 is rotationally supported by a drive-side cartridge cover member 2816 and a non-drive-side cartridge cover member 2817, which is a second frame, on opposite ends in the longitudinal direction of the process cartridge 2800. The non-drive-side cartridge cover member 2817 includes an electrode member 2860, which receives power from the image forming apparatus main body 2870. Details will be described below.

As shown in FIGS. 30 and 31, a coupling member 2843 for transmitting a driving force to the photosensitive drum 2804 is provided at one longitudinal end of the photosensitive drum 2804. The coupling member 2843 engages with a main-body drum drive coupling 2880 (see FIG. 26), which serves as a drum drive output portion of the image forming apparatus main body 2870. The driving force of a drive motor (not shown) of the image forming apparatus main body 2870 is transmitted to the photosensitive drum 2804 through the coupling member 2843, and the photosensitive drum 2804 is rotated in the direction of arrow A (FIG. 24). Also, the photosensitive drum 2804 includes a drum flange 2842 at the other longitudinal end. The charging roller 2805 is supported by the drum frame 2815 so as to be in contact with and rotated by the photosensitive drum 2804.

Developing Unit Configuration

As shown in FIGS. 24 and 29, the developing unit 2809 includes a developing roller 2806, a toner transport roller 2807, a development blade 2830, a development frame 2825, and the like. The development frame 2825, which serves as a fourth frame (a fourth member), includes a lower frame 2825*a* and a lid member 2825*b*. The lower frame 2825*a* and the lid member 2825*b* have a flame retardancy of HB according to the UL94 standard. The lower frame 2825*a* is joined to the lid member 2825*b* by ultrasonic welding or the like. The development frame 2825 includes a toner storage portion 2829 for storing toner to be supplied to the developing roller 2806. The development frame 2825 rotationally supports the developing roller 2806 and toner transport roller 2807 through a drive-side bearing 2826 and a non-drive-side bearing 2827, and holds the development blade 2830, which controls the layer thickness of the toner on the circumference of the developing roller 2806.

The development blade 2830 is formed by welding or otherwise joining an elastic member 2830*b*, which is a metal sheet having a thickness of about 0.1 mm, to a support member 2830*a*, which is a metal material having an L-shaped cross section. The development blade 2830 is fixed to the development frame 2825 with fixing screws 2830*c* at two locations on opposite longitudinal ends. The developing roller 2806 includes a metal core bar 2806*c* and a rubber portion 2806*d*.

The developing roller 2806 is rotationally supported by the drive-side bearing 2826 and the non-drive-side bearing 2827, which are attached to opposite longitudinal ends of the development frame 2825. As shown in FIG. 30, a development drive input gear 2832 for transmitting a driving force to the developing unit 2809 is provided at one longitudinal end of the developing unit 2809. The development drive input gear 2832 includes a development input coupling portion 2832*a*, which is driven by a main-body development drive coupling 2885 (see FIG. 26) of the image forming apparatus main body 2870. The driving force of the drive motor (not shown) of the image forming apparatus main body 2870 is input to the developing unit 2809 through the development input coupling portion 2832*a*, the development drive input gear 2832, and the like.

The driving force input to the developing unit 2809 is transmitted to the developing roller gear 2831 so that the developing roller 2806 is rotated in the direction of arrow D in FIG. 24. As shown in FIG. 29, a development cover member 2828, which supports and covers the development drive input gear 2832, is provided at one longitudinal end of the developing unit 2809. The developing roller 2806 has a smaller outer diameter than the photosensitive drum 2804. In the present embodiment, the outer diameter of the photosensitive drum 2804 is in the range of Φ18 to Φ22, and the outer diameter of the developing roller 2806 is in the range of Φ8 to Φ14. These outer diameters allow for efficient placement.

Coupling of Drum Unit and Developing Unit

Referring to FIG. 30, the coupling of the drum unit 2808 and the developing unit 2809 is now described. The drum unit 2808 and the developing unit 2809 are coupled through the drive-side cartridge cover member 2816 and the non-drive-side cartridge cover member 2817 provided at opposite ends of the process cartridge 2800 in the longitudinal direction.

The drive-side cartridge cover member 2816 provided at one longitudinal end of the process cartridge 2800 has a developing unit support hole 2816*a* for supporting the developing unit 2809 in a pivotal (movable) manner. Likewise, the non-drive-side cartridge cover member 2817 provided at the other longitudinal end of the process cartridge 2800 has a developing unit support hole 2817*a* for supporting the developing unit 2809 in a pivotal manner. The drive-side cartridge cover member 2816 and the non-drive-side cartridge cover member 2817 have drum support holes 2816*b* and 2817*b* for rotationally supporting the photosensitive drum 2804.

At one end, the outer circumference section of the cylindrical section 2828*b* of the development cover member 2828 is fitted into the developing unit support hole 2816*a* of the drive-side cartridge cover member 2816. At the other end, the outer circumference section of the cylindrical section (not shown) of the non-drive-side bearing 2827 is fitted into the developing unit support hole 2817*a* of the non-drive-side cartridge cover member 2817. The longitudinal ends of the photosensitive drum 2804 are fitted into the drum support hole 2816*b* of the drive-side cartridge cover member 2816 and the drum support holes 2817*b* of the non-drive-side cartridge cover member 2817. Then, the drive-side cartridge cover member 2816 and the non-drive-side cartridge cover member 2817 are fixed to the drum unit 2808 with screws or adhesives (not shown), for example. As a result, the developing unit 2809 is supported by the drive-side cartridge cover member 2816 and non-drive-side cartridge cover member 2817 to be rotational relative to the drum unit 2808 (photosensitive drum 2804). The developing roller 2806 is thus positioned at a location at which the developing roller 2806 acts on the photosensitive drum 2804 during image formation.

FIG. 31 shows a state in which the drum unit 2808 and the developing unit 2809 are coupled together through the above steps and integrally formed as the process cartridge 2800. The axis connecting the center of the developing unit support hole 2816*a* of the drive-side cartridge cover member 2816 and the center of the developing unit support hole 2817*a* of the non-drive-side cartridge cover member 2817 is referred to as a pivot axis K. The cylindrical section 2828*b* of the development cover member 2828 at one end is coaxial with a development input coupling 2774. That is, the developing unit 2809 is configured to receive a driving force from the image forming apparatus main body 2870 transmitted along the pivot axis K. Also, the developing unit 2809 is supported so as to be rotational about the pivot axis K.

Configuration of Power Supply Portion of Process Cartridge

Figure 32A:
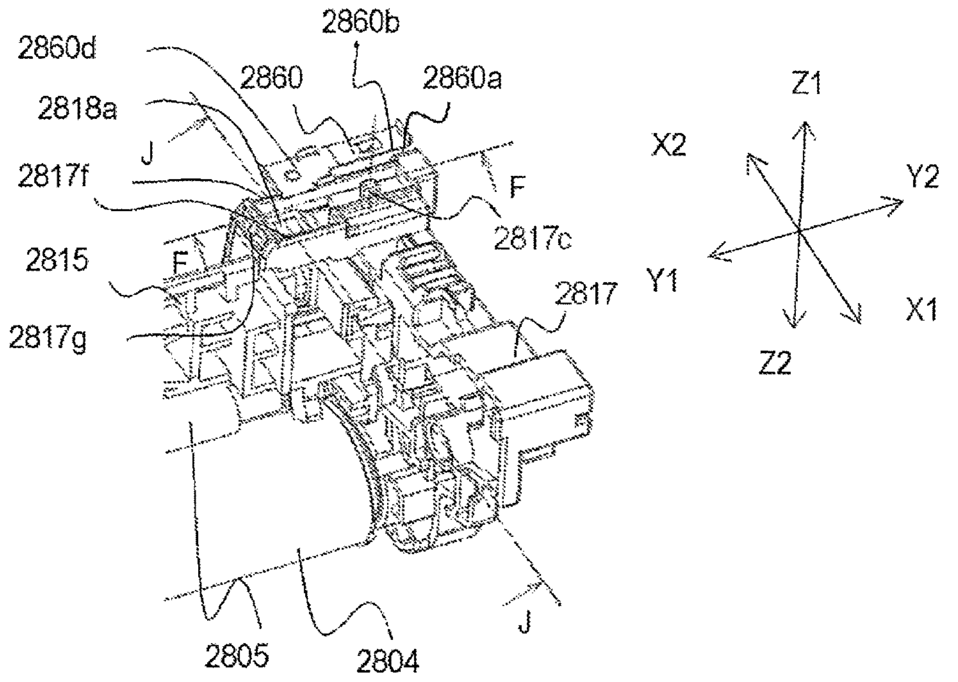
FIG. 32A is a perspective view of a cartridge and a non-drive-side cartridge cover member of the third embodiment.
Figure 32B:
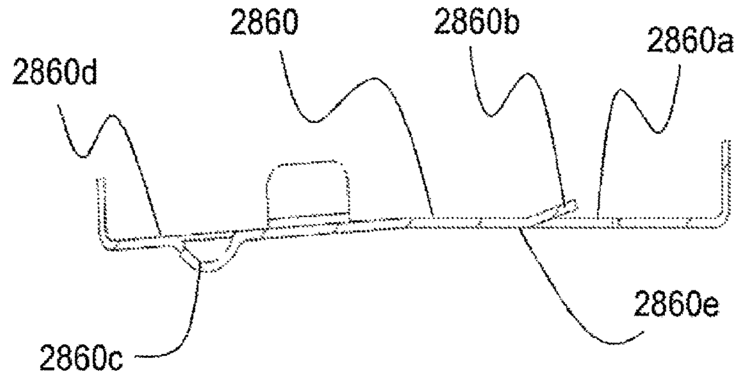
FIG. 32B is a cross-sectional view of the cartridge and the non-drive-side cartridge cover member of the third embodiment.
Figure 32C:
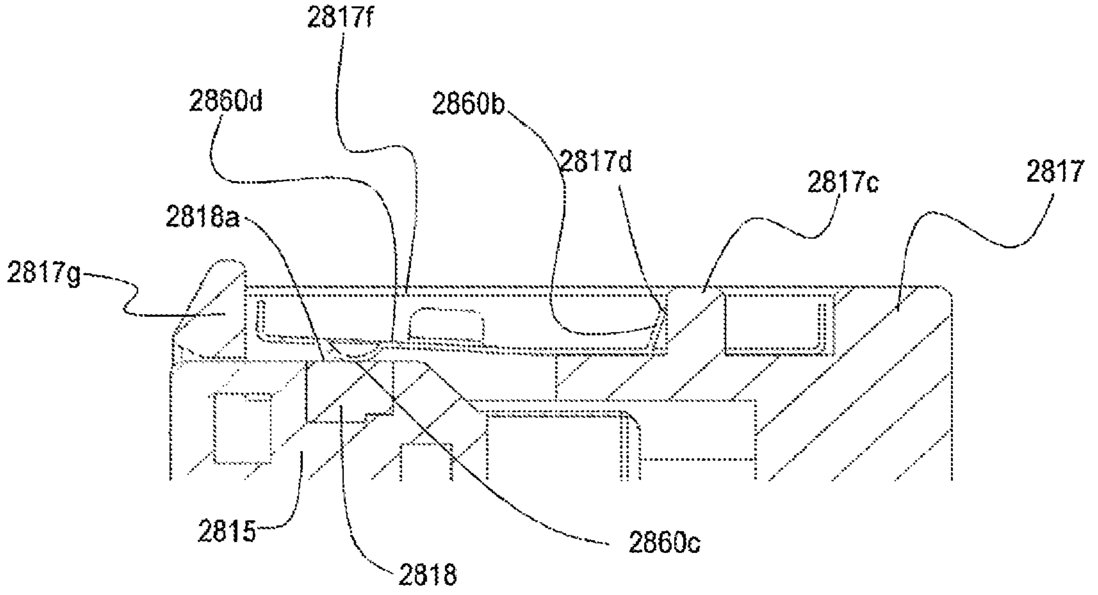
FIG. 32C is a cross-sectional view of the cartridge and the non-drive-side cartridge cover member of the third embodiment.
Figure 32D:
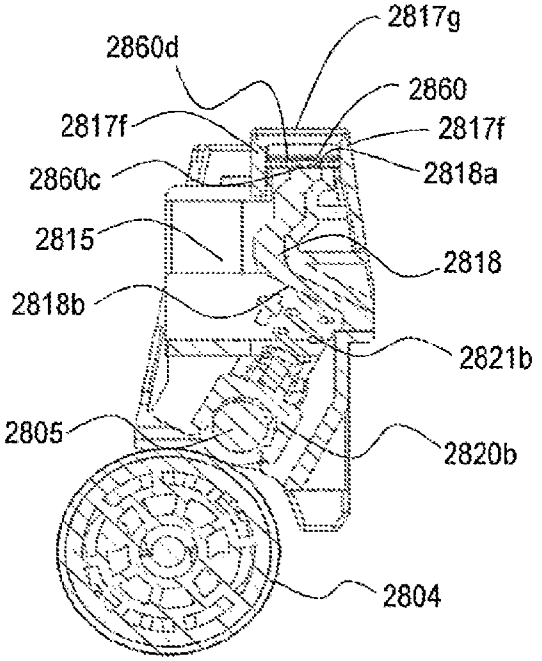
FIG. 32D is a cross-sectional view of the cartridge and the non-drive-side cartridge cover member of the third embodiment.

Referring to FIGS. 32A to 32D, the configuration of the power supply portion of the present embodiment is now described. FIG. 32A is a perspective view of the area around the section of the drum unit 2808 that is coupled to the non-drive-side cartridge cover member 2817. In FIG. 32A, only the electrode member 2860 is shown in an exploded view. FIG. 32B is a cross-sectional view of the electrode member 2860. FIG. 32C is a cross-sectional view taken along line F-F in FIG. 32A, showing a state in which the electrode member 2860 is fixed in FIG. 32A. FIG. 32D is a cross-sectional view taken along line J-J in FIG. 32A, showing a state in which the electrode member 2860 is fixed in FIG. 32A.

In the drum frame 2815, which is the first frame, the conductive resin 2818 is integrally formed in the drum frame 2815 by two-color molding. The conductive resin 2818 has a surface 2818*a* that comes into contact with the electrode member 2860 and a surface 2818*b* that serves as a seating surface for the pressing spring 2821*b*. As in the first embodiment, the drum frame as a first frame has a density of about 0.95 to 1.10 g/cm$^3$ and a flame retardancy of HB according to the UL94 standard.

The electrode member 2860 is made of a stainless steel material having a thickness of about 0.2 mm. The electrode member 2860 has an embossed contact section 2860*c*, which comes into contact with the surface 2818*a* of the conductive resin 2818, and a contact surface 2860*d*, which comes into contact with an electrode spring 2893 (FIGS. 33B and 33C) and receives power. The electrode spring 2893 supplies power from the image forming apparatus main body 2870. The non-drive-side cartridge cover member 2817, which serves as a second frame, supports the electrode member 2860.

The non-drive-side cartridge cover member 2817 as the second frame has a density of 1.12 to 1.50 g/cm$^3$ and a flame retardancy of V-1 according to the UL94 standard. The electrode member 2860 has a positioning 2860*a*, into which a boss 2817*c* of the non-drive-side cartridge cover member 2817 is fitted, and a cut and raised section 2860*b*, which engages with a surface 2817*d* of the boss 2817*c*, and is thus fixed (FIG. 32C).

As shown in FIG. 32B, the side of the electrode member 2860 including the contact section 2860*c* is bent about 3° in the direction of the conductive resin 2818 relative to a setting surface 2860*e* that is set on the non-drive-side cartridge cover member 2817. This is to prevent the contact section 2860*c* of the electrode member 2860 from being separated from the surface 2818*a* of the conductive resin 2818 when the electrode member 2860 is coupled to the non-drive-side cartridge cover member 2817. Since the side including the contact section 2860*c* is bent in the direction into the surface 2818*a* of the conductive resin 2818, when the electrode member 2860 is coupled to the non-drive-side cartridge cover member 2817, the contact section 2860*c* is in contact with the surface 2818*a* of the conductive resin 2818 under a certain pressure. As such, even if the conductive resin 2818, the non-drive-side cartridge cover member 2817, and the electrode member 2860 have dimensional variations, the surface 2818*a* of the conductive resin 2818 and the contact section 2860*c* of the electrode member 2860 are always in contact with each other. This prevents continuity failure, which would otherwise occur due to contact failure between the electrode member 2860 and the conductive resin 2818, and ignition due to tracking.

The voltage supplied from the contact spring 2893 to the electrode member 2860 is fed to the charging roller 2805 via the conductive resin 2818, which is formed in the drum frame 2815 by two-color molding, the pressing spring 2821*b*, and the non-drive-side charging roller bearing 2820*b*.

The conductive resin 2818 is formed by two-color molding in the above configuration, but it may be formed as a separate part and fixed to the drum frame 2815, which is the first frame. Also, the electrode member 2860 is fixed by the cut and raised section 2860*b* in the above configuration, but the electrode member 2860 may be fixed using a screw or caulking. Furthermore, the side of the electrode member 2860 including the contact section 2860*c* is bent relative to the setting surface 2860*e*, but the configuration is not limited to this. The thickness of the electrode member 2860 may be increased to form a deep embossed shape so that the electrode member 2860 is always in contact with the surface 2818*a* of the conductive resin 2818.

Figure 33A:
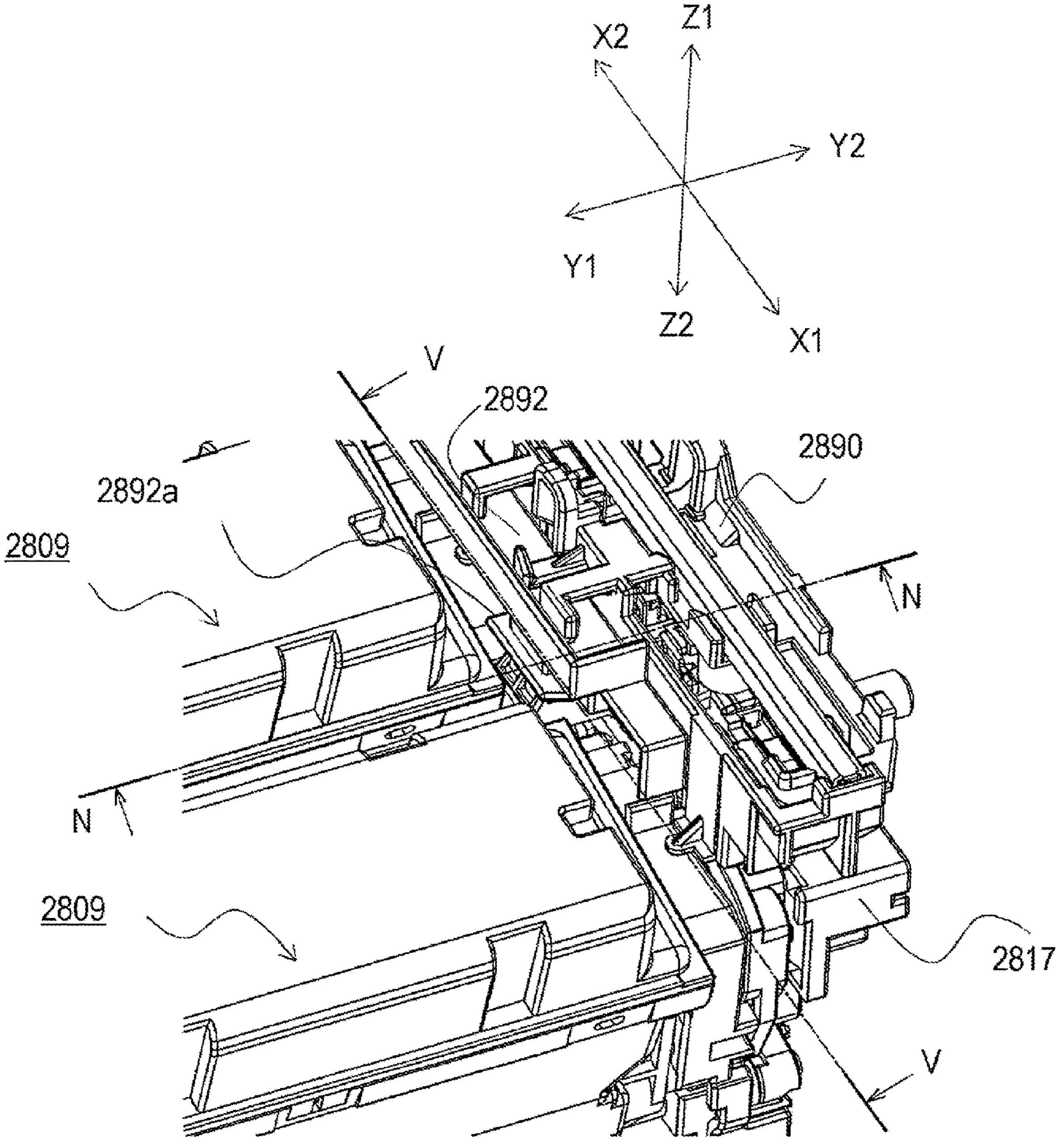
FIG. 33A is a perspective view of a storage element communication unit and a contact spring holding member of the third embodiment.
Figure 33B:
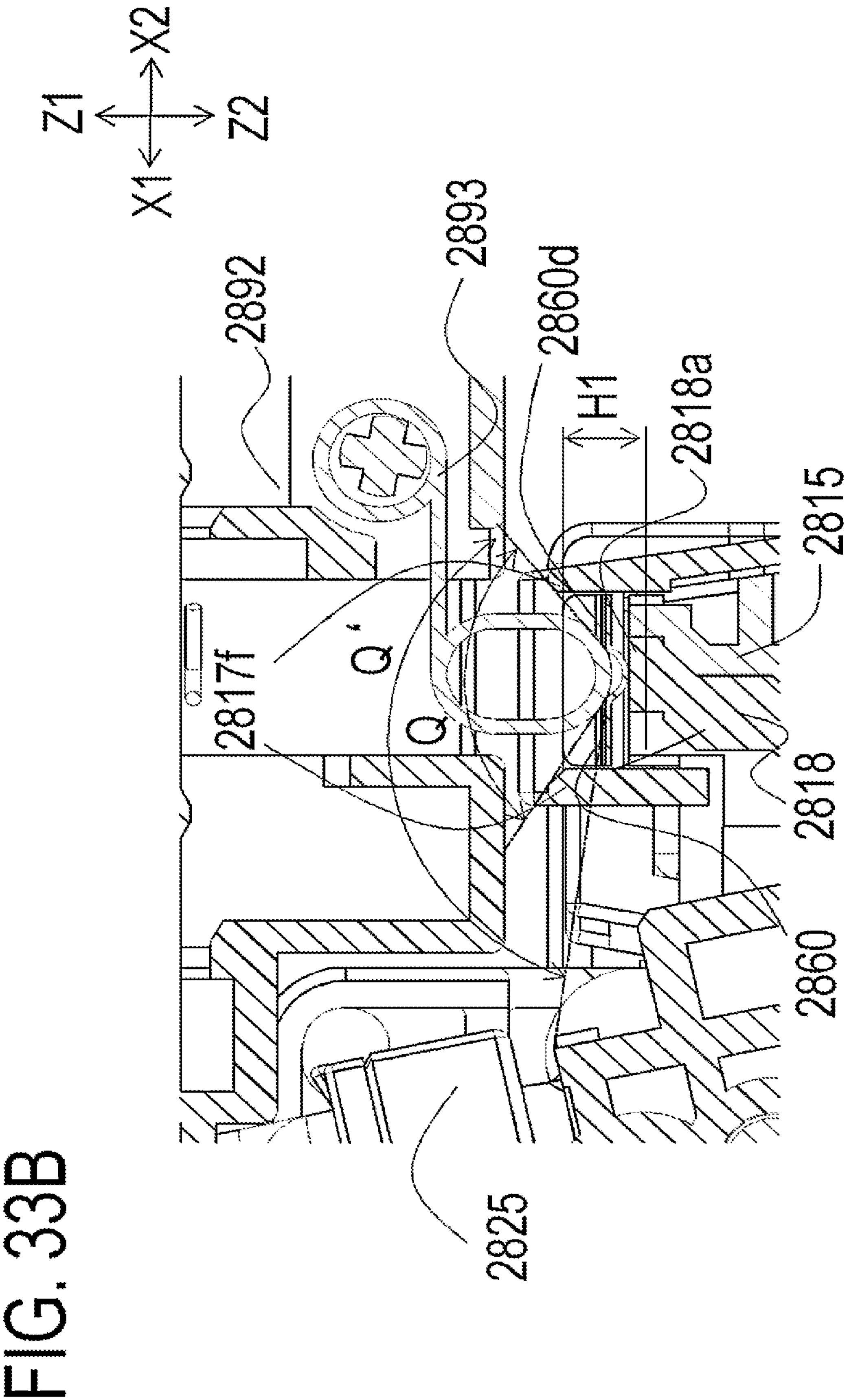
FIG. 33B is an enlarged cross-sectional view of the storage element communication unit and the contact spring holding member of the third embodiment.
Figure 33C:
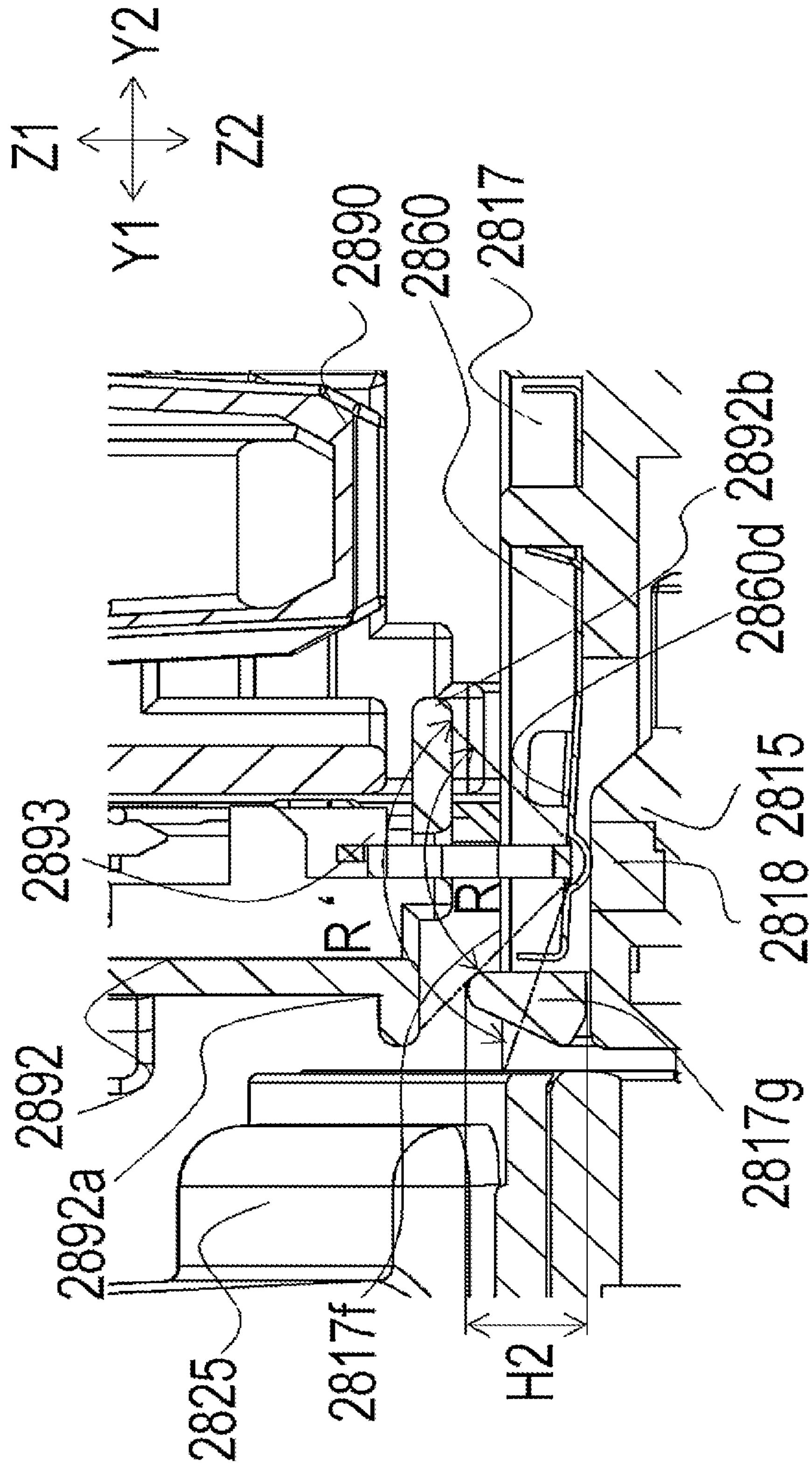
FIG. 33C is an enlarged cross-sectional view of the storage element communication unit and the contact spring holding member of the third embodiment.

Configuration of Power Supply Portion of Image Forming Apparatus Main Body and Process Cartridge Referring to FIGS. 25, 33A, 33B, and 33C, the configuration of the power supply portion including the image forming apparatus main body 2870 is now described. FIG. 33A is a perspective view of a process cartridge in a state in which a storage element communication unit 2890 and a contact spring holding member 2892 are lowered. FIG. 33B is an enlarged cross-sectional view of the power supply portion taken along line V-V in FIG. 33A. FIG. 33C is an enlarged cross-sectional view of the power supply portion taken along line N-N in FIG. 33A.

The image forming apparatus main body 2870 includes the contact spring holding member 2892 and holds the contact spring 2893 for supplying power to the process cartridge 2800. The contact spring holding member 2892 is fixed to the storage element communication unit 2890, which communicates with a storage element (not shown) provided in the process cartridge 2800.

The interlocking between the front door 2711 shown in FIG. 25 and a link mechanism (not shown) can move the contact spring 2893 and the electrode member 2860 into and out of contact with each other. Closing the front door 2711 lowers the storage element communication unit 2890 and the contact spring holding member 2892 in the direction of arrow Z2 (FIG. 33B). Opening the front door 2711 lifts the storage element communication unit 2890 and the contact spring holding member 2892 in the direction of arrow Z1. That is, closing the front door 2711 brings the contact spring 2893 and the electrode member 2860 into contact with each other, while opening the front door 2711 separates the contact spring 2893 and the electrode member 2860 from each other. The contact spring holding member 2892 has a flame retardancy of V-1 according to the UL94 standard.

As shown in FIG. 33B, protruding sections 2817*f* protrude from the non-drive-side cartridge cover member 2817 in the direction of arrow Z1 on opposite sides of the electrode member 2860 (in directions of arrows X1 and X2). The height H1 of the protruding sections 2817*f* is set to be higher than the contact surface 2860*d* between the contact spring 2893 and the electrode member 2860 in the Z1 direction. In order to reduce a fire-spreading range Q that is created if ignition occurs between the contact spring 2893 and the electrode member 2860 due to tracking, the protruding sections 2817*f* are preferably located in the vicinity of the contact spring 2893 and the electrode member 2860. Fire spreads upward, and the non-drive-side cartridge cover member 2817, which is made of a V-1 material and self-extinguishing, does not burn. Consequently, the fire-spreading range Q in the X1 and X2 directions is as indicated by Q in FIG. 33B.

As shown FIG. 33C, at the side of the electrode member 2860 corresponding to the side of arrow Y1 in the longitudinal direction, a protruding section 2817*g* is arranged that is integrally connected to the ends in the Y1 direction of the protruding sections 2817*f* of the non-drive-side cartridge cover member 2817. The height H2 of the protruding sections 2817*g* is set to be higher in the Z1 direction than the contact surface 2860*d* between the contact spring 2893 and the electrode member 2860. In order to reduce a fire-spreading range R in the same manner as in the directions X1 and X2, the protruding section 2817*g* is preferably located in the vicinity of the contact spring 2893 and the electrode member 2860. As described above with regard to the directions X1 and X2, fire spreads upward, and the non-drive-side cartridge cover member 2817, which is made of a V-1 material and self-extinguishing, does not burn. Consequently, the fire-spreading range R in the Y1 and Y2 directions is as indicated by "R" in FIG. 33C.

In addition, protruding sections 2892*a* and 2892*b* also extend in the longitudinal direction from the contact spring holding member 2892. The protruding sections 2892*a* and 2892*b* are set so as to obstruct the fire-spreading range R.

A situation is now described in which ignition occurs due to tracking between the contact spring 2893 and the electrode member 2860. When ignition occurs between the contact spring 2893 and the electrode member 2860, the fire may spread over the fire-spreading ranges Q and R. However, the fire does not spread because the contact spring holding member 2892, which is located above the ignition point (in the Z1 direction), and the non-drive-side cartridge cover member 2817, which is located in the longitudinal directions (in the directions of Y1 and Y2) and the front-rear directions (in the directions of X1 and X2) of the ignition point, have a flame retardancy of V-1 and are self-extinguishing. In contrast, when the protruding sections 2817*f* and 2817*g* are not provided, the fire spreads over the fire-spreading ranges Q' and R'. The lack of components that limit the spreading of fire may spread the fire to the development frame 2825, which is made of an HB material with low flame retardancy. In contrast, since the present embodiment has the protruding sections 2817*f* and 2817*g* of the non-drive-side cartridge cover member 2817 and the protruding sections 2892*a* and 2892*b* of the contact spring holding member 2892, which have a flame retardancy of V-1, in the fire-spreading range, the fire does not spread to a component with low flame retardancy.

As described above, the protruding sections 2817*f* and 2817*g* of the non-drive-side cartridge cover member 2817 are provided around the electrode member 2860, and the contact spring holding member 2892 having the protruding sections 2892*a* and 2892*b* is arranged above the fire-spreading range. Additionally, the non-drive-side cartridge cover member 2817 and the contact spring holding member 2892 are made of a material with a flame retardancy of V-1 according to the UL94 standard. As a result, even if ignition occurs due to tracking, the fire does not spread to parts with low flame retardancy. It is thus possible to provide a process cartridge and an image forming apparatus that ensure safety.

In the present embodiment, the protruding sections of the non-drive-side cartridge cover member 2817 surround the electrode member 2860, but the configuration is not limited to this. A protruding section may protrude from the contact spring holding member 2892 in the Z2 direction and surround the electrode member 2860. In the present embodiment, the non-drive-side cartridge cover member 2817 and the contact spring holding member 2892 have a flame retardancy of V-1 according to the UL94 standard, but these members may have a flame retardancy of V-1 or higher.

The process cartridge configuration and the drum cartridge configuration of the first to third embodiments can achieve the same effects of weight reduction and fire spreading prevention in a configuration in which these configurations are bound to the apparatus main body of the image forming apparatus in a nonremovable manner. As such, the process cartridge configuration and the drum cartridge configuration of the first to third embodiments are applicable to a configuration in which these configurations are bound to the image forming apparatus in a nonremovable manner.

In such a configuration, the use of an HB material that is a low-density resin material reduces the overall weight of the image forming apparatus, achieving both the safety and weight reduction of the image forming apparatus. As a result, the impact value of the image forming apparatus main body during physical distribution can be lowered. This allows the packaging of the image forming apparatus to be smaller, improving the distribution efficiency.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-146225, filed on Aug. 31, 2020, which is hereby incorporated by reference herein in its entirety.

What is claimed is:

1. A process unit to be used in an apparatus main body of an image forming apparatus, the process unit comprising:
- a process member to be used to form an image;
- a first member including a first resin material;
- a second member including a second resin material having higher flame retardant capability than the first resin material; and
- an electrode member including a contact section configured to be supplied with power from the apparatus main body, the electrode member being configured to electrically connect with the process member, wherein
- the first member is a part of a frame of the process unit, the second resin material of the second member has a greater density than the first resin material of the first member, and
- at least a part of the second member is located at a position closer to the contact section than a part of the first member closest to the contact section and between the contact section and the part of the first member closest to the contact section.

2. The process unit according to claim 1, wherein the second member includes:
- an electrode seating surface on which the electrode member is located; and
- a protruding section protruding in a direction perpendicular to the electrode seating surface.

3. The process unit according to claim 1, wherein
- the process unit further includes a third member that is integrally coupled to the first member and includes the second resin material having higher flame retardant capability than the first resin material;
- the second member includes an electrode seating surface on which the electrode member is located; and
- the third member includes a protruding section protruding beyond the electrode seating surface in a direction perpendicular to the electrode seating surface.

4. The process unit according to claim 1, wherein the first resin material and the second resin material have different flame retardant grades according to UL94.

5. The process unit according to claim 4, wherein
- the first resin material is a resin material that has a flame retardancy of HB according to UL94, and
- the second resin material is a resin material that has a flame retardancy of V-1 according to UL94.

6. The process unit according to claim 1, wherein the electrode member includes a conductive resin material.

7. The process unit according to claim 6, wherein
- the process member is a rotating member;
- the second member and the electrode member are formed integrally with each other and are a bearing member that rotationally supports the process member;
- the electrode member includes:
  - a shaft support section that is configured to supply power to the process member;
  - a connection section that connects the contact section to the shaft support section; and
  - a gate section for injecting resin during formation; and
- as viewed in a direction perpendicular to a plane of the contact section, the connection section and the gate section are included in the contact section, and the shaft support section overlaps at least a part of the contact section.

8. The process unit according to claim 7, wherein
- the shaft support section is cylindrical, and
- the second member includes an inner circumference support section that supports an inner circumference of the shaft support section, and an outer circumference support section that supports an outer circumference of the shaft support section.

9. The process unit according to claim 1, wherein the electrode member includes a metal material.

10. The process unit according to claim 1, wherein the process member is any one of an image bearing member, a developer carrying member, and a charging member.

11. The process unit according to claim 1, wherein the process unit is attachable to and detachable from the apparatus main body.

12. The process unit according to claim 1, wherein the first member supports the process member.

13. The process unit according to claim 1, wherein the second member is integrally coupled to the first member.

14. The process unit according to claim 1, wherein the electrode member is coupled so as to be in contact with at least the second member.

15. The process unit according to claim 1, wherein
the process member is a rotating member, and
at least a part of the second member is located between the contact section and the first member in a rotational axis direction of the process member.

16. The process unit according to claim 1, wherein the first member includes polystyrene.

17. The process unit according to claim 1, wherein the second member includes a mixed resin of styrene.

18. The process unit according to claim 1, wherein the second member is a part of the frame.

19. An image forming apparatus for forming an image on a recording medium comprising:
an apparatus main body; and
the process unit according to claim 1 that is attachable to and detachable from the apparatus main body.

20. A process unit to be used in an apparatus main body of an image forming apparatus, the process unit comprising:
a process member to be used to form an image;
a first member including a first resin material;
a second member including a second resin material having higher flame retardant capability than the first resin material; and
an electrode member including a contact section configured to be supplied with power from the apparatus main body, the electrode member being configured to electrically connect with the process member, wherein
the first member is a part of a frame of the process unit,
the second resin material of the second member has a greater density than the first resin material of the first member, and
the contact section is supported by the second member.

21. The process unit according to claim 20, wherein the second member includes:
an electrode seating surface on which the electrode member is located; and
a protruding section protruding in a direction perpendicular to the electrode seating surface.

22. The process unit according to claim 20, wherein
the process unit further includes a third member that is integrally coupled to the first member and includes the second resin material having higher flame retardant capability than the first resin material;
the second member includes an electrode seating surface on which the electrode member is located; and
the third member includes a protruding section protruding beyond the electrode seating surface in a direction perpendicular to the electrode seating surface.

23. The process unit according to claim 20, wherein the first resin material and the second resin material have different flame retardant grades according to UL94.

24. The process unit according to claim 23, wherein
the first resin material is a resin material that has a flame retardancy of HB according to UL94, and
the second resin material is a resin material that has a flame retardancy of V-1 according to UL94.

25. The process unit according to claim 20, wherein the electrode member includes a conductive resin material.

26. The process unit according to claim 25, wherein
the process member is a rotating member;
the second member and the electrode member are formed integrally with each other and are a bearing member that rotationally supports the process member;
the electrode member includes:
a shaft support section that is configured to supply power to the process member;
a connection section that connects the contact section to the shaft support section; and
a gate section for injecting resin during formation; and
as viewed in a direction perpendicular to a plane of the contact section, the connection section and the gate section are included in the contact section, and the shaft support section overlaps at least a part of the contact section.

27. The process unit according to claim 26, wherein
the shaft support section is cylindrical, and
the second member includes an inner circumference support section that supports an inner circumference of the shaft support section, and an outer circumference support section that supports an outer circumference of the shaft support section.

28. The process unit according to claim 20, wherein the electrode member includes a metal material.

29. The process unit according to claim 20, wherein the process member is any one of an image bearing member, a developer carrying member, and a charging member.

30. The process unit according to claim 20, wherein the process unit is attachable to and detachable from the apparatus main body.

31. The process unit according to claim 20, wherein the first member supports the process member.

32. The process unit according to claim 20, wherein the second member is integrally coupled to the first member.

33. The process unit according to claim 20, wherein the electrode member is coupled so as to be in contact with at least the second member.

34. The process unit according to claim 20, wherein
the process member is a rotating member, and
at least a part of the second member is located between the contact section and the first member in a rotational axis direction of the process member.

35. The process unit according to claim 20, wherein the first member includes polystyrene.

36. The process unit according to claim 20, wherein the second member includes a mixed resin of styrene.

37. The process unit according to claim 20, wherein the second member is at least a part of the frame.

38. An image forming apparatus for forming an image on a recording medium comprising:
an apparatus main body; and
the process unit according to claim 20 that is attachable to and detachable from the apparatus main body.

* * * * *